United States Patent
Degertekin

(10) Patent No.: US 7,395,698 B2
(45) Date of Patent: Jul. 8, 2008

(54) THREE-DIMENSIONAL NANOSCALE METROLOGY USING FIRAT PROBE

(75) Inventor: Fahrettin Levent Degertekin, Decatur, GA (US)

(73) Assignee: Georgia Institute of Technology, Atlanta, GA (US)

( * ) Notice: Subject to any disclaimer, the term of this patent is extended or adjusted under 35 U.S.C. 154(b) by 0 days.

(21) Appl. No.: 11/552,274

(22) Filed: Oct. 24, 2006

(65) Prior Publication Data

US 2007/0089496 A1 Apr. 26, 2007

Related U.S. Application Data

(60) Provisional application No. 60/730,217, filed on Oct. 25, 2005.

(51) Int. Cl.
G01B 5/28 (2006.01)
(52) U.S. Cl. .......................... 73/105; 33/561
(58) Field of Classification Search ........................ None
See application file for complete search history.

(56) References Cited

U.S. PATENT DOCUMENTS

| | | | |
|---|---|---|---|
| 2,867,043 A * | 1/1959 | Jarret et al. .................... 33/558 |
| 3,841,153 A * | 10/1974 | Michelson .................... 73/161 |
| 5,247,186 A | 9/1993 | Toda |
| 5,253,515 A | 10/1993 | Toda et al. |
| 5,345,690 A * | 9/1994 | McMurtry et al. ............ 33/561 |
| 5,445,011 A | 8/1995 | Ghislain et al. |
| 5,900,729 A | 5/1999 | Moser et al. |
| 5,923,033 A | 7/1999 | Takayama et al. |
| 6,249,747 B1 | 6/2001 | Binnig et al. |
| 6,272,907 B1 | 8/2001 | Neukermans et al. |
| 6,291,927 B1 | 9/2001 | Percin et al. |
| 6,400,166 B2 | 6/2002 | Babson et al. |
| 6,474,786 B2 | 11/2002 | Percin et al. |
| 6,567,572 B2 | 5/2003 | Degertekin et al. |
| 6,672,144 B2 | 1/2004 | Adderton et al. |
| 6,676,813 B1 | 1/2004 | Pelekhov et al. |

(Continued)

FOREIGN PATENT DOCUMENTS

JP 05248810 A 9/1993

(Continued)

OTHER PUBLICATIONS

Yaralioglu et al., "Analysis and Design of an Interdigital Cantilever as a Displacement Sensor" Journal of Applied Physics, Jun. 15, 1998, vol. 83, No. 12.

(Continued)

*Primary Examiner*—Robert R Raevis
(74) *Attorney, Agent, or Firm*—Bockhop & Associates, LLC; Bryan W. Bockhop

(57) ABSTRACT

In accordance with an embodiment of the invention, there is a force sensor for a probe based instrument. The force sensor can comprise a detection surface and a flexible mechanical structure disposed a first distance above the detection surface so as to form a gap between the flexible mechanical structure and the detection surface wherein the flexible mechanical structure is configured to deflect upon exposure to an external force, thereby changing the first distance over a selected portion of the gap, the change in distance at the selected portion orienting a probe tip of the force sensor for multi-directional measurement.

48 Claims, 45 Drawing Sheets

U.S. PATENT DOCUMENTS

| | | | |
|---|---|---|---|
| 6,718,821 B1 * | 4/2004 | Houston et al. ............... 73/105 |
| 6,836,112 B2 | 12/2004 | Hennessy |
| 6,862,923 B2 | 3/2005 | Buguin et al. |
| 6,862,924 B2 | 3/2005 | Xi et al. |
| 6,882,429 B1 | 4/2005 | Weitekamp et al. |
| 2001/0000279 A1 | 4/2001 | Daniels et al. |
| 2001/0013574 A1 | 8/2001 | Warren et al. |
| 2001/0035700 A1 | 11/2001 | Percin et al. |
| 2001/0049959 A1 | 12/2001 | Neukermans et al. |
| 2003/0042409 A1 | 3/2003 | Warren et al. |
| 2004/0065821 A1 | 4/2004 | Warren et al. |
| 2004/0206165 A1 | 10/2004 | Minne et al. |
| 2004/0216517 A1 | 11/2004 | Xi et al. |
| 2005/0066714 A1 | 3/2005 | Adderton et al. |
| 2005/0180678 A1 | 8/2005 | Panepucci et al. |
| 2007/0103697 A1 * | 5/2007 | Degertekin ................. 356/501 |
| 2007/0107502 A1 * | 5/2007 | Degertekin ................. 73/105 |

FOREIGN PATENT DOCUMENTS

| | | |
|---|---|---|
| JP | 07065428 A | 3/1995 |
| JP | 10090287 A | 4/1998 |
| JP | 2004093574 A | 3/2004 |

OTHER PUBLICATIONS

Solgaard et al., "Deformable Grating Optical Modulator" Optics Letters, May 1, 1992, vol. 17, No. 9.

Cooper et al., "High-Resolution Micromachined Itnerferometric Accelerometer" Applied Physics Letters, May 29, 2000, vol. 70, No. 22.

Manalis et al., "Interdigital Cantilevers for Atomic Force Microscopy" Applied Physich Letters, Dec. 16, 1996, vol. 69, No. 25.

Wu, "Micromachining for Optical and Optoelectronic Systems" Proceedings of the IEEE, Nov. 1997, vol. 85, No. 11.

Chen et al., "Overview of Three-Dimensional Shape Measurement Using Optical Methods" Optical Engineering, Jan. 2000, vol. 39, No. 1.

Shiono et al., "Planar-optic-disk Pickup with Diffractive Micro-optics" Applied Optics, Nov. 1, 1994, vol. 33, No. 31.

Dewitt et al., "Range-finding Method Using Diffraction Gratings" Applied Optics, May 10, 1995, vol. 34, No. 14.

Jahns et al., "Planar Integration of Free-space Optical Components" Applied Optics, May 1, 1989, vol. 28, No. 9.

* cited by examiner

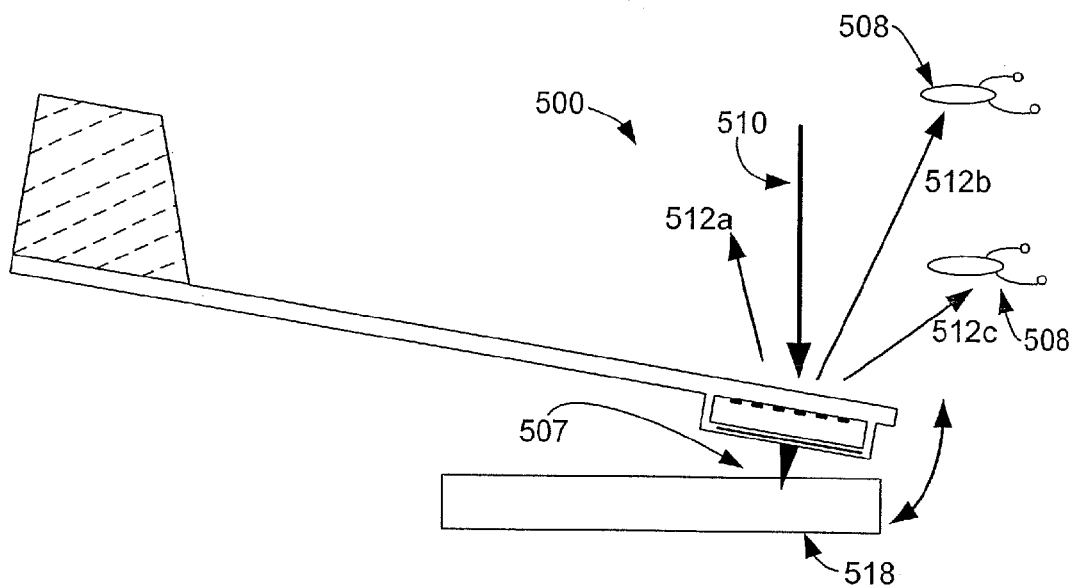
Fig. 5A
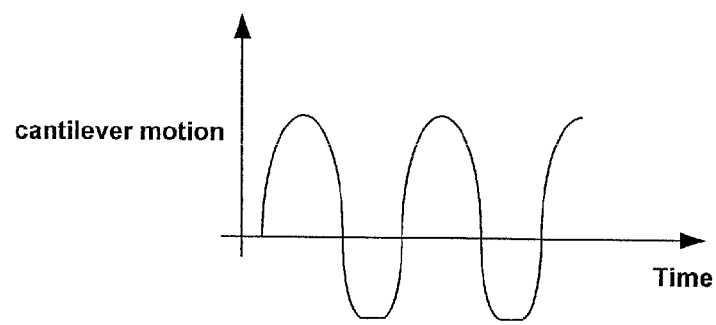
Fig. 5B  cantilever motion
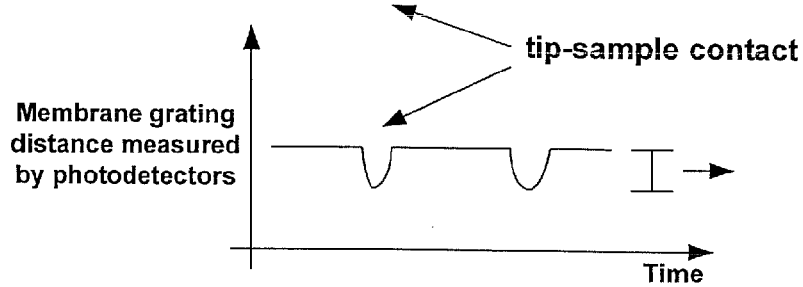
Fig. 5C  Membrane grating distance measured by photodetectors
tip-sample contact

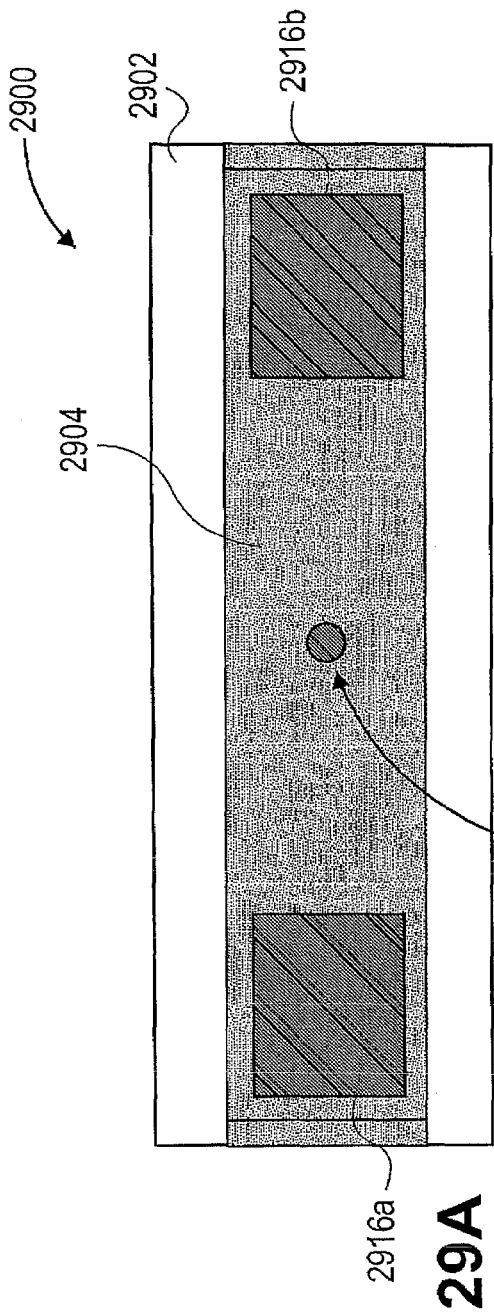
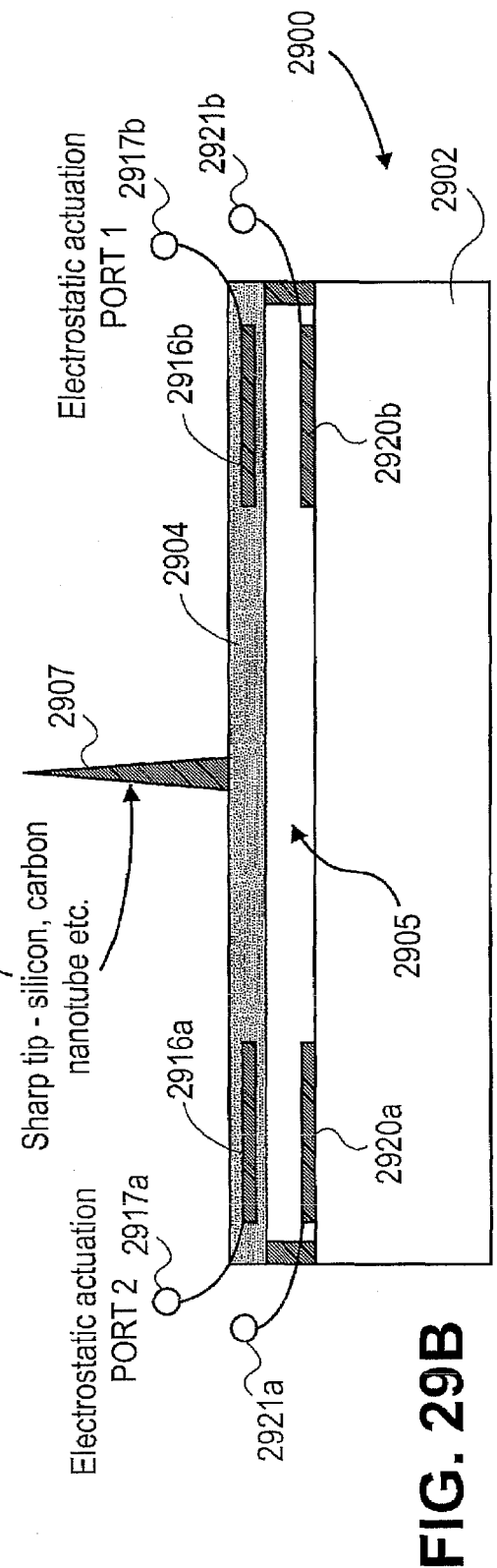
FIG. 29A
FIG. 29B

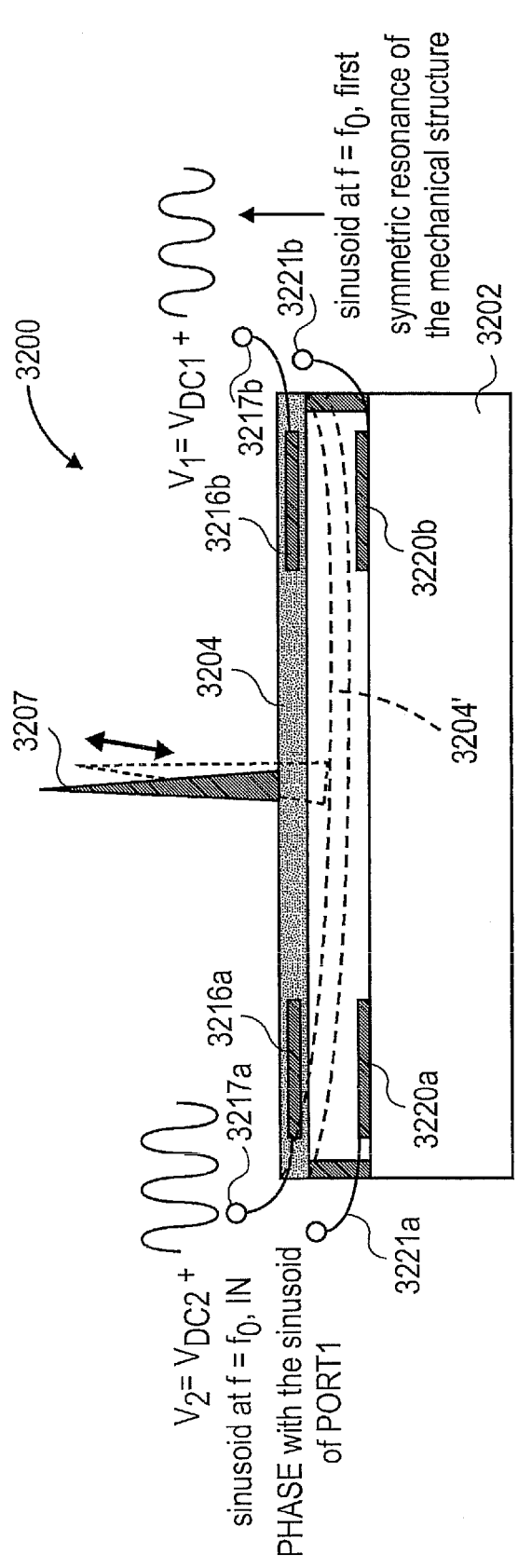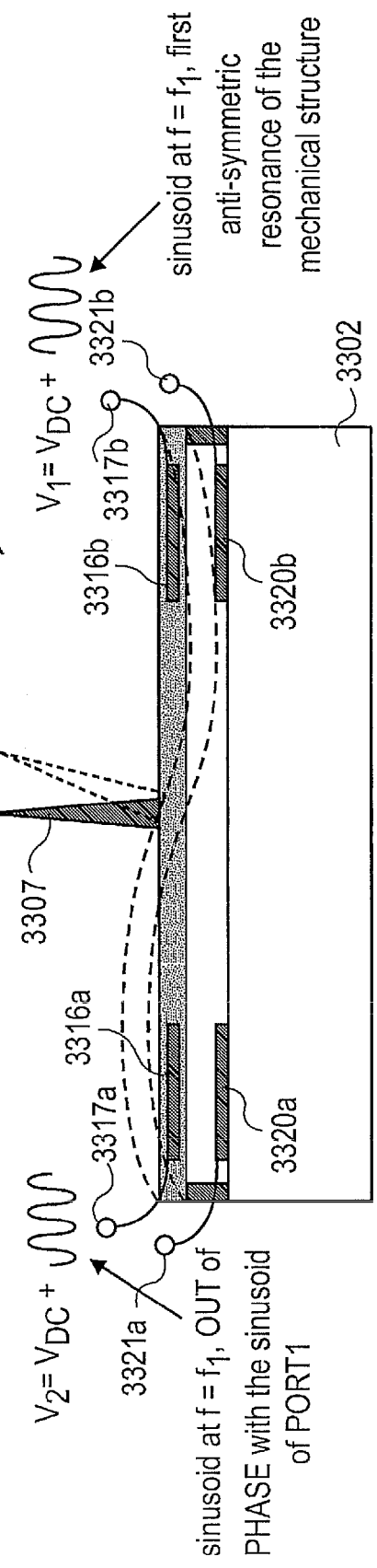
FIG. 32
FIG. 33

THREE-DIMENSIONAL NANOSCALE METROLOGY USING FIRAT PROBE

CROSS-REFERENCE TO RELATED APPLICATIONS

This application claims priority to U.S. Provisional Patent Application Ser. No. 60/730,217 filed on Oct. 25, 2005, the disclosure of which is incorporated by reference herein in its entirety.

FIELD OF THE INVENTION

The subject matter of this application relates to probe microscopy. More particularly, the subject matter of this application relates to methods and devices for probe and force microscopes with sensors having improved sensitivity.

BACKGROUND OF THE INVENTION

Conventional atomic force microscope (AFM) and its variations have been used to probe a wide range of physical and biological processes, including mechanical properties of single molecules, electric and magnetic fields of single atoms and electrons. Moreover, cantilever based structures inspired by the AFM have been a significant driver for nanotechnology resulting in chemical sensor arrays, various forms of lithography tools with high resolution, and terabit level data storage systems. Despite the current rate of success, the AFM needs to be improved in terms of speed, sensitivity, and an ability to generate quantitative data on the chemical and mechanical properties of the sample. For example, when measuring molecular dynamics at room temperature, the molecular forces need to be measured in a time scale that is less than the time of the thermal fluctuations to break the bonds. This requires a high speed system with sub-nanoNewton and sub-nanometer sensitivity.

Current cantilever-based structures for AFM probes and their respective actuation methodologies lack speed and sensitivity and have hindered progress in the aforementioned areas. Imaging systems based on small cantilevers have been developed to increase the speed of AFMs, but this approach has not yet found wide use due to demanding constraints on optical detection and bulky actuators. Several methods have been developed for quantitative elasticity measurements, but the trade-off between force resolution, measurement speed, and cantilever stiffness has been problematic especially for samples with high compliance and high adhesion. Cantilever deflection signals measured during tapping mode imaging have been inverted to obtain elasticity information with smaller impact forces, but complicated dynamic response of the cantilever increases the noise level and prevents calculation of the interaction forces. Arrays of AFM cantilevers with integrated piezoelectric actuators have been developed for parallel lithography, but complex fabrication methods have limited their use.

Most of the scanning probe microscopy techniques, including tapping mode imaging and force spectroscopy, rely on measurement of the deflection of a microcantilever with a sharp tip. Therefore, the resulting force data depend on the dynamic properties of the cantilever, which shapes the frequency response. This can be quite limiting, as mechanical structures like cantilevers are resonant vibrating structures and they provide information mostly only around these resonances. For example, in tapping mode imaging it is nearly impossible to recover all the information about the tip-sample interaction force, since the transient force applied at each tap cannot be observed as a clean time signal.

Moreover, conventional methods of imaging with scanning probes can be time consuming while others are often destructive because they require static tip-sample contact. Dynamic operation of AFM, such as the tapping-mode, greatly reduces shear forces during the scan. However, the only free variable in this mode, the phase, is related to the energy dissipation and it is difficult to interpret. Further, the inverse problem of gathering the time-domain interaction forces from the tapping signal is not easily solvable due to complex dynamics of the AFM cantilever. Harmonic imaging is useful to analyze the sample elastic properties, but this method recovers only a small part of the tip-sample interaction force frequency spectrum.

Thus, there is a need to overcome these and other problems of the prior art associated with probe microscopy.

SUMMARY OF THE INVENTION

In accordance with an embodiment of the invention, there is a force sensor for a probe based instrument. The force sensor can comprise a detection surface and a flexible mechanical structure disposed a first distance above the detection surface so as to form a gap between the flexible mechanical structure and the detection surface, wherein the flexible mechanical structure is configured to deflect upon exposure to an external force, thereby changing the first distance.

According to another embodiment of the invention, there is a force sensor structure. The force sensor structure can comprise a cantilever and a force sensor positioned on a free end of the cantilever. The force sensor can comprise a gap formed by a detection surface at the free end of the cantilever and at least one sidewall for positioning a flexible mechanical structure a first distance from the detection surface.

According to another embodiment of the invention, there is a force sensor unit. The force sensor unit can comprise a force sensor and a detector. The force sensor can comprise a detection surface and a flexible mechanical structure positioned a distance above the detection surface to form a gap, the flexible mechanical structure configured to deflect upon exposure to an external stimuli. The detector can be configured to detect deflection of the flexible mechanical structure.

According to another embodiment of the invention, there is another force sensor. The force sensor can comprise a substrate comprising an optical port having an optical axis, a reflective diffraction grating positioned along the optical axis and positioned a distance from the optical port, and a cantilever positioned a distance from the substrate. The cantilever can comprise a fixed end in contact with the substrate, a free end positioned a distance from the diffraction grating, wherein a portion of the free end is positioned along the optical axis, and a probe tip in contact with the free end of the cantilever.

It can be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 5A shows a cross-sectional schematic diagram of another exemplary force sensor in accordance with the present teachings.

FIG. 5B is a graph plotting cantilever motion versus time for an exemplary force sensor in accordance with the present teachings.

FIG. 5C is a graph plotting flexible mechanical structure grating-distance versus time for an exemplary force sensor in accordance with the present teachings.

FIG. 29A shows a top schematic diagram of an exemplary force sensor structure with multiple integrated actuators accordance with the present teachings.

FIG. 29B shows a cross-sectional schematic diagram of a portion of the force sensor structure shown in FIG. 29A in accordance with the present teachings.

FIG. 32 shows a side schematic diagram of a linear oscillation of the force sensor in accordance with the present teachings.

FIG. 33 shows a side schematic diagram of a lateral oscillation of the force sensor in accordance with the present teachings.

DESCRIPTION OF THE EMBODIMENTS

Figure 1A:
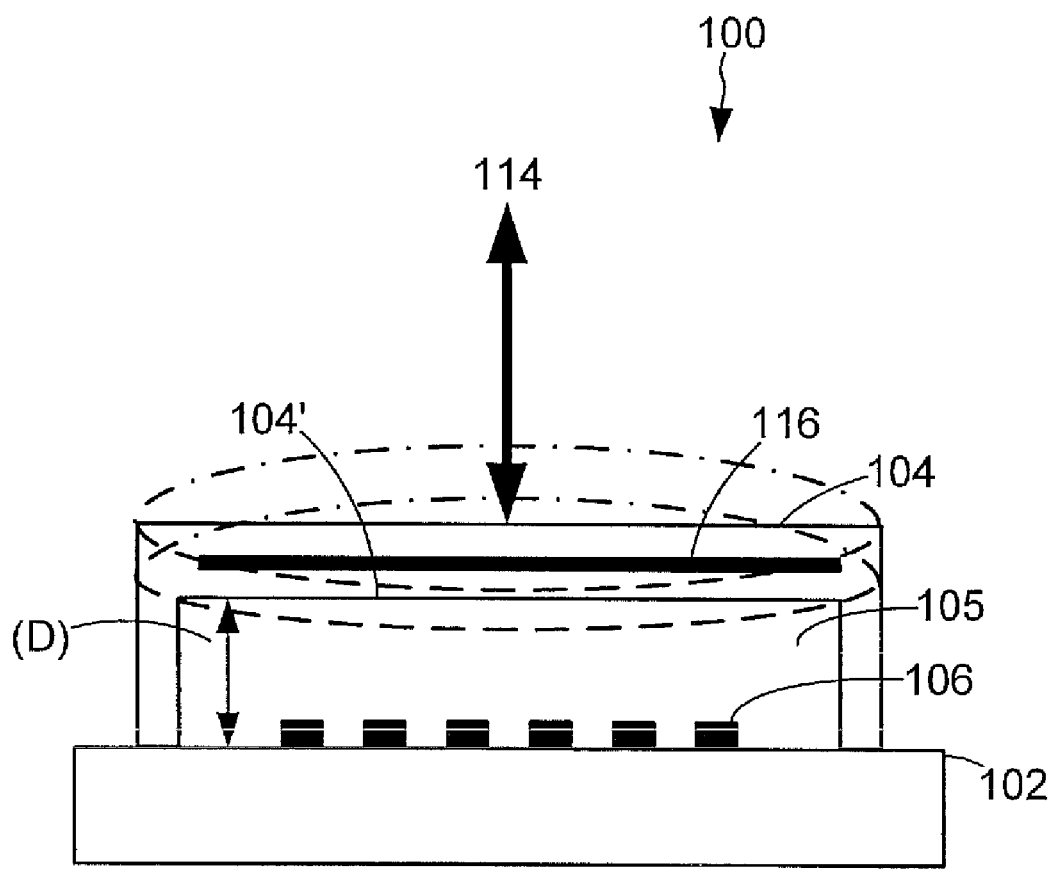
FIG. 1A shows a cross-sectional schematic diagram of an exemplary force sensor in accordance with the present teachings.

In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, not to be taken in a limited sense.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

According to various embodiments there is a force sensor for use in, for example, probe based instruments, such as probe microscopy and structure manipulation. The force sensor can comprise a detection surface, a flexible mechanical structure, and a gap between the detection surface and the flexible mechanical structure. The force sensors can also comprise a tip in contact with the flexible mechanical structure.

Force sensors described herein can eliminate the corruption of utility, such as measurement information, that can arise from a cantilever. These force sensors can also be used as actuators to apply known forces, providing clean and valuable elasticity information data on surfaces, biomolecules, and other materials. Moreover, these force sensors can be integrated on cantilevers and can be compatible with existing AFM systems while providing accurate tip displacement and also act as "active tips".

According to various embodiments, a displacement measurement can be made using a flexible mechanical structure, such as a membrane, a diaphragm, a cantilever, a clamped-clamped beam, a flexible structure comprising multiple flexible elements partially or totally fixed at one end on a substantially rigid surface and connected at a point so as to form a symmetry axis. These flexible mechanical structures can be micro-machined. These flexible mechanical structures can have uniform or non-uniform cross sections to achieve desired static and dynamic deflection characteristics. For example, the vibration modes that are symmetric and anti-symmetric with respect to the symmetry axis can be used to detect forces in different directions. These flexible mechanical structures can be made of metals such as gold, aluminum, or a semiconductor such as single crystal silicon or polycrystalline silicon, or dielectric materials such as silicon nitride, silicon oxide, or a polymer such as SU-8, or they can be a composite structure of metallic, semiconducting, polymer, or dielectric materials. While not intending to be so limited, measurements can be made to detect, for example: localized forces, such as, a force experienced by a tip contacting the flexible mechanical structure; surface topography using for example, a flexible mechanical structure with an integrated tip contacting a surface; a flexible mechanical structure with an integrated tip in close proximity of a surface or substance; and forces between a reactive substance, such as a molecule, bound to the flexible mechanical structure and another reactive substance, such as a molecule, bound on a close by structure such as a tip.

According to various embodiments, the detection surface can be a surface of a rigid substrate, or a part of a rigid substrate, with an optically reflective diffraction grating, a part of a rigid substrate with a reflective and/or electrically conductive diffraction grating for optical interferometric detection and electrostatic actuation, a part of a rigid substrate with electrically conductive members for electrostatic actuation and capacitive detection, a surface of a rigid substrate with a semi-transparent layer for optical interferometry. In some cases the detection surface can be a surface of a deformable mechanical structure such as a membrane, clamped-clamped beam or a cantilever. The rigidity of the mechanical structure with the detection surface can be substantially higher than the flexible mechanical structure of the force sensor. The detection surface can contain conductive and dielectric portions to have electrical isolation between actuation and detection electrodes. In some cases, the deformable detection surface can be actuated and therefore it can contain a separate electrode or piezoelectric film for actuation purposes. Still further, in some cases the detection surface can form a substrate.

According to various embodiments, displacement can be measured using interferometric techniques or capacitive techniques. For example, a grating, such as that used in a diffraction based optical interferometric method or any other optical interferometric method such as, for example, Fabry-Perot structures, an example of which is described in U.S. patent application Ser. No. 10/704,932, filed Nov. 10, 2003, which is incorporated herein by reference in its entirety, can be used. Capacitive measurements can use techniques used to monitor capacitance, such as that used in capacitive microphones.

The flexible mechanical structure dimensions and materials can be adjusted to have desired compliance and measurement capabilities to make static and dynamic measurements with sufficient bandwidth. The overall shape of the flexible mechanical structure can be circular, square, or any other suitable shape. Typical lateral dimensions can be from 1 µm to 2 mm, flexible mechanical structure thickness can be from 10 nm to 3 µm, and the gap can be from 1 nm to 10 µm. In some embodiments the gap can be as large as 1 mm. The flexible mechanical structure material can comprise, for example, aluminum, gold, silicon nitride, silicon, silicon oxide, or polysilicon or can be a composite structure of metallic, semiconducting, and dielectric materials. The gap can be sealed or partially sealed for applications in liquids, or it can be open for vacuum and atmospheric measurements.

For some force measurements, a soft cantilever may not be required. Using the output from the force sensors in a feedback loop, one can use an external actuator to individually adjust the tip-flexible mechanical structure, tip-sample distances. According to various embodiments, the flexible mechanical structure can be electrostatically actuated to apply desired forces. According to various embodiments, force sensors described herein can be attached to a cantilever to form a force sensor structure. Further, the force sensor structure can be combined with a detector to form a force sensor unit that can be used in a probe based instrument.

FIG. 1A shows a cross-sectional schematic diagram of an exemplary force sensor 100 in accordance with the present teachings. The force sensor 100 comprises a detection surface 102 and a flexible mechanical structure 104. The flexible mechanical structure 104 can be disposed distance (D) above the detection surface so as to form a gap 105 between the flexible mechanical structure 104 and the detection surface 102. The flexible mechanical structure can be configured to move to a new position 104' upon exposure to external stimuli 114, such as a force. Moreover, the force sensor 100 can include elements configured to detect changes in the distance (D). Still further, the force sensor 100 can be actuated to affect the distance (D) using, for example, bottom electrode 106, such as a grating, and a top electrode 116, both of which are described in more detail below.

The detection surface 102 can be made of a material transparent to predetermined wavelengths of light. For example, the detection surface can be made from silicon oxide, such as quartz. The overall shape of the flexible mechanical structure 104 can be circular, square, or any other suitable shape. Typical diameters of flexible mechanical structure 104 can range from about 5 µm to about 2 mm and the thickness of flexible mechanical structure 104 can be from about 10 nm to about 10 µm. The flexible mechanical structure can be a micro-machined material that can comprise, for example, aluminum, gold, silicon nitride, silicon oxide, or polysilicon.

According to various embodiments, the distance (D) of gap 105 can be from about 50 nm to about 50 µm. Moreover, the gap 105 can be sealed for applications in liquids, or it can be open for vacuum and atmospheric measurements. In some embodiments, the gap can be formed by the flexible mechanical structure and can be supported over the detection surface by at least one sidewall. Movement of the flexible mechanical structure, or displacement measurements, can be made, for example using a grating as described below, which uses a diffraction based optical interferometric method or any other optical interferometric method or a capacitive method, such as in that used in capacitive microphones, can be used for detection. According to various embodiments, grating periods of the grating 106 can range from about 0.5 µm to about 20 µm. The incident light can be from the UV (with wavelengths starting at about 0.2 µm) to IR (with wavelengths starting at about 1.5 µm).

Figure 1B:
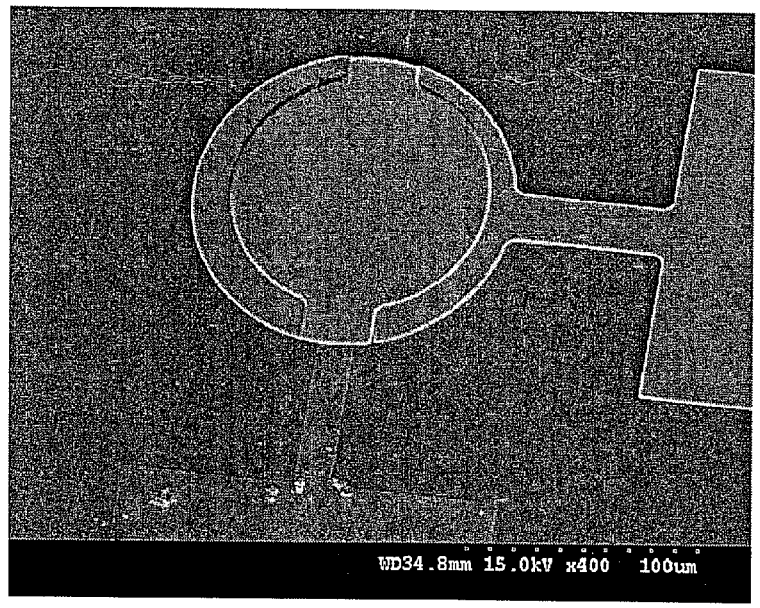
FIG. 1B shows a scanning electron microscope (SEM) picture of an exemplary force sensor in accordance with the present teachings.
Figure 1C:
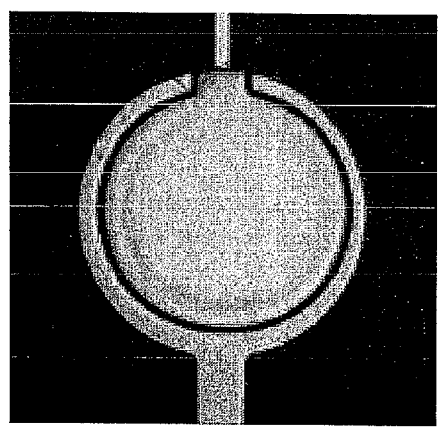
FIG. 1C shows a photograph of a top down view of a force sensor in accordance with the present teachings.
Figure 1D:
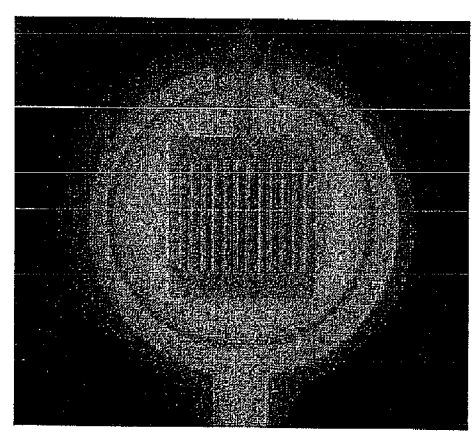
FIG. 1D shows a photograph of a bottom up view of a force sensor in accordance with the present teachings.

FIGS. 1B-1D show various perspective views of exemplary force sensors. For example, FIG. 1B shows a view using a scanning electron microscope (SEM) of the sensor 100. FIG. 1C is a top down photographic view of the force sensor 100 and shows flexible mechanical structure 104. FIG. 1D is a photographic view of the force sensor 100 as seen by passing light through the transparent detection surface 102 and shows grating 106 positioned under the flexible mechanical structure 104.

Figure 1E:
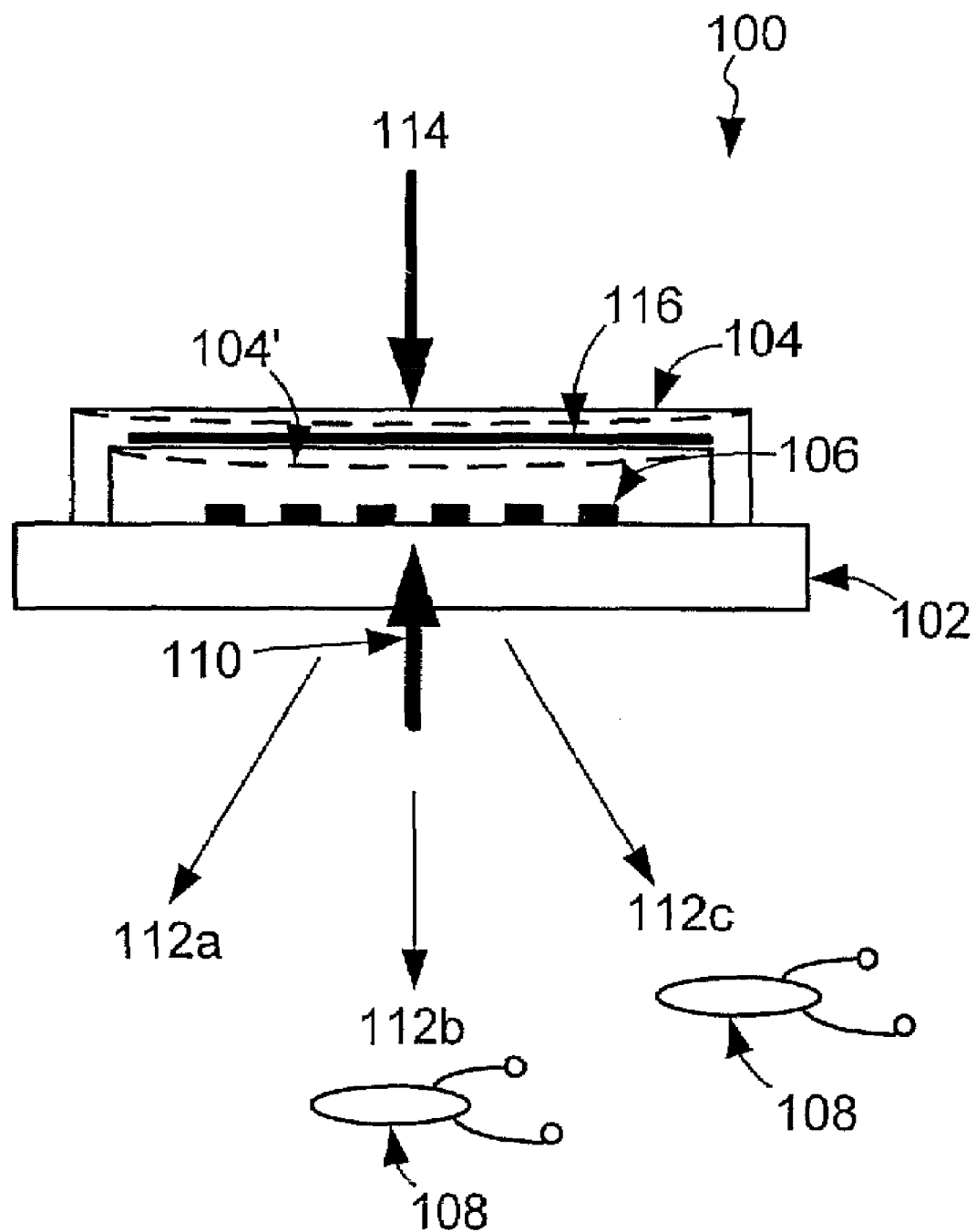
FIG. 1E shows a cross-sectional schematic diagram of another exemplary force sensor in accordance with the present teachings.

According to various embodiments, the force sensor 100 can also include a grating 106, as shown in FIG. 1E. In FIG.

1E, a beam of light 110 can be directed through the detection surface 102 to impinge on the flexible mechanical structure 104 and the grating 106. According to various embodiments, the beam of light 110 can be directed at the detection surface 102 at an angle, such as, in the range of, for example ±10° away from normal to the detection surface 102. A portion of the flexible mechanical structure 104 can be reflective such that light 110 can be reflected from the flexible mechanical structure 104 and another portion can be reflected by the grating 106. As a result, different diffraction orders with different intensity levels can be generated as the light passes through the grating 106 depending on the gap thickness.

For example, FIG. 1E shows first diffraction order light 112 reflected from the grating 106 and the flexible mechanical structure 104. The diffracted light 112 can be detected by a detector 108. It is to be understood that alternatively, the detectors can be used to detect changes in capacitence due to changes in the gap 105.

As shown in FIG. 1E, a stimuli 114, such as a force, can be applied to the flexible mechanical structure 104. The stimuli 114 causes the flexible mechanical structure 104 to bend, or flex, shown as 104'. According to various embodiments, the flexible mechanical structure 104 can bend in various directions, such as toward the detection surface 102 or away from the detection surface 102. Bending the flexible mechanical structure 104 causes the thickness (D) of the gap 105 shown in FIG. 1A to change.

When using a beam of light, the light 110 is reflected in a different direction when the flexible mechanical structure is in the bent position 104' than when the flexible mechanical structure is in the rest position 104. Further, light 110 reflected from the bent flexible mechanical structure 104' interacts differently with the grating 106 to produce changes in the intensity of different diffraction orders, shown in FIG. 1E as 112a-112c. The detectors 108 can then detect the intensity of the diffracted light output from the grating 106. This provides a robust, micro-scale interferometer structure. Generally, information obatined from the detectors 108 can be used to determine the stimuli 114, such as the amout of force, applied to the flexible mechanical structure 104. This determination can be done using a computer processor (not shown) or other various techniques as will be known to one of ordinary skill in the art. Also shown in FIG. 1E is a top electrode 116 that can cooperate with, for example grating 106, to serve as an actuator, as will be desribed in detail below.

According to various embodiments the detector 108 can be a photo-detector, such as a silicon photodiode operated in photovoltaic or reverse biased mode or another type of photodetector sensitive in the wavelength range of the light source. Moreover, the light 110 can be a coherent light source such as a laser. Exemplary light sources can include, but are not limited to, helium neon type gas lasers, semiconductor laser diodes, vertical cavity surface emitting lasers, light emitting diodes.

Figure 2A:
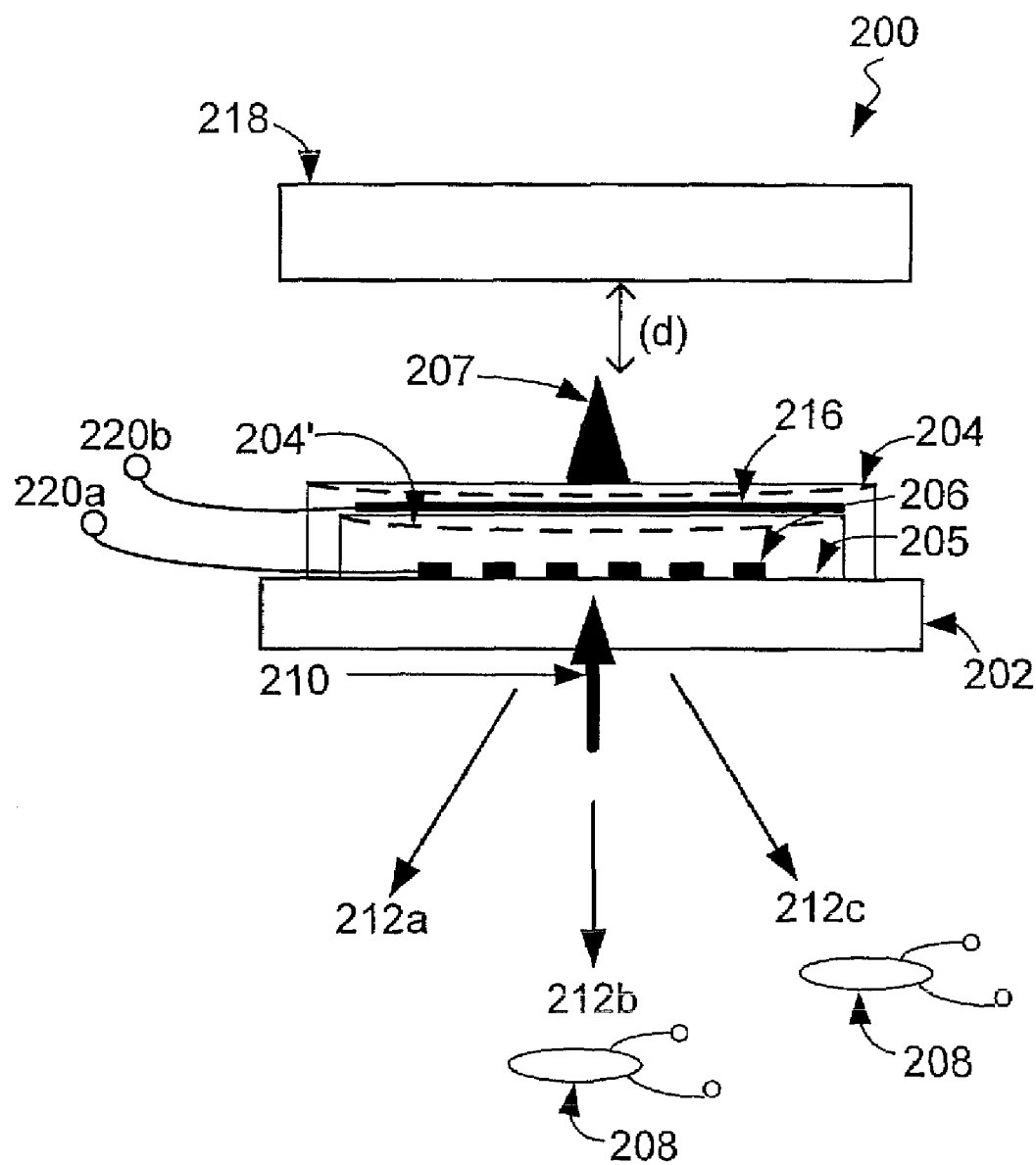
FIG. 2A shows a cross-sectional schematic diagram of another exemplary force sensor in accordance with the present teachings.

FIG. 2A shows a cross-sectional schematic diagram of another exemplary force sensor 200 in accordance with the present teachings. The force sensor 200 comprises a detection surface 202, a flexible mechanical structure 204, a grating 206, and a tip 207. In some embodiments, the force sensor 200 can also include a top electrode 216. Moreover, the grating 206 can be covered with a dielectric layer to prevent electrical shorting in case of flexible mechanical structure collapse.

Generally, the force sensor 200 can be used to manipulate structures, such as atoms, molecules, or micro-electromechanical systems (MEMs) or to characterize various material properties of a sample 218. For example, the topography of the sample 218 can be determined by moving the sample 218 in a lateral direction across the tip 207. It is also contemplated that the sample 218 can remain stationary and the tip 207 can be moved relative to the sample 218. Changes in height of the sample 218 are detected and cause the tip 207 to move accordingly. The force on the tip 207 caused by, for example the tip motion, can cause the flexible mechanical structure 204 to bend, or flex as shown by 204'. Light 210 can also be directed through detection surface 202 to impinge on the flexible mechanical structure 204. The light 210 is reflected from the flexible mechanical structure and diffracted by the grating 206. As the tip 207 applies force to the flexible mechanical structure, the thickness of the gap 205 changes. This can cause the reflected light to diffract differently than if the flexible mechanical structure were in its un-bent position. Thus, different diffraction orders of intensity can change depending on the gap thickness.

After passing through the grating 206 the diffracted light 212a-c can be detected by the detectors 208. The output from the detectors 208 can be used in a feedback loop to direct an external actuator (not shown) to adjust the tip-flexible mechanical structure position (i.e., the gap height), and thus the tip-sample distance (d). The flexible mechanical structure 204 can be electrostatically actuated to apply desired forces or to adjust the flexible mechanical structure position (i.e., the gap height), and thus the tip-sample distance (d) by biasing electrodes 220a and 220b attached to the grating 206 and the top electrode 216, respectively. Although two detectors are shown in FIG. 2A, one of ordinary skill in the art understands that one or more detectors can be used.

According to various embodiments, the force sensor 200 can form an integrated phase-sensitive diffraction grating structure that can measure the flexible mechanical structure 204 and/or tip 207 displacement with the sensitivity of a Michelson interferometer. The displacement of the tip 207 due to stimuli acting on it can be monitored by illuminating the diffraction grating 206 through the transparent detection surface 202 with a coherent light source 210 and the intensity of the reflected diffraction orders 212a-c can be recorded by the detectors 208 at fixed locations. The resulting interference curve is typically periodic with $\lambda/2$, where $\lambda$ is the optical wavelength in air. According to an exemplary embodiment, the displacement detection can be within the range of about $\lambda/4$ (167.5 nm for $\lambda=670$ nm) in the case of a fixed grating 206. However, the detection surface 202 and the grating 206 can be moved by suitable actuators to extend this imaging range. Furthermore, the grating 206 can be located not at the center but closer to the clamped edges of the flexible mechanical structure to increase the equivalent detectable tip motion range. In the case of a microscope, the "active" tip can be moved by electrostatic forces applied to the flexible mechanical structure 204 using the diffraction grating 206 as an integrated rigid actuator electrode. In some applications, this actuator can be used to adjust the tip 207 position for optimal displacement sensitivity to provide a force feedback signal to an external actuator moving the transparent detection surface 202.

In some embodiments, such as applications requiring high speeds, this integrated actuator can be used as the only actuator in the feedback loop to move the tip 207 with a speed determined by the flexible mechanical structure 204 dynamics in liquids, air, and vacuum.

Figure 2B:
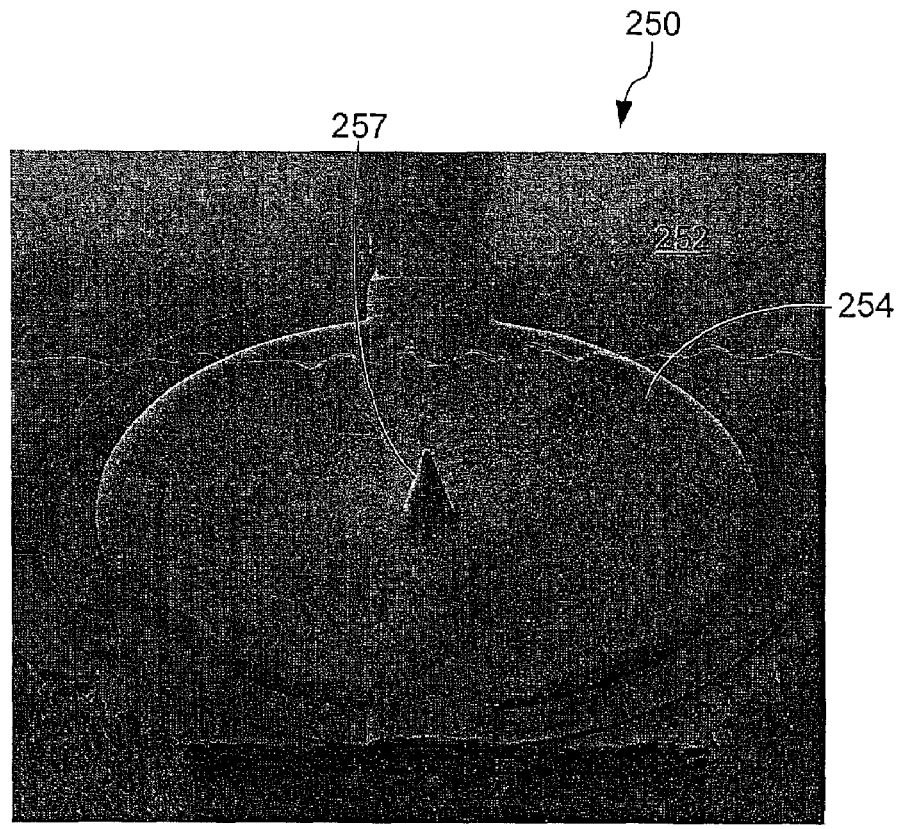
FIG. 2B shows a scanning ion beam image of another exemplary force sensor in accordance with the present teachings.
Figure 2C:
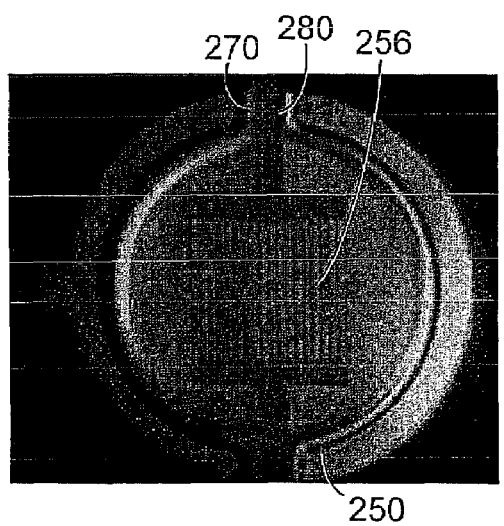
FIG. 2C shows photograph of a bottom up view of a force sensor in accordance with the present teachings.
Figure 2D:
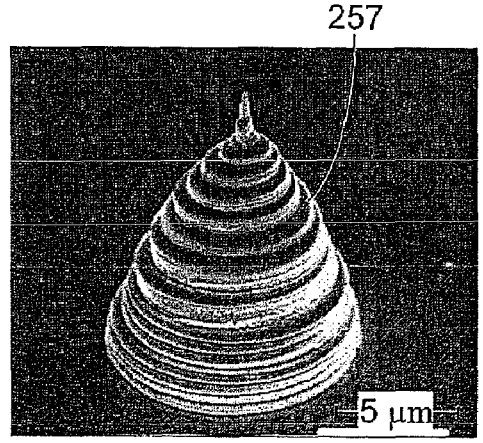
FIG. 2D shows a scanning electron microscope (SEM) picture of a force sensor tip in accordance with the present teachings.

FIG. 2B shows a focused ion beam (FIB) micrograph of a force sensor 250 according to an exemplary embodiment. In the embodiment shown in FIG. 2B, the flexible mechanical structure 254 is 0.9 µm thick and is made from aluminum. Moreover, the flexible mechanical structure 254 is 150 µm in diameter and it can be formed by sputter deposition on a 0.5 mm thick quartz substrate over a 1.4 μm thick photoresist sacrificial layer. FIG. 2C shows the optical micrograph of the flexible mechanical structure 254 from the backside as seen through the substrate 252. The grating 256 and the electrical connections 270 can be seen as well as the darker spot at the position of the tip 257 at the middle of the flexible mechanical structure 254. In FIG. 2C, the 90 nm thick aluminum grating 256 can be formed by evaporation over a 30 nm thick titanium or titanium nitride adhesion layer and then patterned to have a 4 μm grating period with 50% fill factor. A 220 nm thick oxide layer can be deposited over the grating 256 using plasma enhanced chemical vapor deposition. In this case, the subsequent flexible mechanical structure stiffness was measured to be approximately 133N/m using a calibrated AFM cantilever and the electrostatic actuation range was approximately 470 nm before collapse. The tip 257 was fabricated out of platinum using an FIB. The process involved ion beam assisted chemical vapor deposition of platinum using methyl platinum gas where molecules adsorb on the surface but only decompose where the ion beam interacts. The tip 257, with a radius of curvatures down to 50 nm on the aluminum flexible mechanical structures 254, was fabricated with this method. An SEM micrograph of a typical tip with 70 nm radius of curvature is shown in FIG. 2D.

According to various embodiments, the force sensor 200 can have a compact integrated electrostatic actuator, where the electric field between the grating electrode 206 and the top electrode 216 is contained within the gap 205. This structure can be replicated to form planar arrays of sensors, as described in more detail below, with good electrical and mechanical isolation. With a suitable set of flexible mechanical structure and electrode materials, the device can be operated in a dielectric or conductive fluid. According to various embodiments, the electrostatic forces may act only on the probe flexible mechanical structure 204. As such, the actuation speed can be quite fast. Therefore, combined with array operations, the force sensor can be used in probe applications that call for high speeds.

Figure 3A:
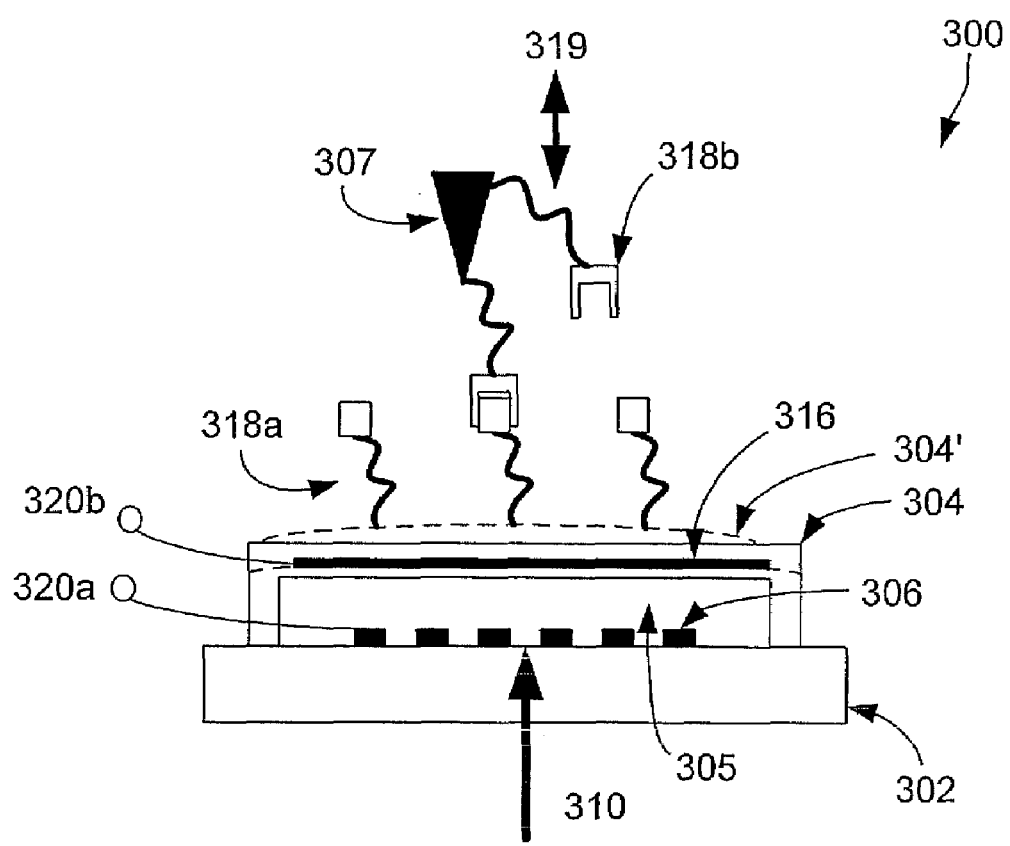
FIG. 3A shows a cross-sectional schematic diagram of another exemplary force sensor in accordance with the present teachings.
Figure 3B:
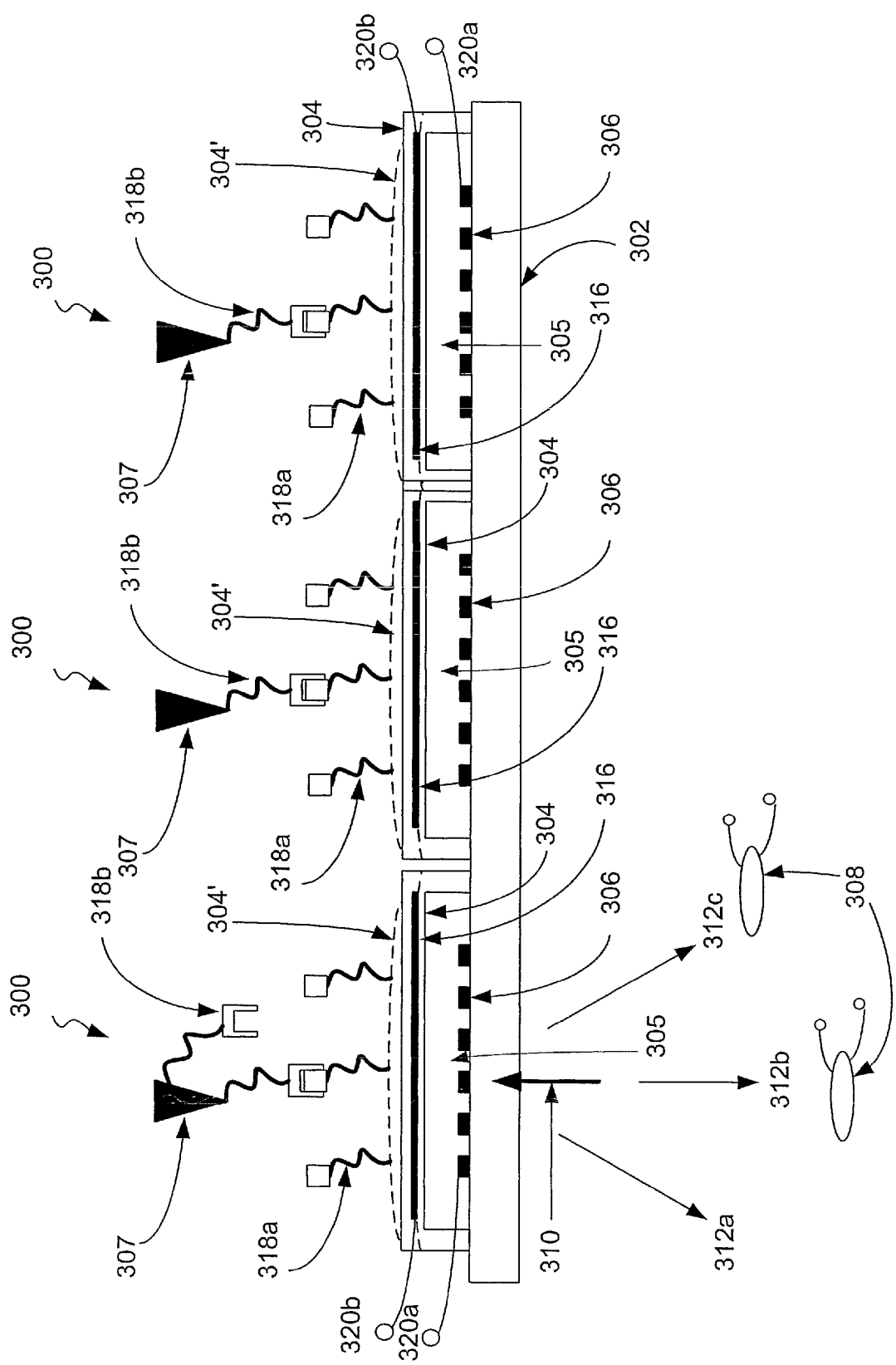
FIG. 3B shows a cross-sectional schematic diagram of another exemplary force sensor in accordance with the present teachings.

FIG. 3A depicts a schematic diagram of another exemplary force sensor 300 and FIG. 3B depicts a schematic diagram of multiple force sensors 300 working in concert in accordance with the present teachings. The embodiments shown in FIGS. 3A and 3B can be used as force sensors for parallel force measurements, such as in the case of biomolecular mechanics. The force sensors 300 shown in FIGS. 3A and 3B can comprise a detection surface 302 and a flexible mechanical structure 304. The force sensor 300 can also comprise a grating 306 and a tip 307 positioned above the flexible mechanical structure 304. According to various embodiments, reactive substances, such as molecules, including biomolecules, labeled 318a and 318b in FIGS. 3A and 3B can be attached to flexible mechanical structure 304 and tip 307, respectively. In some embodiments, the force sensors 300 can also include a top electrode 316. FIG. 3B shows the force sensors 300 in contact with a single detection surface 302. However, in some cases more than one force sensor 300 can contact a separate detection surface so as to be controlled separately.

The force sensors 300 can be used to characterize various material properties of the reactive substance. For example, biomolecular bonding can be determined by moving the tip 307 contacted by a reactive substance, including, for example, inorganic molecules and/or organic molecules, such as biomolecules, over the force sensors 300. It is also contemplated that the tip 307 can remain stationary and the force sensors 300 can be moved relative to the tip 307. The reactive substance on the flexible mechanical structure 304 can be attracted to the reactive substance on the tip 307. A stimuli 319, such as a force, light, or temperature, on, for example, the force sensor 300 or the tip 307 caused by, for example the molecular attraction, a light source, or a temperature source, can cause the flexible mechanical structure 304 to bend, or flex as shown by 304'. Light 310 can also be directed through detection surface 302 to impinge on the flexible mechanical structure. The light 310 is reflected from the flexible mechanical structure and then diffracted by the grating 306. As the stimuli displaces the flexible mechanical structure, the thickness of the gap 305 changes. This can cause the reflected light to diffract differently than if the flexible mechanical structure were in its un-bent position. Thus, different diffraction order intensities can be generated as the light passes through the grating 306 depending on the gap thickness. After passing through the grating 306 the diffracted light 312a-c can be detected by the detectors 308. The output from the detectors 308 can be used in a feedback loop to direct an external actuator (not shown) to adjust the flexible mechanical structure position (i.e., the gap height), and thus the tip-sample distance (d). According to varoius embodiments, the flexible mechanical structure 304 can be electrostatically actuated to apply desired forces by biasing electrodes 320a and 320b attached to the grating 306 and the top electrode 316, respectively.

By using a variety of techniques disclosed herein, displacements from 1 mm down to $1 \times 10^{-6}$ Å/$\sqrt{Hz}$ or lower can be measured. As such, forces from 1N down to 1 pN can be detected with 10 kHz bandwidth with an effective spring constant of the sensor flexible mechanical structure from about 0.001N/m to about 1000N/m at its softest point. These mechanical parameters can be achieved by micro-machined flexible mechanical structures, such as MEMs microphone flexible mechanical structures. Therefore, using flexible mechanical structure surfaces and tips functionalized by interacting reactive substances, as shown in FIGS. 3A and 3B, force spectroscopy measurements can be performed in parallel using optical or electrostatic readout.

For example, in the case of rupture force measurements, the reactive substance, such as a molecule, is pulled and if the bond is intact, the flexible mechanical structure is also pulled out while the displacement, i.e., applied force, is measured. With the bond rupture, the flexible mechanical structure comes back to rest position. The force sensor flexible mechanical structures can be individually actuated to apply pulling forces to individual molecules and measuring their extensions allowing for array operation.

Figure 4A:
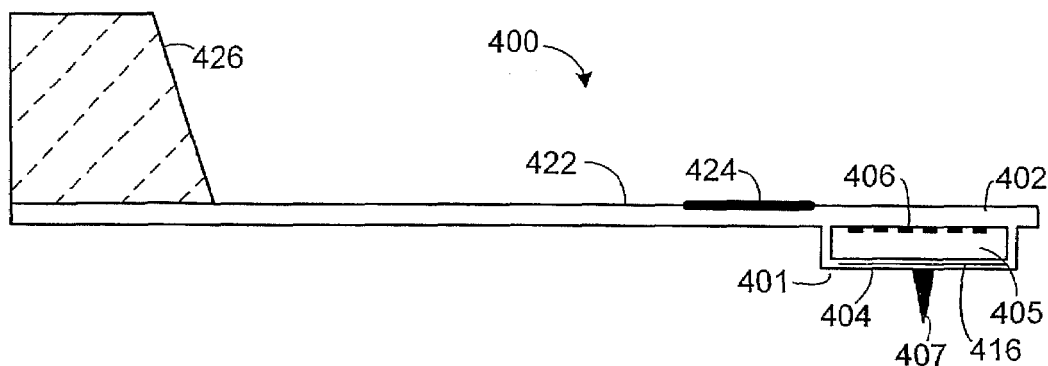
FIG. 4A shows a cross-sectional schematic diagram of another exemplary force sensor in accordance with the present teachings.
Figure 4B:
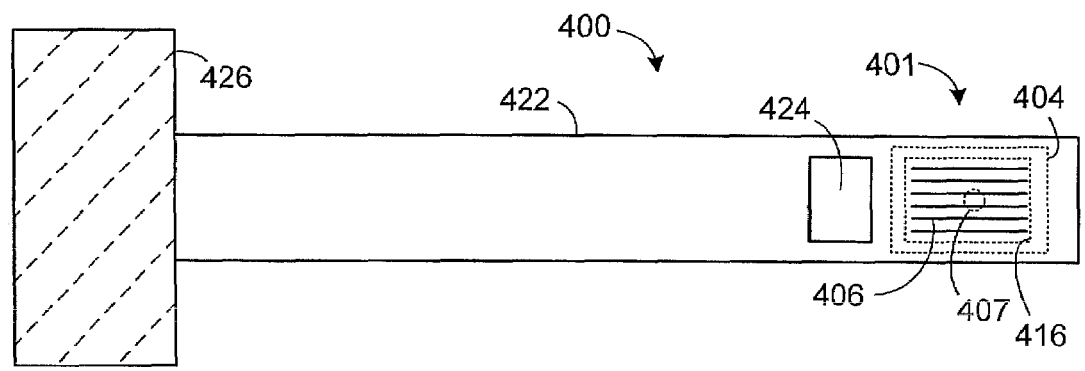
FIG. 4B shows a bottom up view perspective of another exemplary force sensor in accordance with the present teachings.
Figure 4C:
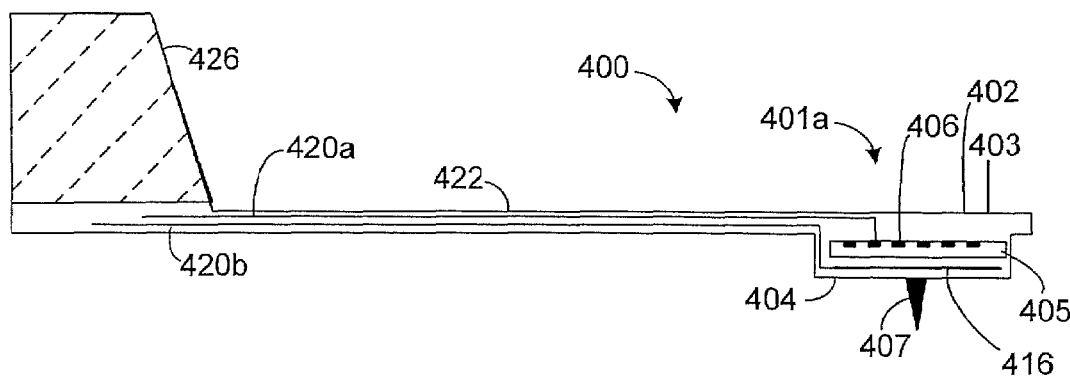
FIG. 4C shows a cross-sectional schematic diagram of an exemplary force sensor in accordance with the present teachings.

FIGS. 4A-4C depict perspective views of exemplary embodiments in accordance with the present teachings. FIG. 4A depicts a cross-sectional schematic diagram and FIG. 4B depicts a view of the top of a force sensor structure 400. The force sensor structure 400 can include a cantilever 422, such as that used in AFM, and a force sensor 401 positioned on the free end of the cantilever 422. The force sensor 401 can comprise a detection surface 402, a flexible mechanical structure 404, a gap 405, grating 406, a tip 407, and a top electrode 416. Further, the cantilever 422 can be transparent to allow for optical readout of the deflection of the flexible mechanical structure, which has an integrated tip for imaging. The cantilever 422 can be made of materials similar to those of the detection surface material, described above. Indeed, in some embodiments, the cantilever 422 alone can comprise the detection surface 402. Alternatively, the detection surface can be a substrate formed on the cantilever. In some embodiments the cantilever 422 can also include a reflector 424.

The cantilever 422 can be used to provide periodic tapping impact force for tapping mode imaging to apply controlled forces for contact mode or molecular pulling experiments. Because the flexible mechanical structure 404 can be stiffer than the cantilever 422 and can be damped by immersion in a liquid, the measurement bandwidth can be much larger than the cantilever 422. Furthermore, optical readout of the diffraction orders can directly provide tip displacement because the diffraction orders can be generated by the grating 406 under the flexible mechanical structure 404.

According to various embodiments, the reflector 424 can be used to beam bounce to find cantilever deflection for feedback, if needed. In some cases, the tip-force sensor output can provide the real force feedback signal. The cantilever 422 and the flexible mechanical structure 404 dimensions can be adjusted for the measurement speed and force requirements.

FIG. 4C depicts a cross-sectional schematic diagram of another exemplary force sensor 401a in accordance with the present teachings. The force sensor 401a is similar to the force sensor 401 but includes a thicker base region 403 of the detection surface 402. Also shown in FIG. 4C are electrical connections 420a and 420b that contact the grating 406 and the top electrode 416, respectively. The electrical connections can be used to provide electrostatic actuation or capacitive detection.

FIG. 5A shows an embodiment of a force sensor structure 500 according to the present teaching for tapping mode imaging. In addition to topography, tapping mode can also provide material property imaging and measurement if the tip-sample interaction forces can be accurately measured. The disclosed force sensor structure solves a significant problem for this mode of operation. For example, when the cantilever is vibrated using a sinusoidal drive signal, shown in FIG. 5B, and it is brought to a certain distance to the surface, the tip starts to contact the surface during a short period of each cycle, as shown in FIG. 5C. While the oscillation amplitude is kept constant for topography information, the contact force i.e., the tip-sample interaction force and duration can be related to the material properties of the sample and adhesion forces. With a regular cantilever, the deflection signal can be dominated by the vibration modes of the cantilever, which can significantly attenuate the information in the harmonics. According to various embodiments, the transient force that the tip 507 or the sample 518 experiences at each tap can be measured. Because the force sensors disclosed herein can directly measure the flexible mechanical structure/tip displacement directly using optical interferometry or capacitive measurement, this transient force signal can be obtained. By designing the flexible mechanical structure stiffness, broadband response is possible and short transient force signals can be measured. This situation can be valid in both air and liquids, as the information is independent of the cantilever vibration spectrum.

Figure 6:
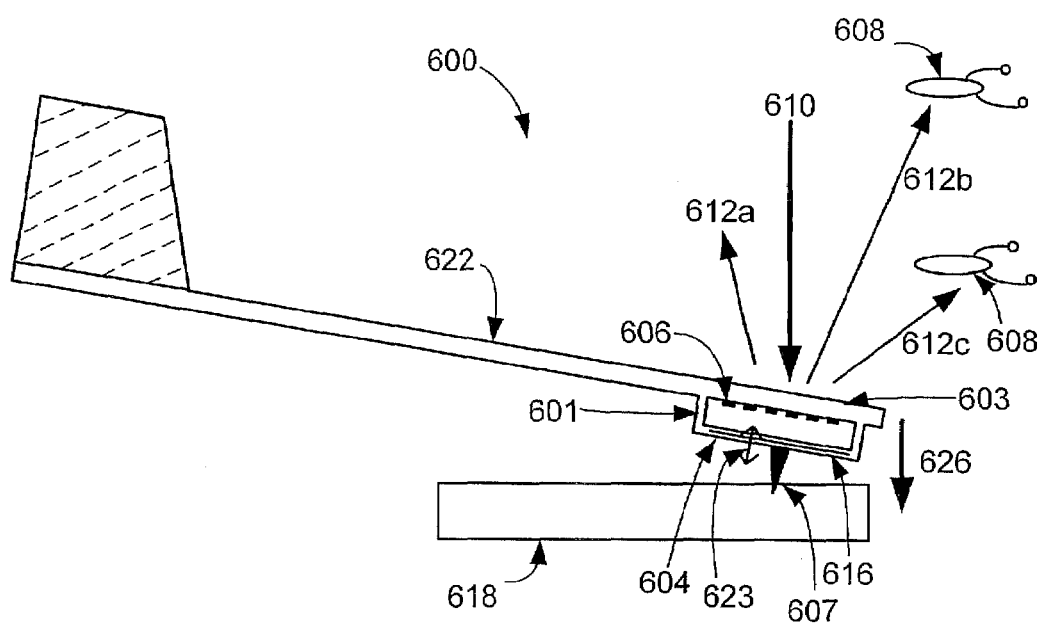
FIG. 6 shows a partial cross-sectional schematic diagram of another exemplary force sensor in accordance with the present teachings.

Using electrically isolated electrodes, the flexible mechanical structure can be actuated so as to have an "active tip". Further the actuated flexible mechanical structure can optimize the optical detection or capacitive detection sensitivity in air or in liquid environments. FIG. 6 shows an application of a force sensor structure 600 comprising a sensor 601 on a cantilever 622 where the tip 607 is active, as shown by arrow 623. In FIG. 6, the active tip 607 can be used to apply known forces to the surface of sample 618 using electrostatic actuation and optical interferometric displacement detection or capacitive displacement detection can be achieved. The tip 607 can be activated, for example, by applying a bias between the grating 606 and the top electrode 616. Further, a DC force, shown by arrow 626, can be used to keep the tip 607 in constant contact with the sample.

Light 610 can be directed to the flexible mechanical structure 604 and the orders 612a-c of light diffracted by the grating 606 can be detected by the detector 608. Similar to the force sensor 401a shown in FIG. 4C, designing the dimensions of the flexible mechanical structure base 603, or choosing the operation frequency at an anti-resonance of the cantilever, the flexible mechanical structure 604 can be moved, and hence the tip 607 can be pushed into the sample 618 by known electrostatic forces. Accordingly, displacements of the flexible mechanical structure 604 can be measured optically or capacitively. Furthermore, in some embodiments there is no need for an active tip on the force sensor. Moreover for optical measurements, the gap between the flexible mechanical structure and the grating can be optimized during fabrication of the force sensor. Thus, there is no need to actively adjust that gap during tapping mode operation as shown in FIG. 6. Similarly for capacitive detection, an electrical connection for detection of capacitance changes can be provided. In that case, the force sensor 601 can be connected to a detection circuit such as used in a capacitive microphone for measuring the force on the tip 607.

The thickness of the base 603 (or the substrate) supporting the flexible mechanical structure 604 can be adjusted to control the operation frequency to insure that the motion of the flexible mechanical structure 604 produces an indentation in the sample surface. This measurement, therefore, directly provides surface elasticity information. According to various embodiments, the frequency of electrostatic actuation can be in the ultrasonic range. Alternatively, a wideband impulse force can be applied and resulting displacements can be detected in the bandwidth of the flexible mechanical structure displacement force sensor. For these applications, it may be desirable to move the higher cantilever vibration mode frequencies away from the first resonance. This can be achieved, for example, by increasing the mass close to the tip of the cantilever, such as by adjusting the thickness, or mass of the base 603. With added mass, the cantilever acts more like a single mode mass spring system and can generate tapping signals without spurious vibrations and can also be effective at a broad range of frequencies.

Figure 7:
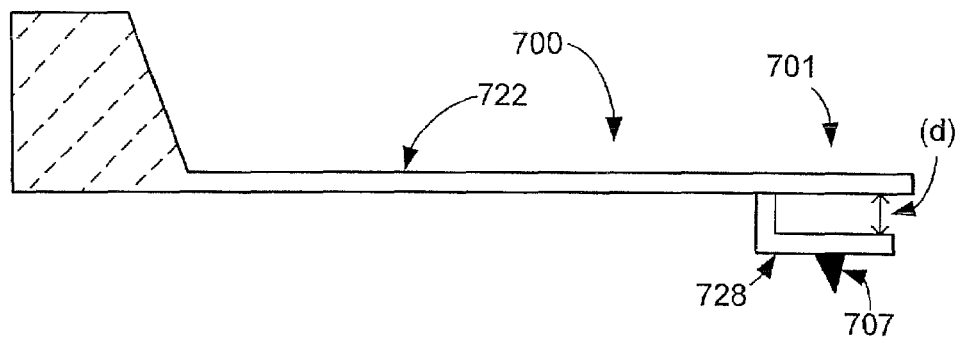
FIG. 7 shows a partial cross-sectional schematic diagram of another exemplary force sensor in accordance with the present teachings.

In general, for tapping mode AFM and UAFM applications a broadband, stiff tip displacement measurement sensor/structure can be integrated into compliant structures, such as regular AFM cantilevers. Although flexible mechanical structures are primarily described here, according to another embodiment, the tip displacement measurement structure can be a stiff beam structure with the same cross-section of the flexible mechanical structure or another stiff cantilever, as shown, for example, in FIG. 7. In FIG. 7, there is a force sensor structure 700, comprising a force sensor 701, a compliant structure 722, a tip 707, and a flexible mechanical structure 728 such as a stiff broadband structure. In this case, the stiff broadband structure 728 can be small cantilever mounted to an end of the compliant structure 722, also a cantilever. The small cantilever 728 can be spaced a distance (d) from the compliant structure 722. The compliant structure 722 can be used to control the impact and/or contact force of the tip 707 mounted to a side of the stiff broadband structure 728. Further, the stiff broadband structure 728 can be used to measure tip displacements. Displacement of the tip 707 can be measured, for example, optically, electrostatically, capacitively, piezoelectrically or piezoresistively.

According to various embodiments, for fast imaging and tapping mode applications, the cantilever can be eliminated. In this case, a fast x-y scan of a sample or the integrated tip can be used with the described sensor/actuator for tapping and detecting forces. The large, fast z-axis motion can be generated, for example, by a piezoelectric actuator that moves the base of the force sensor, which can be a thick, rigid substrate.

Figure 8A:
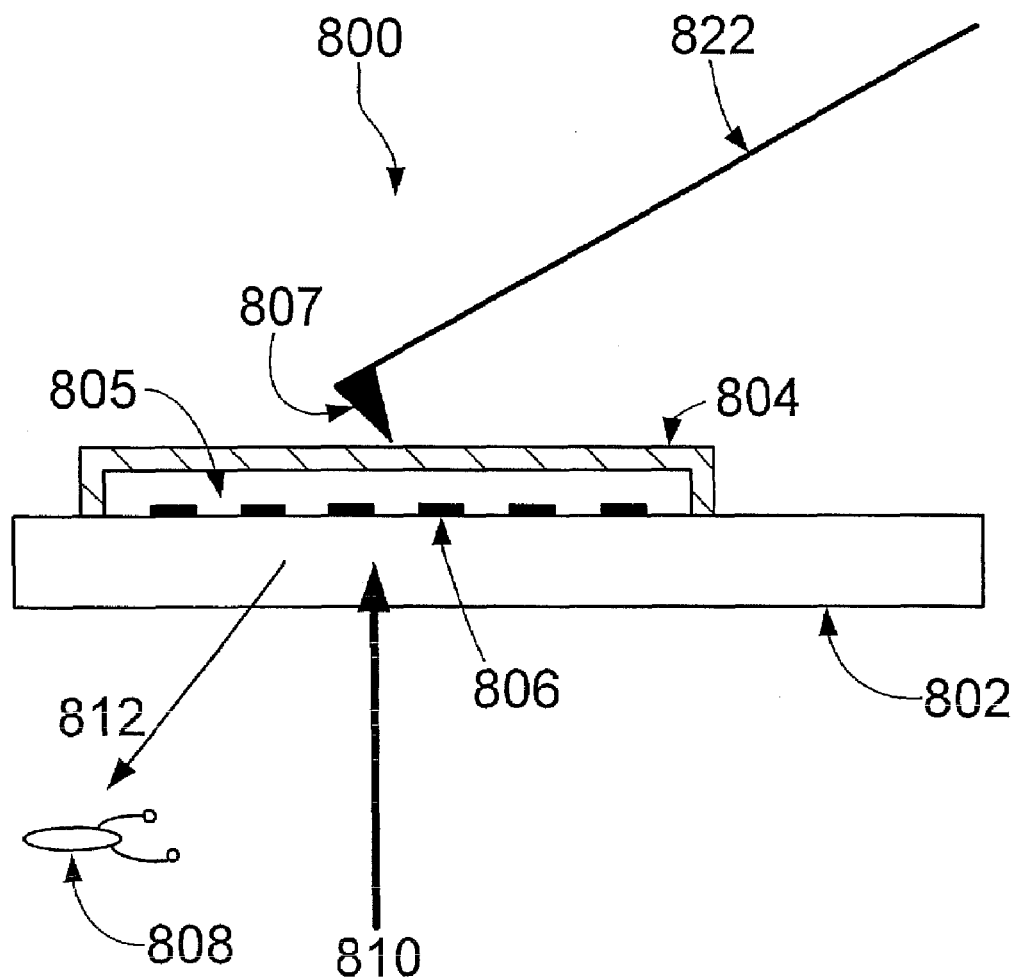
FIG. 8A shows a cross-sectional schematic diagram of an arrangement used to monitor sensitivity of an exemplary force sensor in accordance with the present teachings.

The sensitivity of a force sensor in accordance with the present teachings can be described by the following exemplary embodiment, depicted in FIG. 8A. In FIG. 8A, a rectangular silicon AFM cantilever 822 with a tip 807 is vibrated at 57 kHz above a 150 μm diameter, ~1 μm thick aluminum flexible mechanical structure 804 with an integrated diffraction grating 806. The force sensor 800 flexible mechanical structure 804 is built on a quartz detection surface or substrate 802. A DC bias of 37V is applied to move the flexible mechanical structure 804 to a position of optimal detection sensitivity and the vibrating tip 807 is brought close enough to have tapping mode-like operation with intermittent contact. Diffraction order 812 can be detected by detector 808 when a beam 810 is diffracted by grating 806 upon exiting force sensor 800.

Figure 8B:
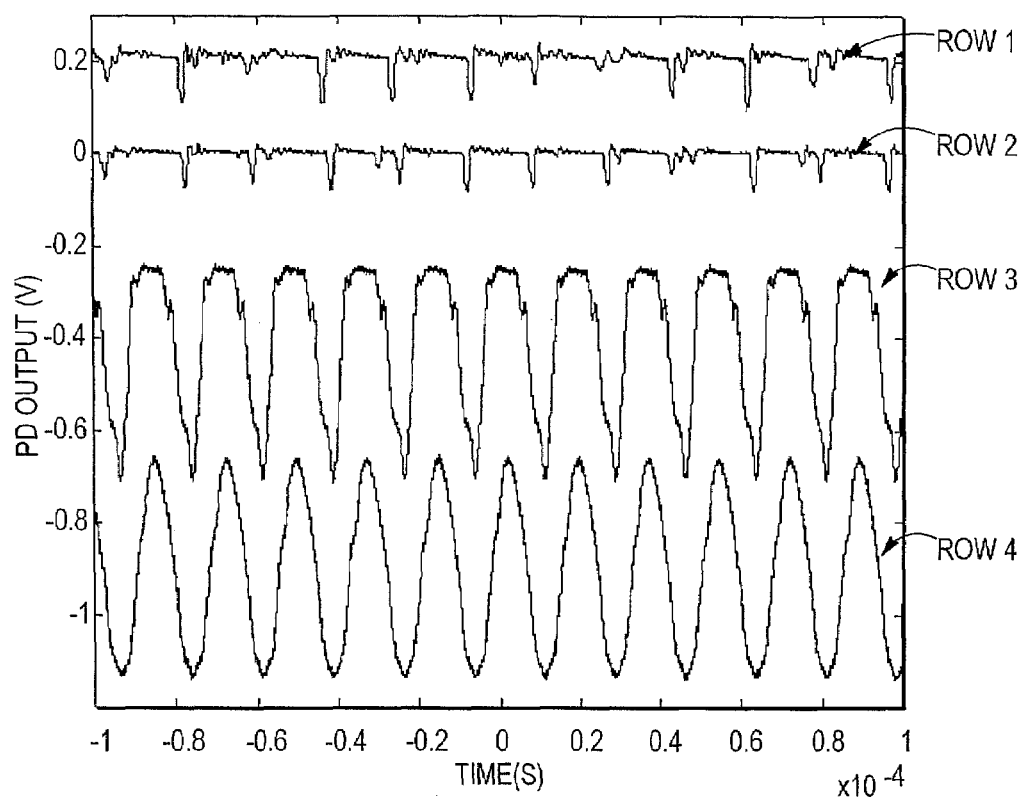
FIG. 8B shows a graph plotting voltage output versus time for a tapping cantilever for a force sensor in accordance with the present teachings.
Figure 8C:
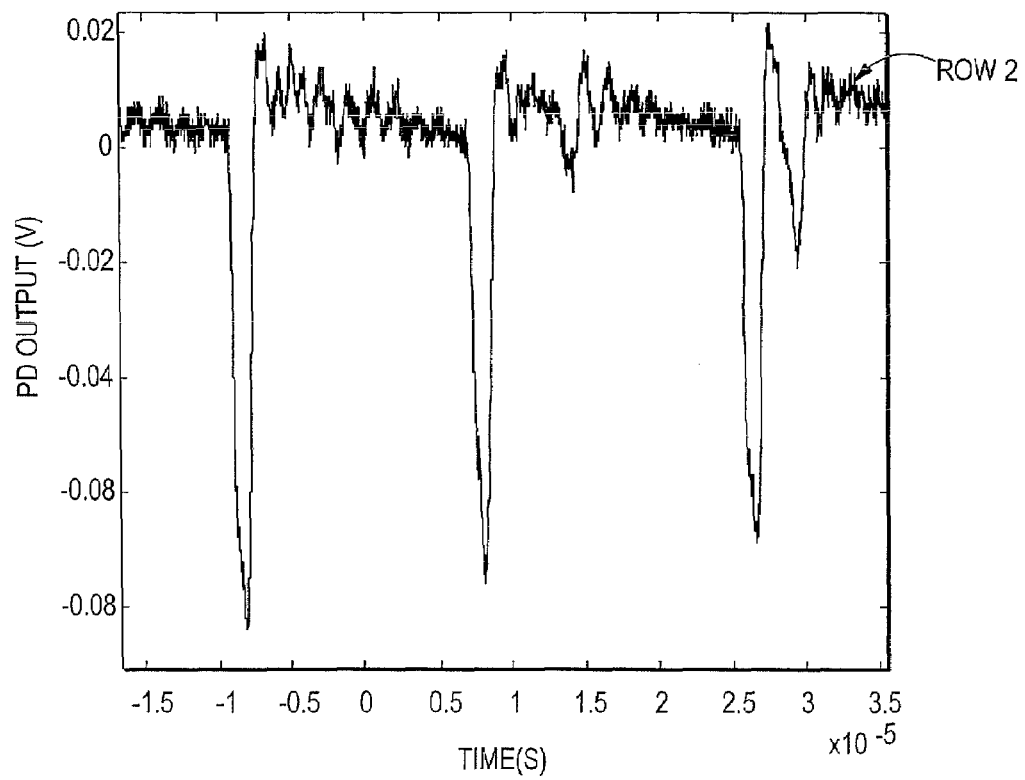
FIG. 8C shows a close up of a portion of the graph shown in FIG. 8B.

The single shot signals collected at this position are shown at the top two rows (Row 1 and Row 2) of the four rows of the graph in FIG. 8B. The bottom graph, in FIG. 8C, shows a zoomed in version of Row 2 of individual taps, where the transient displacement of the flexible mechanical structure due to impact of the tip is clearly seen. If the flexible mechanical structure material were softer or there were a compliant coating on the flexible mechanical structure 804, the measured tap signals would be longer in duration and smaller in amplitude because the tip 807 would spend more time indenting the softer surface while transmitting less force to the flexible mechanical structure 804. Therefore, the tapping force measurement provides elasticity information and this embodiment can be used as a material property sensor for a thin film coating on the flexible mechanical structure.

In addition, when the tip 807 leaves contact, the flexible mechanical structure 804 is pulled away due to adhesion or capillary forces, permitting force spectroscopy measurement methods. When the tip 807 is moved progressively closer, it is in contact with the flexible mechanical structure 804 for a longer duration of each cycle and finally it pushes the flexible mechanical structure 804 down during the whole cycle. Thus, the simple force sensing structures disclosed herein provide information not available by conventional AFM methods and result in more effective tools for force spectroscopy applications.

Figure 9A:
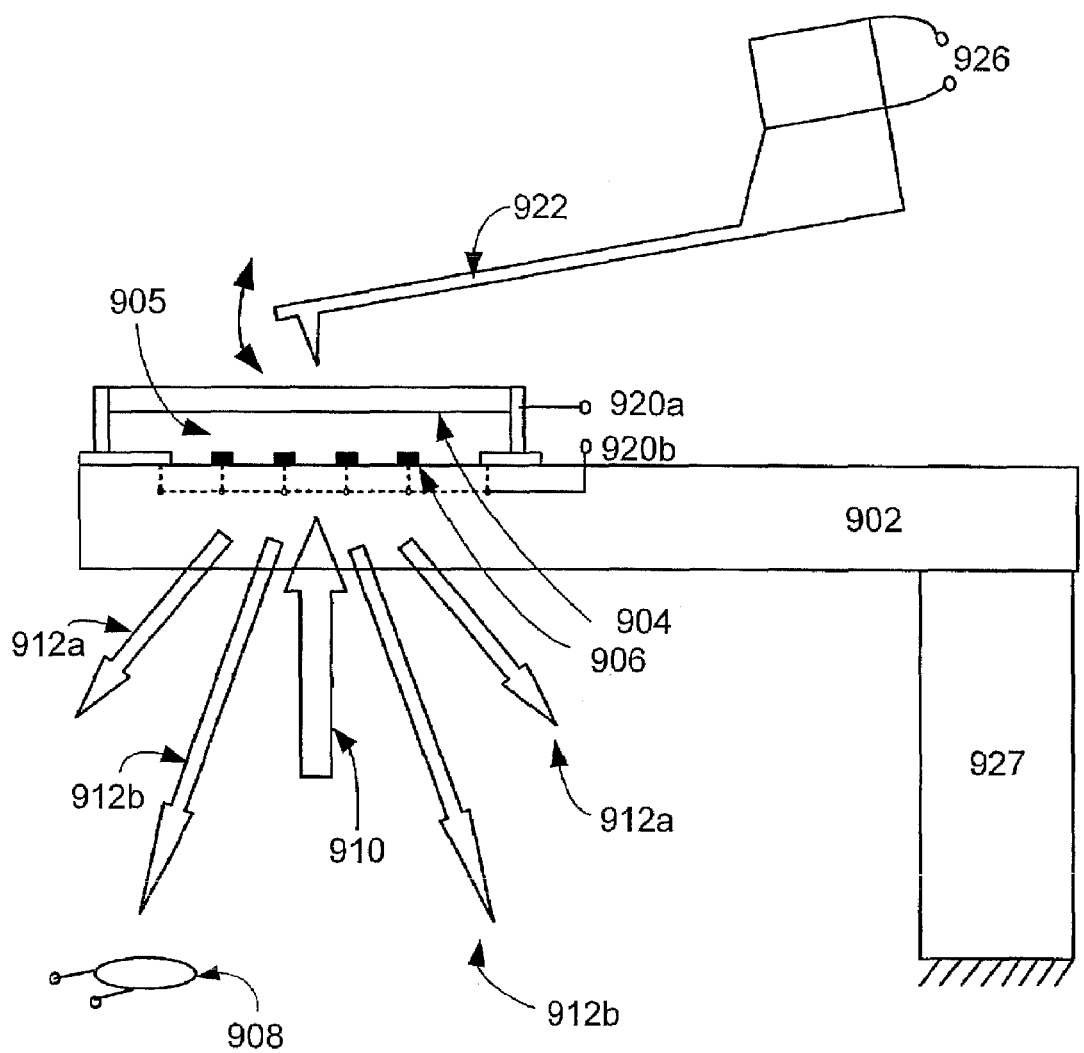
FIG. 9A shows a schematic diagram of another exemplary force sensor in accordance with the present teachings.

The sensitivity of another force sensor in accordance with the present teaching can be described by the following exemplary embodiment, depicted in FIGS. 9A-9H. As shown in FIG. 9A, a quartz substrate 902 with a sensor flexible mechanical structure 904 is placed on a piezoelectric stack transducer 927, which can be used to approach to the tip 907 and obtain force distance curves. The flexible mechanical structure 904 is aluminum and can be 150 μm in diameter, 1 μm thick, and located over a 2 μm gap 905 above the rigid diffraction grating electrode 906. In this case, the grating period is 4 μm. The gap 905 is open to air through several sacrificial layer etch holes (not shown). The grating 906 can be illuminated at 910 through the quartz substrate 902 using, for example, a HeNe laser (λ=632 nm) at a 5° angle away from normal to the substrate. The output optical signal can be obtained by recording the intensity of the $1^{st}$ diffraction order beam 912b.

For measuring the AFM dynamic tip-sample interaction forces, the cantilever 922 can be glued on a piezoelectric AC drive transducer 926 that can drive the cantilever 922 at its resonant frequency. The flexible mechanical structure 904, with a stiffness of approximately 76N/m as measured at the center using a calibrated AFM cantilever 922, can be used. The DC bias on the flexible mechanical structure 904 is adjusted to 27V to optimize the optical detection, and the sensitivity is calibrated as 16 mV/nm by contacting the flexible mechanical structure 904 with a calibrated AFM cantilever 922 and a calibrated piezo driver. In this case, the broadband RMS noise level of the system was about 3 mV (0.18 nm) without much effort to reduce mechanical, laser, or electrical noise.

A force curve can be produced by moving the piezoelectric stack 927 supporting the substrate 902 with a 20 Hz, 850 nm triangular signal and making sure that there is tip-flexible mechanical structure contact during a portion of the signal period. The cantilever 922 can be, for example, a FESP from Veeco Metrology, Santa Barbara, Calif., with k=2.8N/m.

Figure 9B:
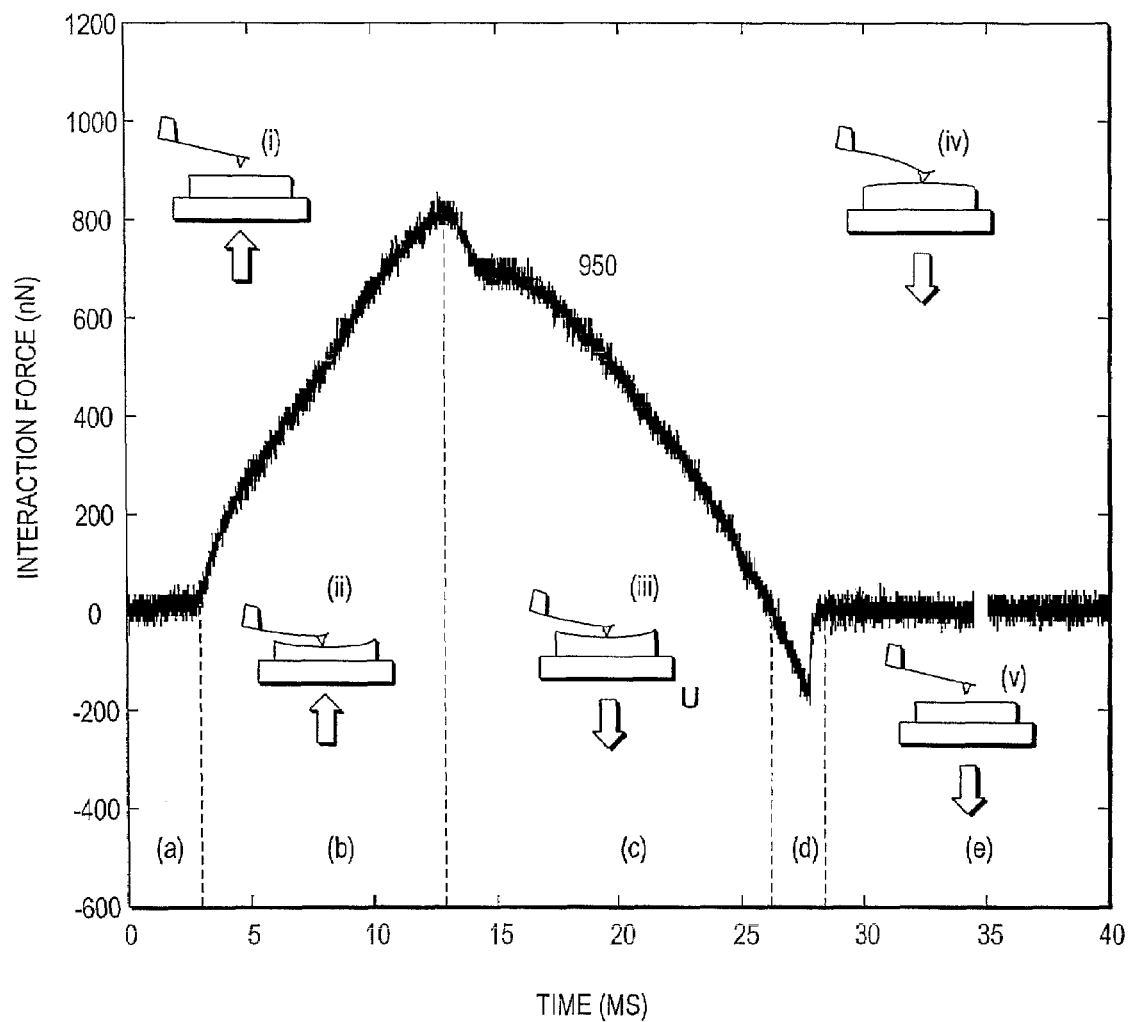
FIG. 9B shows a graph of interaction force versus time for an exemplary force sensor in accordance with the present teachings.

FIG. 9B shows a force curve 950 where the inset drawings (i)-(v) indicate the shape of the cantilever 922 and flexible mechanical structure 904, and the hollow arrow indicates the direction of motion of the piezo stack 927 and the quartz substrate 902. Moreover, the insert drawings (i)-(v) correspond to sections (a)-(e), respectively, of the curve 950. Before measurement, the flexible mechanical structure 904 is at rest, as seen in insert (i) and section (a). Tip-flexible mechanical structure contact happens starting in section (b) at around 3 ms and the tip bends the flexible mechanical structure 904 downwards, as shown in insert drawings (ii) and (iii). Tip-flexible mechanical structure contact continues through section (c) until about 26 ms, which is in section (d). The piezoelectric motion is reversed starting at section (c). Section (d) shows that attractive forces due to adhesion pulls the flexible mechanical structure 904 up, as seen in insert (iv), for 2 ms and then the flexible mechanical structure 904 moves back to its rest position, as seen in insert (v) after a 180 nN jump at the end of the retract section. Curve 950 in section (e) shows the rest position.

Figure 9C:
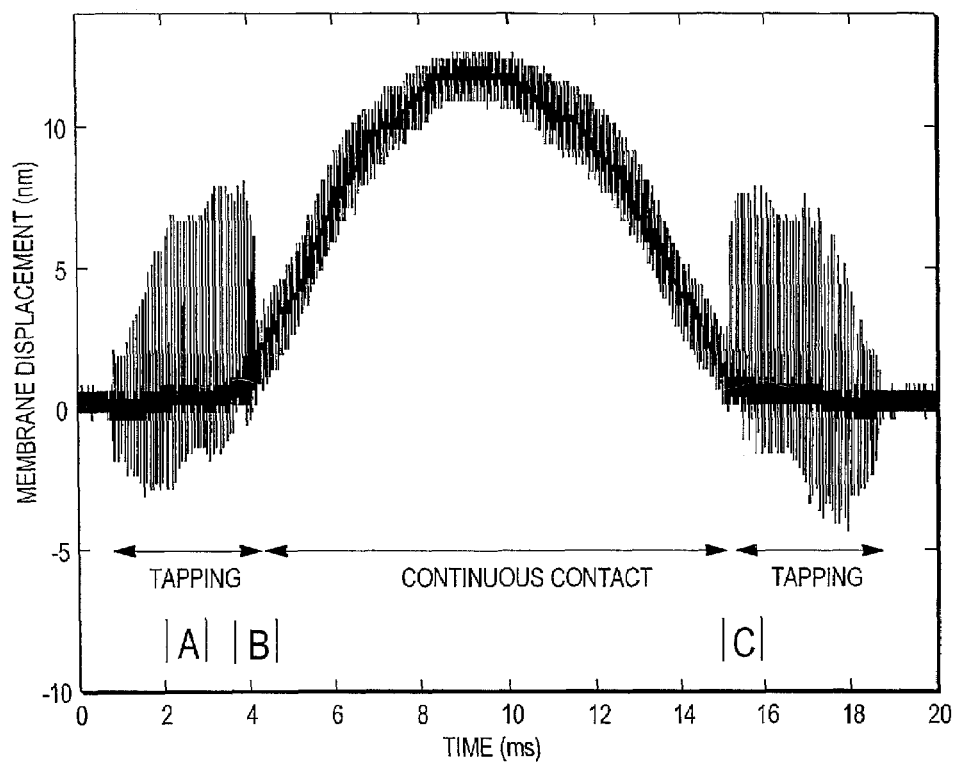
FIGS. 9C-9F show graphs of a flexible mechanical structure displacement versus time for an exemplary force sensor in accordance with the present teachings.

For direct observation of time resolved dynamic interaction forces along the force curve, a similar experiment can be performed while the cantilever 922 is driven into oscillation by applying a sinusoidal signal to the AC drive piezo 926 at 67.3 kHz. The single shot, transient flexible mechanical structure displacement signal 960 obtained during a cycle of the 20 Hz drive signal is shown in FIG. 9C. Dynamic interaction force measurements provide various types of information, as indicated by the various interaction regimes (A)-(C) during the measurement. The data of FIG. 9C is shown expanded in FIGS. 9D-F in the initial tapping region (A), intermittent to continuous contact region (B), and continuous to intermittent contact transition region (C), respectively.

Figure 9D:
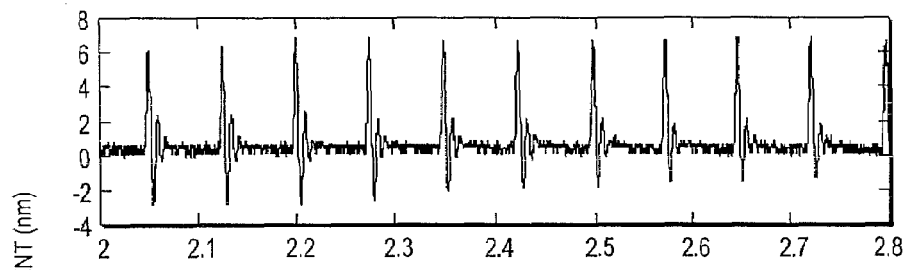
Figure 9E:
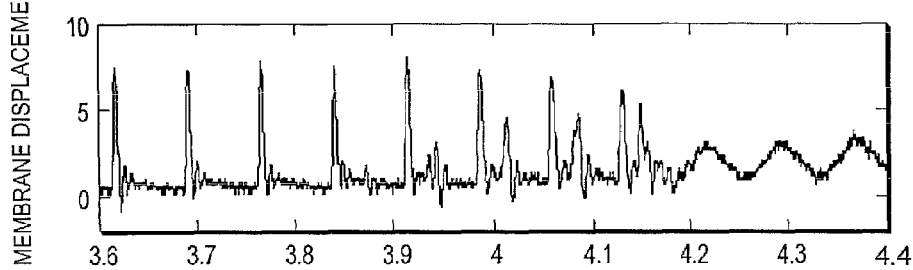
Figure 9F:
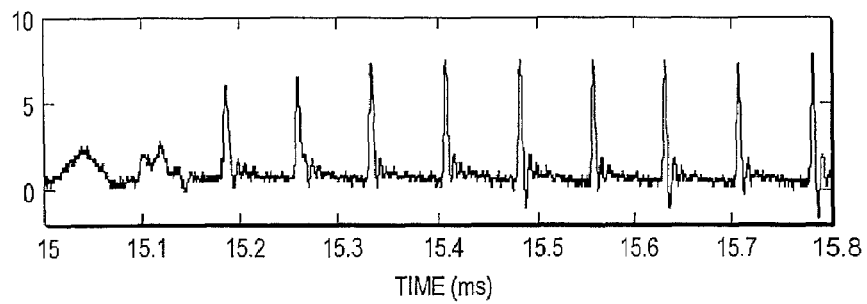

Starting from the left, the cantilever tip 907 is first out of contact with the flexible mechanical structure 904. At around 1 ms it starts intermittent contact (tapping) with the flexible mechanical structure 904 as individual taps are detected, as shown in FIG. 9D. As the cantilever 922 gets closer to the flexible mechanical structure 904, the pulses become unipolar and the distortion is more severe as there are double peaked tap signals when the cantilever 922 gets into contact due to non-linear interaction forces, as shown FIG. 9E. When the tip 907 is in continuous contact, which happens around 4.2 ms, the displacement signal has the periodicity of the drive signal in addition to distortion that can be caused by contact non-linearities and higher order vibration modes of the cantilever 922 with its tip 907 hinged on the flexible mechanical structure 904. Similarly, around 15 ms, the cantilever 922 starts breaking off the flexible mechanical structure surface and tapping resumes, as shown in FIG. 9F. Between 7 ms and 12 ms the curve is not linear.

Individual tapping signals can be filtered by the dynamic response of the flexible mechanical structure 904. In this example, the force sensor was not optimized and the flexible mechanical structure 904 acted as a lightly damped resonator with a resonant frequency at 620 kHz rather than having broadband frequency response that is ideal for fast interaction force measurements. Nevertheless, the transfer function of the flexible mechanical structure 904 can be obtained using, for example, integrated electrostatic actuators, as described herein.

Figure 9G:
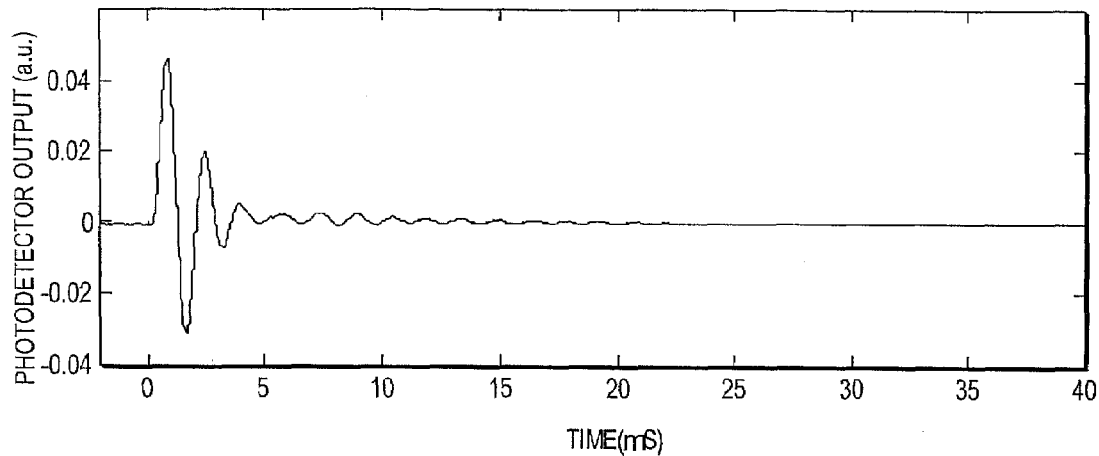
FIGS. 9G-9H show graphs of photo-detector output versus time for an exemplary force sensor in accordance with the present teachings.
Figure 9H:
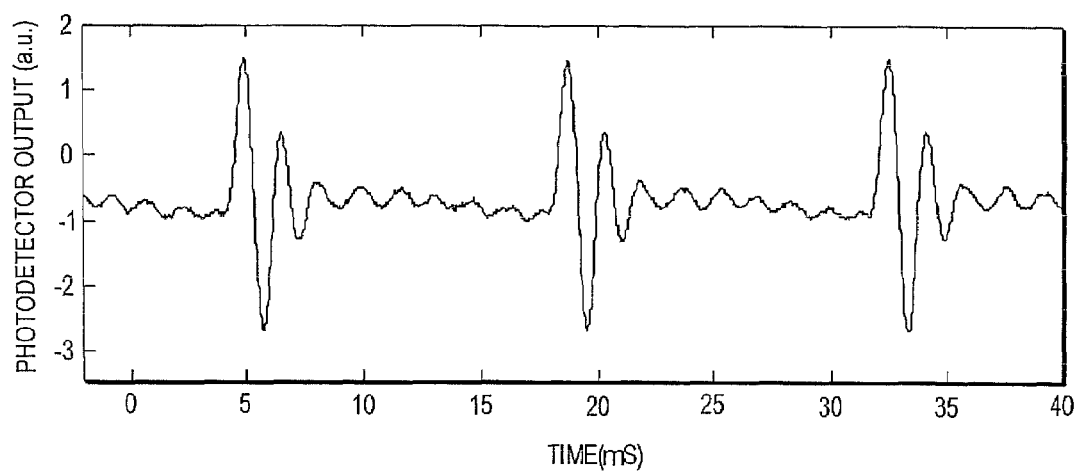

Still further, FIG. 9G shows the measured temporal response of the flexible mechanical structure 904 when a 2V square pulse 100 ns in length is applied in addition to the 27V DC bias at the actuator terminals. Comparing the trace waveform in FIG. 9G with averaged data from individual tap signals shown in FIG. 9H, it can be seen that the stiff cantilever tap is nearly an impulsive force, which can be recovered by inverse filtering.

Thus, according to various embodiments, minimum displacement detection levels down to $10^{-4}$ Å/$\sqrt{Hz}$ can be measured and mechanical structures with spring constants in the 0.001 to 10N/m range can be built that can monitor force levels in the pico-Newton range. These sensitivity levels can make it useful for a wide range of probe microscopy applications including quantitative interaction force measurements, fast imaging in liquids and in air, and probe arrays for imaging, lithography, and single molecule force spectroscopy.

While FIGS. 8A-9H are examples of sensitivity testing made by applying a force from a tip to the force sensor, similar sensitivities can be achieved when a tip is mounted to the force sensor and the force sensor is used to characterize a sample.

Figure 10A:
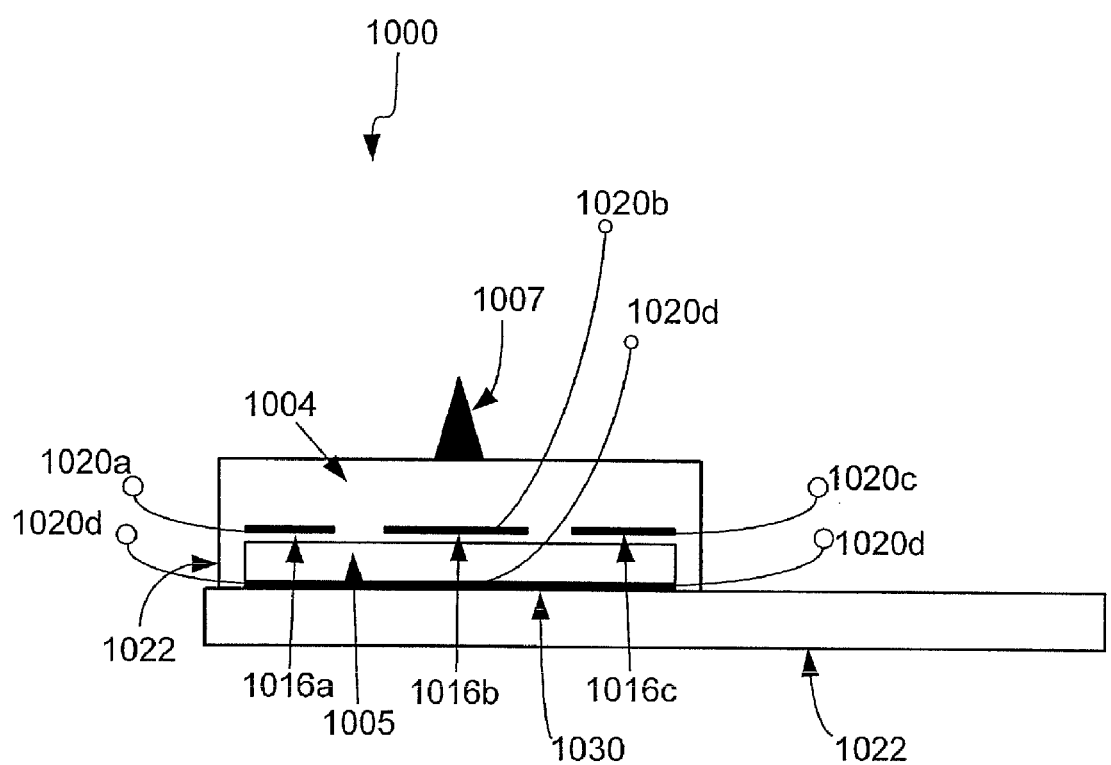
FIG. 10A shows a cross-sectional schematic diagram of another exemplary force sensor in accordance with the present teachings.
Figure 10B:
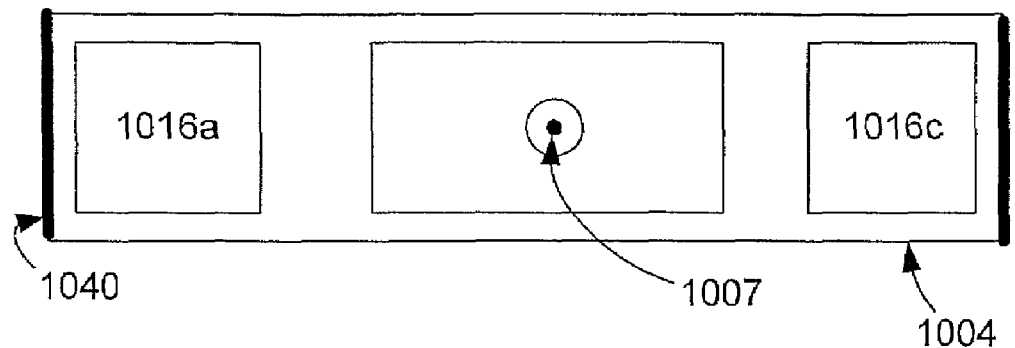
FIG. 10B shows a cross-sectional schematic diagram of another exemplary force sensor in accordance with the present teachings.
Figure 10C:
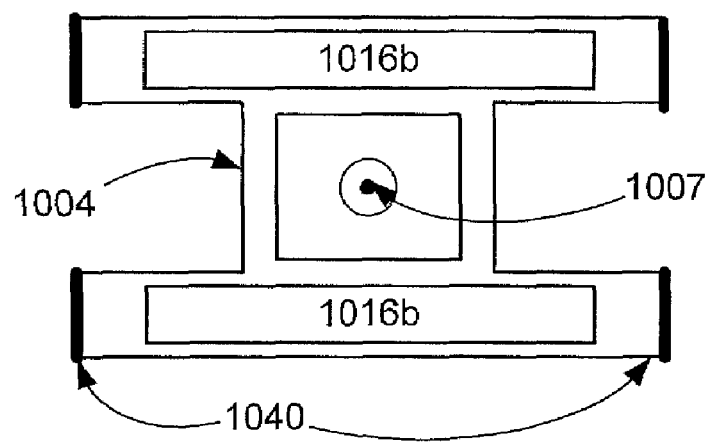
FIG. 10C shows a cross-sectional schematic diagram of another exemplary force sensor in accordance with the present teachings.
Figure 10D:
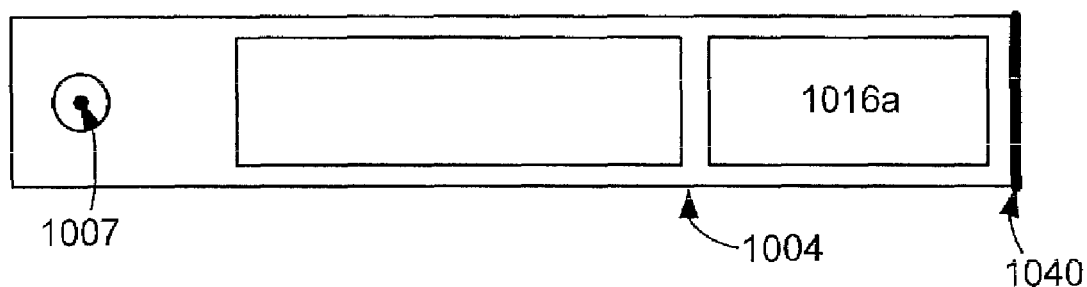
FIG. 10D shows a cross-sectional schematic diagram of another exemplary force sensor in accordance with the present teachings.

FIG. 10A depicts a cross-sectional schematic diagram of another exemplary force sensor 1000 in accordance with the present teachings. The sensor 1000 can comprise a substrate 1002, a flexible mechanical structure 1004, a gap 1005, a tip 1007, a plurality of separate top electrodes, such as electrodes 1016a-c, and a bottom electrode 1030. The force sensor 1000 substrate 1002 can be positioned at an end of a cantilever 1022. According to various embodiments, the flexible mechanical structure 1004 can be fully clamped around its circumference as described above and shown in FIG. 10A. Alternatively, the flexible mechanical structure 1004 can be a clamped-clamped beam with a rectangular or H-shape, as shown in FIGS. 10B and 10C, respectively, where the short edges 1040 at the ends are clamped. Still further, the flexible mechanical structure 1004 can be a cantilever structure or a similar structure that changes shape in a predictable manner in response to a force applied to the tip 1007, as shown in FIG. 10D.

Each of the plurality of separate top electrodes 1016a-c can be electrically isolated and formed in the flexible mechanical structure 1004. Moreover, the bottom electrode 1030 can spaced apart from the separate top electrodes 1016a-c by the gap 1005. Further, the bottom electrode can be positioned in the substrate 1002 and can be contacted by electrode terminals 1020d. Similarly, each of the separate top electrodes 1016a-c can be contacted by electrode terminals 1020a-c. In some cases, the electrode terminals 1020a-c and 1020d can be capacitive sensing terminals that can detect a capacitance change formed between the separate top electrodes 1016a-c and the bottom electrode 1030.

In FIG. 10A, a voltage can be applied between the electrode terminals 1020a-c and 1020d. The voltage can be used to independently control and move any of the separate top electrodes 1016a-c, so that they can serve as actuators. Further, the separate top electrodes 1016a-c can also perform sensing, similar to that of a dual electrode capacitive micromachined ultrasonic transducer where the vibrations of the sensor flexible mechanical structure are converted to electrical current signals through change in capacitance.

For example, the force sensor 1000 can be used for fast imaging where bias voltages are applied between the electrode terminals 1020a, 1020c and the bottom electrode terminal 1020d and alternating voltages of the same or reverse phase are applied to the electrode terminals 1020a and 1020c to vibrate the tip 1007 vertically or laterally to have intermittent contact with a sample surface. In some cases, the forces between the tip 1007 and a close by surface can be sensed without contact for non-contact imaging. The bias voltages applied to the electrode terminals 1020a, 1020c also control the position of the tip 1007 in response to changes in capacitance detected between the electrode terminals 1020b and the bottom electrode terminal 1020d. An external controller (not shown) can read the detected capacitance change and generate the control signals (bias voltages) applied to the electrode terminals 1020a, 1020c and the bottom electrode terminal 1020d.

Figure 11A:
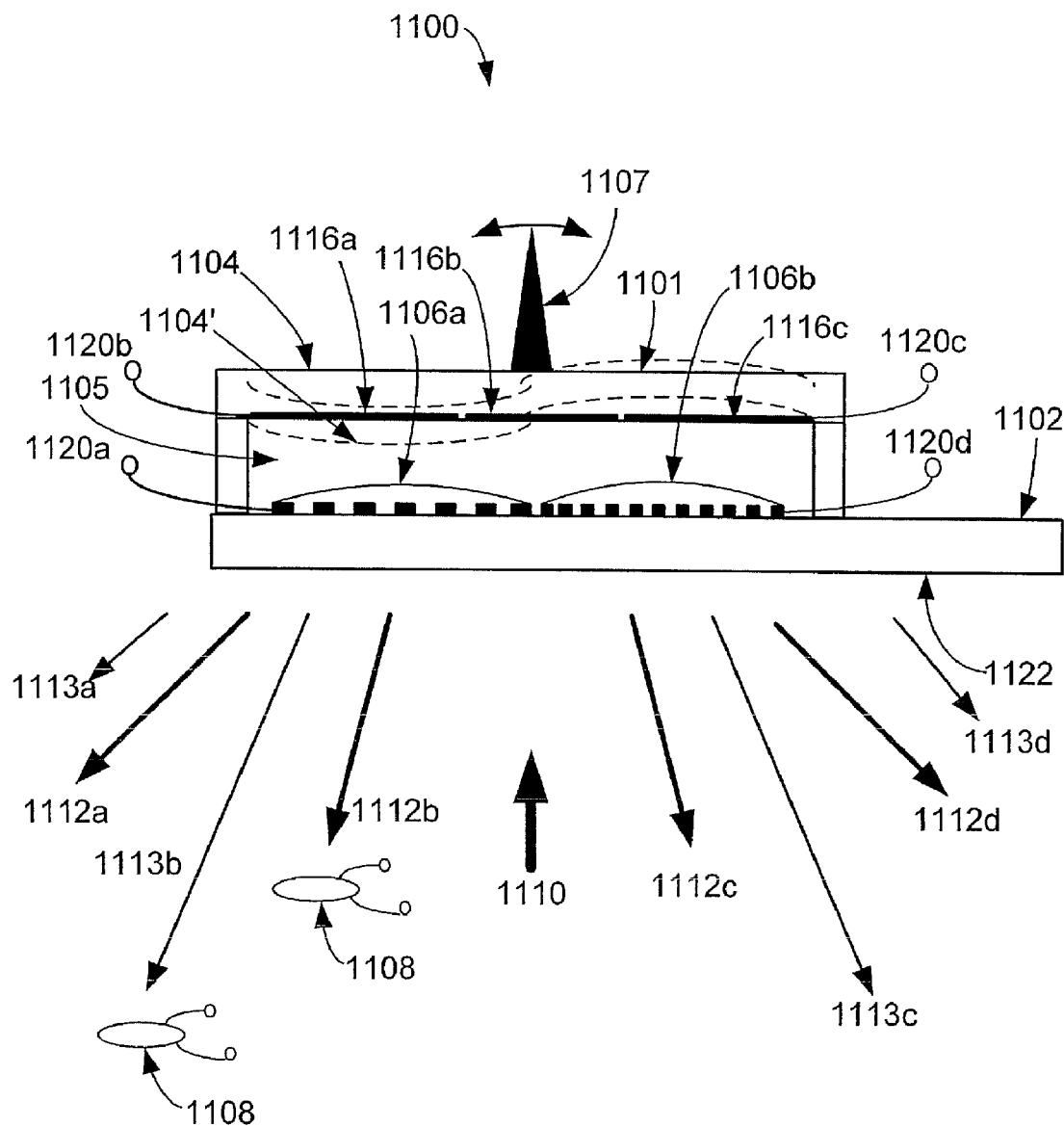
FIG. 11A shows a schematic diagram of another exemplary force sensor in accordance with the present teachings.

FIG. 11A depicts a cross-sectional schematic diagram of another exemplary force sensor unit 1100 in accordance with the present teachings. The force sensor unit 1100 can comprise a force sensor 1101, a detection surface 1102, a flexible mechanical structure 1104, a gap 1105, a tip 1107, a plurality of separate top electrodes, such as electrodes 1116a-c, a plurality of gratings, such as first grating 1106a and second grating 1106b, at least one detector 1108, and a cantilever 1122. The first grating 1106a can have a different grating spacing than the grating spacing of 1106b. Furthermore, the first grating 1106a can have a different orientation as compared to the grating 1106b. It is to be understood that other force sensor embodiments described herein can also comprise multiple gratings.

The detection surface 1102 can be positioned at a free end of the cantilever 1122. Moreover, the flexible mechanical structure 1104 can be fully clamped around its circumference, it can be a clamped-clamped beam with a rectangular or H shape where the short edges at the ends are clamped, or it can be a cantilever structure or a similar structure that changes shape in a predictable manner in response to a force applied to the tip 1107.

The force sensor 1101 shown in FIG. 11A can be used for lateral force or friction measurements. For example, force sensor 1101 can be used to sense torsion created on the flexible mechanical structure, shown as 1104'. Separate top electrodes 1116a-c can be positioned on the flexible mechanical structure 1104 to excite the torsional motion or resonances. Similarly, the flexible mechanical structure 1104 can be bent asymmetrically, shown as 1104', due to torsion created by the tip 1107 or due to out of phase actuation from the first grating 1106a, the second grating 1106b, and the top electrodes 1116a-c acting as electrostatic actuators. In particular, a voltage can be applied to the electrical contacts 1120a and 1120b that contact the first grating 1106a and the top electrode 1116a, respectively. The same voltage can be applied to the electrical contacts 1120c and 1120d that contact the top electrode 1116c and the second grating 1106b, respectively. Applying this same voltage can cause the flexible mechanical structure 1104 to bend up and down. In contrast, similarly applying a differential voltage can cause torsion of the flexible mechanical structure 1104.

A light beam 1110 can be directed through the detection surface 1102 to impinge on the flexible mechanical structure 1104. The beam 1110 reflects off of the flexible mechanical structure 1104, a portion of which can be reflective, and is diffracted differently by the first grating 1106a and the second grating 1106b. As shown in FIG. 11A, the first grating 1106a can generate a first set of diffraction orders 1112a-d and the second grating 1106b can generate a second set of diffraction orders 1113a-d. The detectors 1108 can detect the different diffraction orders. The detector outputs can be added to obtain up and down bending displacement detection. Similarly, the outputs can be subtracted to obtain torsional motion and force detection. This information can be obtained when the spring constant for the second bending mode (torsion around the mid axis) of the flexible mechanical structure 1104, clamped-clamped beam or a cantilever is known. Thus, in addition to acting as actuators, the first grating 1106a and second grating 1106b can be used to optically or capacitively decouple the bending motion from the torsional motion. As such, the sensed outputs of these detectors yield both bending and torsional motion information. One can also use separate beams 1110 to illuminate the plurality of gratings.

Figure 11B:
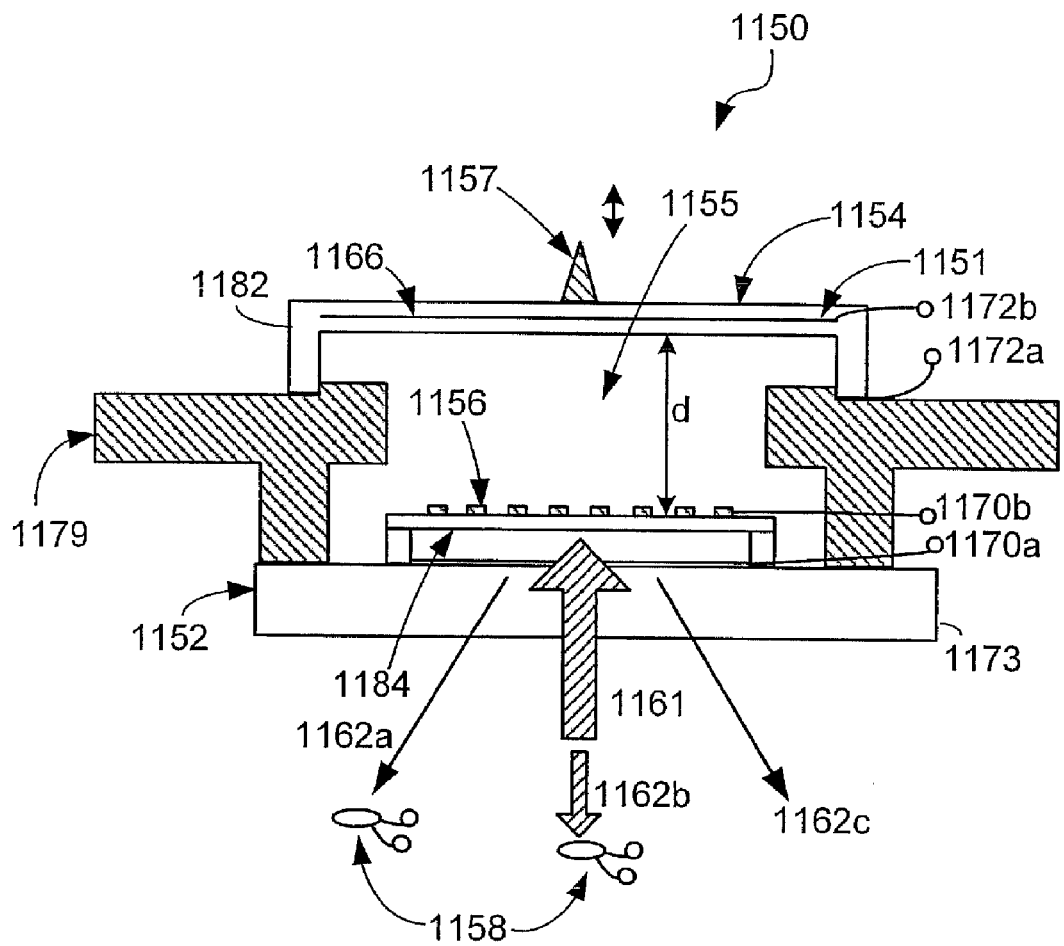
FIG. 11B shows a schematic diagram of another exemplary force sensor in accordance with the present teachings.

FIG. 11B depicts a cross-sectional schematic diagram of another exemplary force sensor unit 1150 in accordance with the present teachings. The force sensor unit 1150 can comprise a force sensor 1151, a first detection surface 1152 such as a substrate, a flexible mechanical structure 1154, a gap 1155, a tip 1157, a top electrode 1166, a grating 1156, grating flexible mechanical structure actuation inputs 1170a and 1170b, and tip flexible mechanical structure actuation inputs 1172a and 1172b. The force sensor 1151 can be affixed to a free end of a cantilever (not shown). The grating flexible mechanical structure actuation input 1170a can contact a transparent conductor 1173, such as indium tin oxide, formed on the first detection surface 1152. According to various embodiments, the flexible mechanical structure 1154 can be separated from the grating by a distance (d). Moreover, the flexible mechanical structure 1154 can comprise the top electrode 1166 and the grating 1156 can be spaced away from the first detection surface 1152.

The force sensor 1151 shown in FIG. 11B can extend the tip actuation range without degradation in optical displacement measurement sensitivity. For example, the tip 1157 can be positioned at a relatively large distance away from the grating 1156. In this manner, the tip 1157 can be moved large distances without shorting or damaging the sensor 1150. Moreover, the grating 1156 can be actuated to keep the detection sensitivity at an optimal level. For example, the grating can be actuated a distance of λ/4, where λ is the wavelength of light 1161, to provide proper sensitivity.

The tip 1157 and flexible mechanical structure 1154 can be spaced away from the grating in various ways. For example, rigid supports 1179 can be formed on the first detection surface 1152 to support the flexible mechanical structure 1154. In this manner, the flexible mechanical structure 1154 is separated from the grating 1156 at a predetermined distance. A second detection surface 1184 can be separated from the first detection surface 1152 by a gap so as to provide a predetermined separation distance. The grating 1156 can be formed on the second detection surface 1184.

Operation of the sensor 1150 is similar to that described above. For example, light 1161 is directed through the first detection surface 1152, which can be transparent. The light 1161 passes through the transparent conductor 1173 and through the grating 1156 and impinges the flexible mechanical structure 1154. The light is reflected from the flexible mechanical structure 1154 and is diffracted by grating 1156 before being detected by detectors 1158.

Figure 11C:
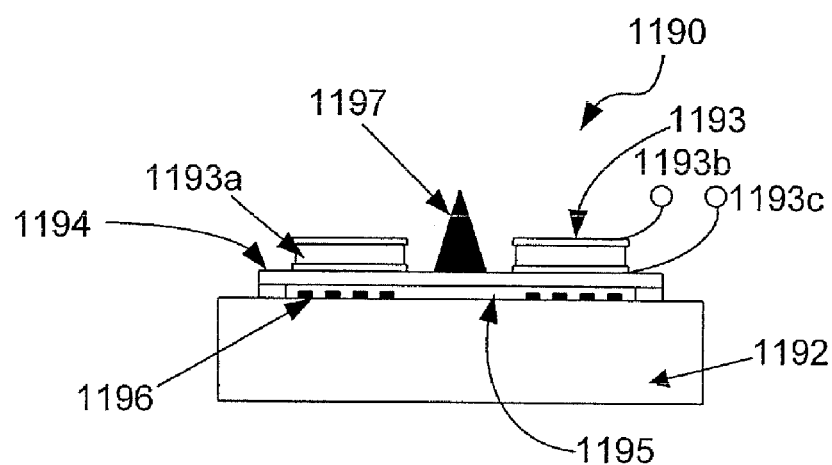
FIG. 11C shows a schematic diagram of another exemplary force sensor in accordance with the present teachings.

FIG. 11C depicts a cross-sectional schematic diagram of another exemplary force sensor 1190 in accordance with the present teachings. The force sensor 1190 can comprise a detection surface 1192, a piezoelectric actuator 1193 comprising a thin piezoelectric film 1193a disposed between a pair of electrodes 1193b and 1193c, a flexible mechanical structure 1194, a gap 1195, a tip 1197, and a grating 1196. The force sensor 1190 can be combined with at least one detector and a cantilever to form a force sensor unit.

According to various embodiments, the thin piezoelectric film can comprise a piezoelectric material such as, for example, ZnO or AlN. The piezoelectric film can be deposited and patterned on the flexible mechanical structure 1194 along with the tip 1197. The piezoelectric actuator 1193 can form, for example, a bimorph structure that can be bent and vibrated by applying DC and AC signals through the electrodes 1193b and 1193c. According to various embodiments, the grating 1196 can be placed off-center so as to provide a large range of tip motion that can be detected without losing sensitivity.

Figure 12:
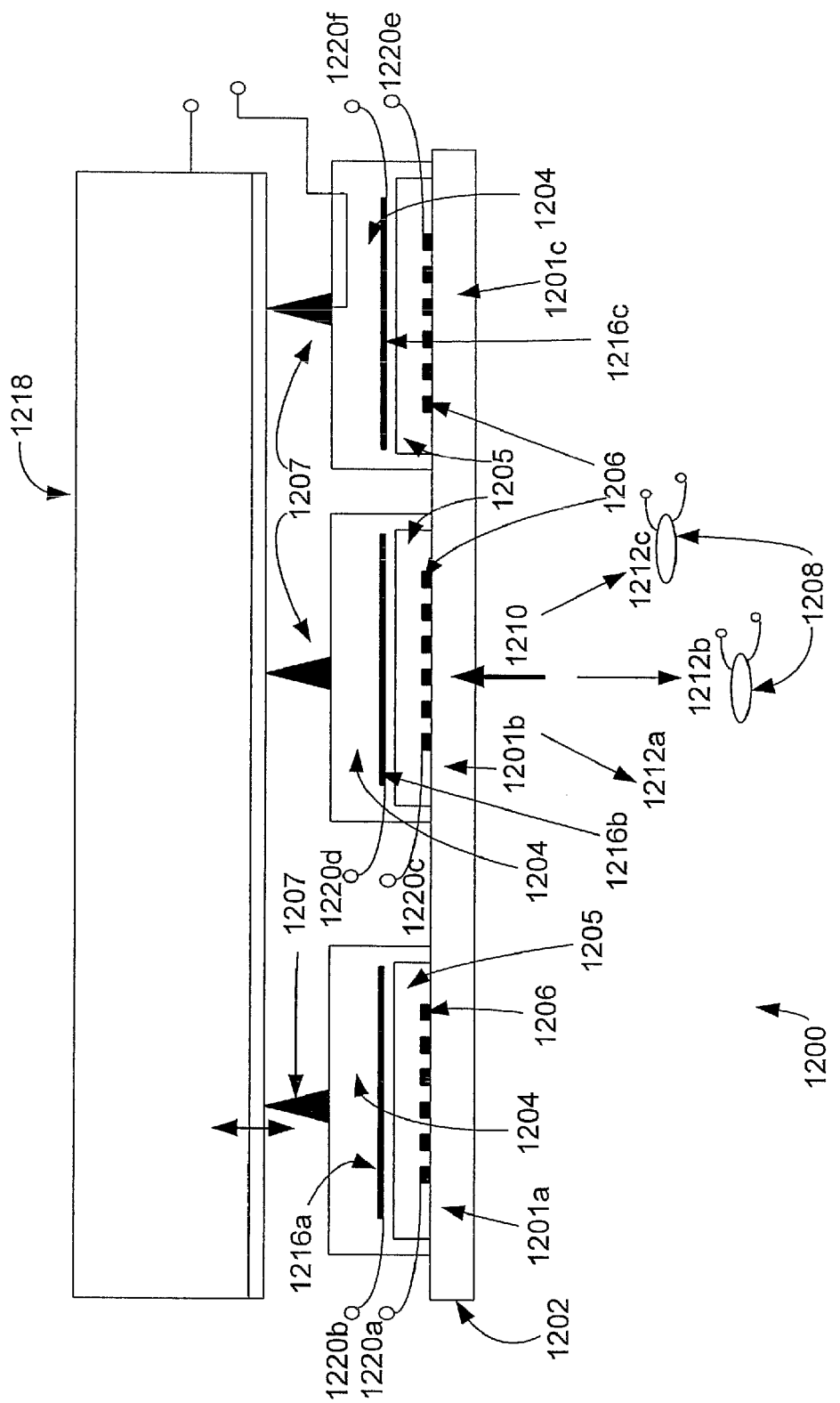
FIG. 12 shows a schematic diagram of another exemplary force sensor in accordance with the present teachings.

FIG. 12 depicts a cross-sectional schematic diagram of an array 1200 of force sensors 1201a-c in accordance with the present teachings. The array 1200 can comprise multiple force sensors, such as force sensors 1201a-c, formed on a detection surface 1202. Each of the force sensors 1201a-c can comprise a flexible mechanical structure 1204, a gap 1205, a tip 1207, an electrode, such as electrodes 1216a-c, and a grating 1206. According to various embodiments, the array 1200 of force sensors can be used for imaging and sensing at the same time so as to enable simultaneous sensing of a physical, chemical, or biological activity and imaging of the sample 1218 surface. The force sensors 1201a-c can be combined with at least one detector 1208 and a cantilever (not shown) to form a force sensor unit. Some of the force sensors 1201a-c can be modified to include, for example, electrodes, sensitive films, or optical waveguides, while the others can be used for regular probe microscopy imaging of topography. Thus, each force sensor can perform the same or different function.

For example, force sensor 1201a can be used to measure and image the elasticity or adhesion of the surface of sample 1218. Further, the grating 1206 can be used with electrode 1216a to provide actuation of the flexible mechanical structure 1204 by applying a voltage between contacts 1220a and 1220b, respectively. The elasticity information can be measured by applying known dynamic and quasi-static forces to the surface with the tip 1207 using an external actuator or by applying voltage to the terminals 1220a and 1220b. At the same time, the diffraction order intensities can be monitored by the optical detectors 1208 or a capacitance change can be detected by electrical means to determine the resulting tip displacement. Viscoelasticity or adhesion can be calculated using computer models well known by those who are skilled in the art of probe microscopy.

Force sensor 1201b can be used to measure and image the topography of the surface of sample 1218 similarly as described herein using beam 1210 to generate diffraction orders 1212a-c that can be detected by detectors 1208. In the case of force sensor 1201b, the grating 1206 can be used with electrode 1216b provide actuation of the flexible mechanical structure 1204 by applying a voltage between contacts 1220c and 1220d, respectively.

Still further, the force sensor 1201c can be used to measure and image the surface potential of sample 1218. In the case of force sensor 1201c, the grating 1206 can be used with electrode 1216c to provide actuation of the flexible mechanical structure 1204 by applying a voltage between contacts 1220e and 1220f, respectively. Moreover, the sample 1218 can be biased with respect to the tip 1207 of the force sensor 1201c using the electrical terminal 1220g to assist in surface potential measurements. The tip 1207 on the force sensor 1216c can have a separate electrical terminal 1220h which is electrically isolated from the other electrodes 1220f and 1220e and placed in the dielectric sensor flexible mechanical structure 1204. The surface potential can then be measured using an electric potential measurement device connected between terminals 1220g and 1220h. Furthermore, an external source (not shown) can be connected to terminals 1220g and 1220h and the current flow in that electrical circuit can be measured to locally determine the flow of ions or electrons available from the sample 1218 or in a solution that the force sensor 1216c is immersed.

As described previously, the force sensors 1216a and 1216b can be used to obtain surface topography and elasticity information. This information can be used by an external controller to adjust the position of the tips 1207 of individual force sensors to optimize the measurements. As such, the array 1200 can be used to measure elasticity, electrochemical potential, optical reflectivity, and fluorescence while also imaging the surface.

Figure 13A:
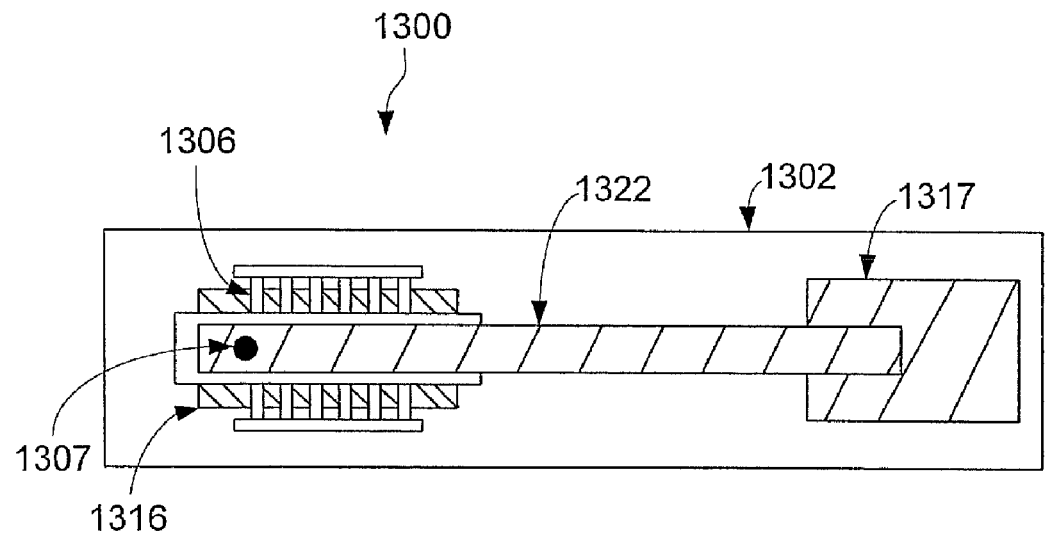
FIG. 13A shows a schematic diagram of another exemplary force sensor in accordance with the present teachings.
Figure 13B:
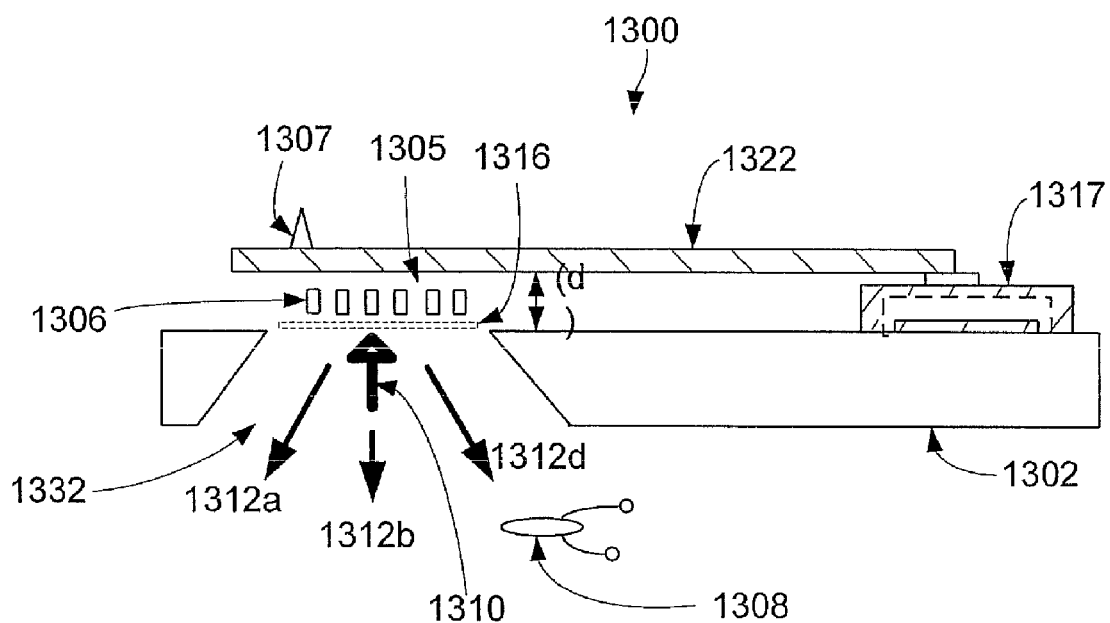
FIG. 13B shows a cross-sectional schematic diagram of another exemplary force sensor in accordance with the present teachings.

FIGS. 13A and 13B depict top-down and cross-sectional schematic diagrams of an exemplary force sensor 1300 in accordance with the present teachings. In FIGS. 13A and 13B, the force sensor 1300 can comprise a detection surface 1302, a grating 1306, a tip 1307, an electrostatic cantilever actuator flexible mechanical structure 1317, and a cantilever 1322. As shown in FIG. 13B, the force sensor 1300 can also include an optical port that can be created, for example, by etching a hole 1332 through the detection surface 1302. According to various embodiments, the grating 1306 can be a diffraction grating comprising a plurality of conductive fingers that can be deformable and that can be electrostatically actuated independently of the cantilever 1322 in order to control the relative gap 1305 distance (d) between the grating 1306 and the reflecting cantilever 1322. Further, the cantilever 1322 can have its own electrostatic actuation mechanism 1317. With the cantilever 1322 having its own electrostatic actuation mechanism 1317, displacement measurements can be optimized on each cantilever 1322 of an array of independent force sensor structures. With this capability, the initial positions from topography, misalignment with the imaged sample, and/or process non-uniformities can be measured and corrected.

In operation, as shown, for example, in FIG. 13B, a light 1310 can be directed at the cantilever 1322 through the hole 1332. The light 1310 is reflected from the cantilever and then diffracted by the grating 1306. Various diffraction orders 1312a-c can be detected by detectors 1308.

Figure 14:
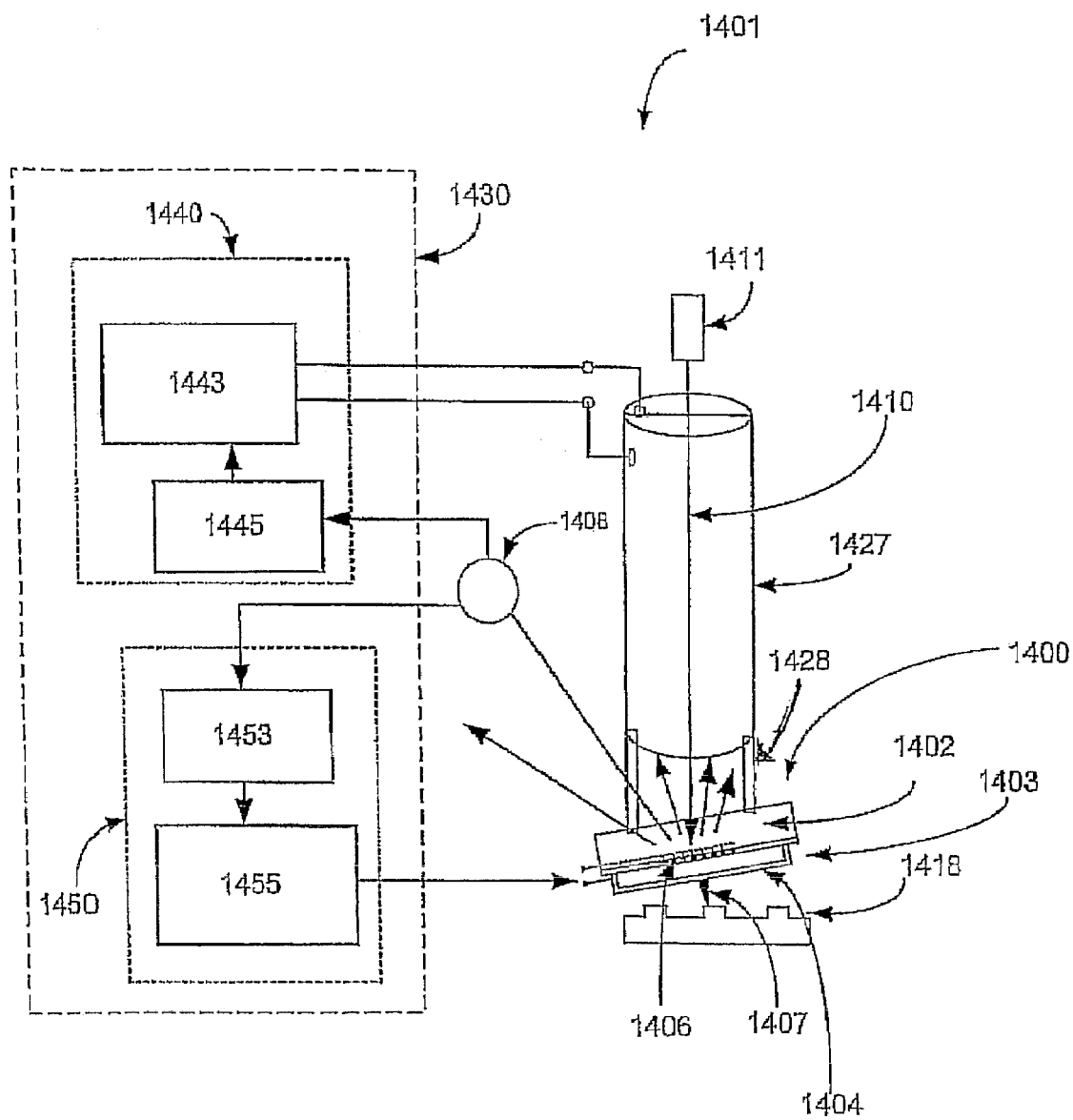
FIG. 14 shows a schematic diagram of an exemplary AFM system in accordance with the present teachings.

FIG. 14 shows a force sensor structure 1400 used in an AFM system 1401 according to various embodiments. The AFM system 1401 can comprise a force sensor 1403, a detector 1408, such as a photodiode, a light source 1411, such as a laser diode, and a computer 1430 comprising a first processor 1440 to generate a control loop for imaging material properties and a second processor 1450 to generate a control loop for fast tapping mode imaging. The second processor 1450 can further control an integrated electrostatic actuator, as described herein.

As shown in FIG. 14, the force sensor 1403 can be fabricated, for example, on a detection surface 1402 and placed on a holder 1428, which can be attached to an external piezoelectric actuator (piezo tube) 1427. The intensity of, for example, the $+1^{st}$ diffraction order of light diffracted by a grating 1406 in the force sensor 1403 is detected by the detector 1408 as the tip 1407 displacement signal. For example, with a 4 μm grating period and a 670 nm laser wavelength, the $+1^{st}$ diffraction order is reflected at a 9.6° angle from the grating normal. Tilting the detection surface 1402 by 6.2° with respect to the incident beam 1410 provides a total of 22° angular deflection. According to various embodiments with the force sensor 1403, significantly all of the light 1410 can be reflected from the grating 1406 and the flexible mechanical structure 1404, eliminating optical interference problems due to reflections from the sample 1418. This can provide a clean background for tip displacement measurements.

The performance of the AFM 1401 having a force sensor, such as those described herein, can be characterized using an integrated electrostatic actuator. For example, an optical interference curve with a DC bias range of 24-36 V was traced and the bias was adjusted for optimum sensitivity point at 30 V. The displacement sensitivity at this bias level was 204 mV/nm. The RMS noise measured in the full DC-800 kHz bandwidth of the photodetector 1408 was 18mV RMS. This value, confirmed by spectrum analyzer measurements, corresponds to $1 \times 10^{-3}$ Å/√Hz minimum detectable displacement noise with 1/f corner frequency of 100 Hz. Using the laser power available from the $10^{th}$ and $-1^{st}$ orders and differential detection, this value can be lowered well below $5 \times 10^{-4}$ Å/√Hz without increasing the laser power or using etalon detection. The dynamic response of a typical flexible mechanical structure was also measured using electrostatic actuation, indicating a resonance frequency of 720 kHz with a quality factor of 4.1, suitable for fast tapping mode imaging.

Two controller schemes interfaced with the AFM system 1401 can be used. The first scheme is used with the first processor 1440 comprising a controller 1443 and an RMS detector 1445 for material property measurement and imaging using transient interaction force signals. The Z-input of the piezo tube 1427 is driven to generate a 2 kHz 120 nm peak sinusoidal signal while the controller 1443 keeps constant the RMS value of the photo-detector signal generated by the force sensor 1403 when it taps on the sample 1418. The 2 kHz signal frequency is chosen as a compromise between the ability to generate adequate vertical (Z direction) displacement of the piezo tube and the frequency response of the internal RMS detector 1445 for a typical force sensor structure 1401. The second controller scheme is used with the second processor 1450 for fast tapping mode imaging. In this case, the Z-input of the piezo tube is disabled and the integrated electrostatic actuator is used to generate a 10 nm peak-to-peak free air tapping signal in the 500-700 kHz range as well as the signals to control the force sensor 1403 tip 1407 position keeping the RMS value of the tip vibration at the desired set point.

Figure 15A:
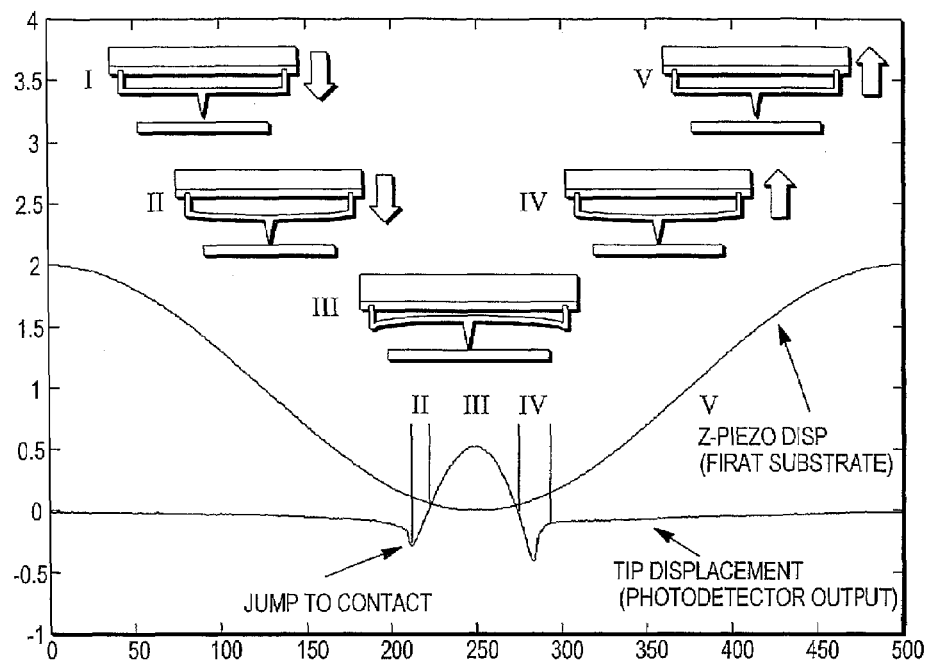
FIGS. 15A-15C show graphs of interaction force versus time for an exemplary force sensor in accordance with the present teachings.
Figure 15B:
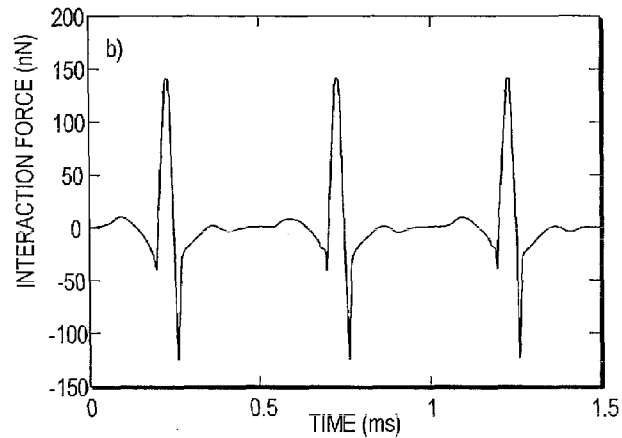
Figure 15C:
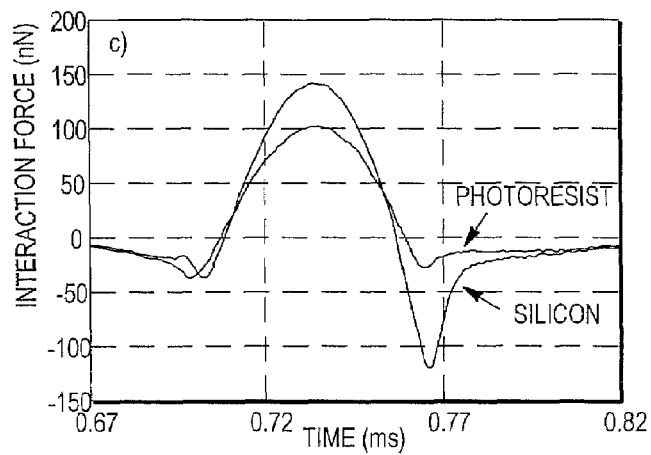

FIGS. 15A-15C show the results of a force sensor described herein used in a dynamic mode in an AFM system, such as that shown in FIG. 14. The results shown in FIGS. 15A-15C provide information about the transient interaction forces with a resolution that exceeds conventional systems. In this example, the detection surface, such as a substrate, can be oscillated, and can be driven by a suitable actuator. Both the attractive and repulsive regions of the force curve are traced as the tip 1407 contacts the sample 1418 during some phases (I-V) of each cycle. The inserts (i)-(v) in FIG. 15A show the shape of the flexible mechanical structure 1404 during different phases of a cycle while the substrate is oscillated at 2 kHz by the Z- piezo. FIG. 15A also shows the measured detector output signal during each phase corresponding to each cycle. The detector 1408 output is proportional to the force acting on the tip 1407.

In this particular case, during phase I, the tip 1407 is away from the sample 1418 surface where it experiences long range attractive forces. When brought close to the surface, the tip 1407 jumps to contact (0.2 nm change in tip position, phase II) and remains in contact for about 14% of the cycle. In the middle of the period, the repulsive force applied to the sample 1418 reaches to a peak value of 163 nN (1.22 nm tip displacement, phase III). When the tip 1407 is withdrawn, the tip 1407 experiences capillary forces of 133 nN (phase IV) before breaking off from the liquid film on the sample 1418 surface (phase V). As shown in FIG. 15B, the controller 1443 of FIG. 14 can be used to stabilize the signal with a constant RMS, so that the output signal of the force sensor shows individual and repeatable taps on the sample 1418. The signals shown are averaged 100 times on a digitizing oscilloscope, and the noise level is less than 1 nN with 800 kHz measurement bandwidth.

An application of this mode of operation is the measurement of local viscoelastic properties. For example, in FIG. 15C individual tap signals obtained on (100) silicon (E=117 GPa) and photoresist (PR, Shipley 1813) (E=4 GPa) samples using a sensor with having a tip 50 nm radius of curvature were compared. The maximum repulsive force is significantly larger for the silicon sample even though the tip-sample contact time is less than that of photoresist (PR) indicating that the silicon is stiffer than PR. Consequently, the positive slope of the time signal during the initial contact to silicon sample is significantly larger than it is when in contact with the PR sample. The silicon sample also shows higher capillary hysteresis. Both of these results are consistent with existing models and data. Moreover, the tip 1407 can encounter different long range van der Waals or electrostatic forces on these two samples. Since this information is obtained with nanometer scale lateral resolution and applying nanoNewton level forces, this mode of operation can be referred to as "nano-characterizer" mode of operation.

The results shown in FIGS. 15A-15C demonstrate a unique feature of the force sensors described herein for dynamic force measurements. In particular, the output signal is generated only when there is an interaction force on the tip. With broad bandwidth and high sensitivity, the force sensors enable direct measurement of transient interaction forces during each individual tap with high resolution and without background signal. This provides information on properties of the sample such as adhesion, capillary forces, as well as viscoelasticity.

Figure 16A:
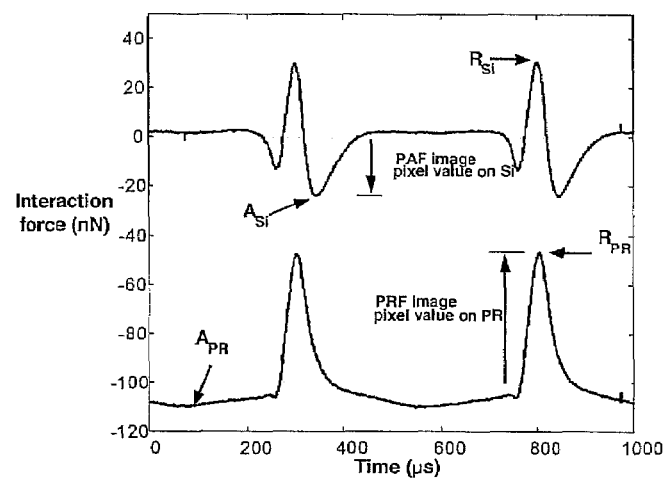
FIG. 16A shows a graph of interaction force versus time for an exemplary force sensor in accordance with the present teachings.

The force sensor can be used to image various material properties by recording at each pixel the salient features of the tap signal. For example, the AFM system 1401 shown in FIG. 14 can be used to monitor transient interaction forces. The first controller 1440 of system 1401 can be used to maintain a constant RMS value of the output signal while scanning the tapping tip 1407. FIG. 16A shows the transient tap signals on the PR and silicon regions of a sample having 360 nm thick, 2 µm wide PR strips with 4 µm periodicity patterned on silicon surface. Significant differences exist between the tap signals in terms of both the attractive and repulsive forces acting on the tip 1407. For example, the silicon surface exhibits a much larger adhesion force when compared to the PR surface. Because the first controller 1440 attempts to maintain a constant RMS value over the sample, it forces the tip 1407 to indent more into the PR region. As such, the tip 1407 experiences a larger repulsive force. The shape of the individual tap signals in the attractive region has a strong dependence on the environment.

Figure 16B:
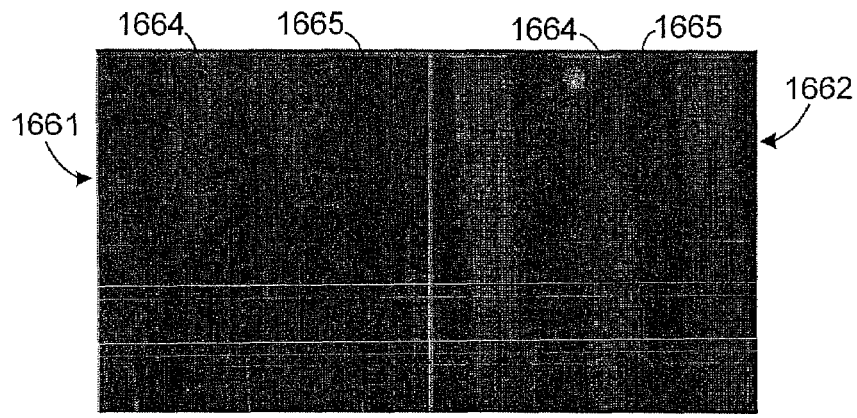
FIG. 16B shows a PAF image and a topography image of a sample using an exemplary force sensor in accordance with the present teachings.

To form an image in which sample adhesion dominates the contrast mechanism, a peak detector circuit can be used to record the peak attractive force (PAF) as the pixel value, such as points $A_{si}$, $A_{PR}$ in FIG. 16A. Simultaneously, the sample topography can be recorded using a fixed RMS value set point. FIG. 16B shows the resulting adhesion (PAF) and topography images, 1661 and 1662, respectively, of the sample. In the topography image 1662, the stripes 1664 correspond to the 360 nm high PR pattern (Shipley 1805) and stripes 1665 correspond to the silicon surface. In the PAF image 1661, the silicon surface appears brighter than PR due to higher adhesion forces. By recording the peak repulsive force (PRF) as the pixel value, images where sample viscoelasticity dominates the contrast, such as at points $R_{si}$, $R_{PR}$ in FIG. 16A, can be obtained.

Figure 16C:
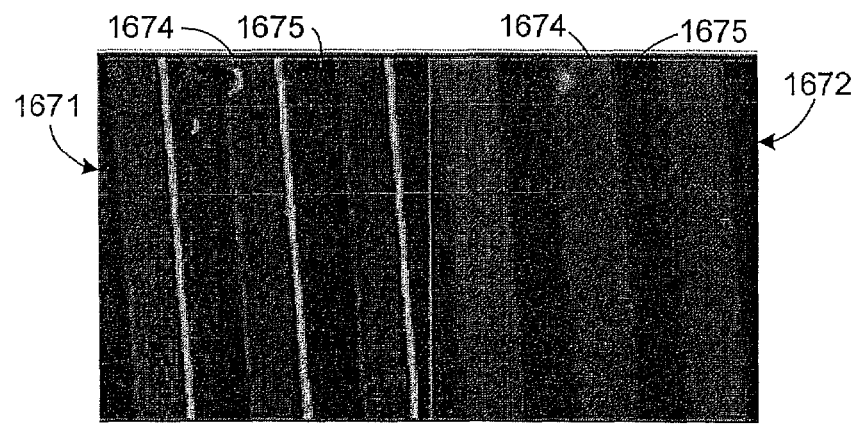
FIG. 16C shows a PRF image and a topography image of a sample using an exemplary force sensor in accordance with the present teachings.

Simultaneously recorded PRF and topography images of the same sample region are shown in FIG. 16C at 1671 and 1672, respectively. The PRF image 1671 shows a reversed contrast when compared to the PAF image, while the topography image is repeatable. The PR strips 1674 appear brighter in the PRF image as indicated by the individual tap signals shown in FIG. 16A. Also, many more contamination particles are adhered to the silicon 1675 surface as compared to the PR strips 1674, and these particles are seen with high contrast. This is consistent with higher adhesion measured on the silicon in the PAF image 1661.

Although a simple controller based on the RMS value set point is described in this embodiment, it is contemplated that different control schemes, such as those sampling individual tap signals at desired time instants and using those values in the control loop can also be used. For example, if the peak value of the repulsive force is kept constant as the control variable, images where the contact-to-peak force time determines the contrast—a direct measure of sample stiffness can be obtained. Several existing models can then be used to convert these images to quantitative material properties. Similarly, by detecting the attractive force peaks before and after the contact one can obtain quantitative information on the hysteresis of the adhesion forces.

Figure 17A:
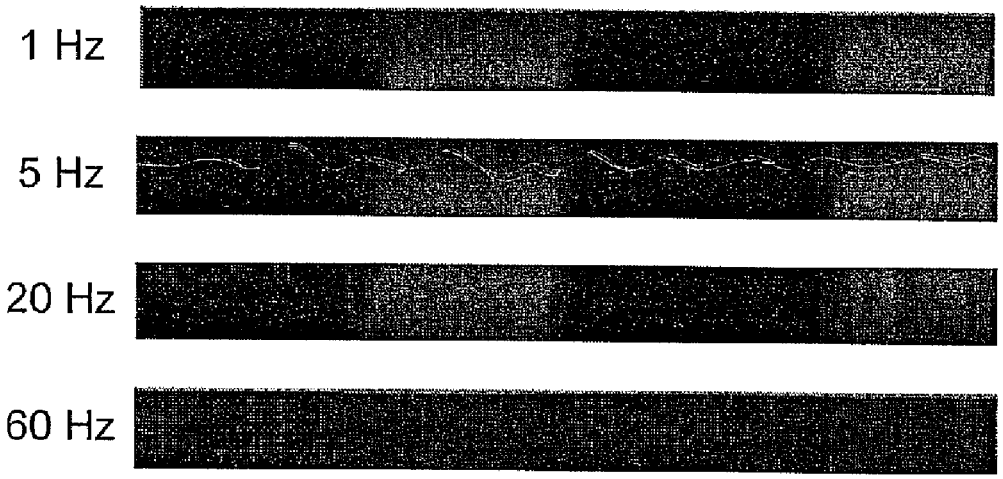
FIG. 17A shows a topographical image of a sample using an exemplary force sensor in accordance with the present teachings.
Figure 17B:
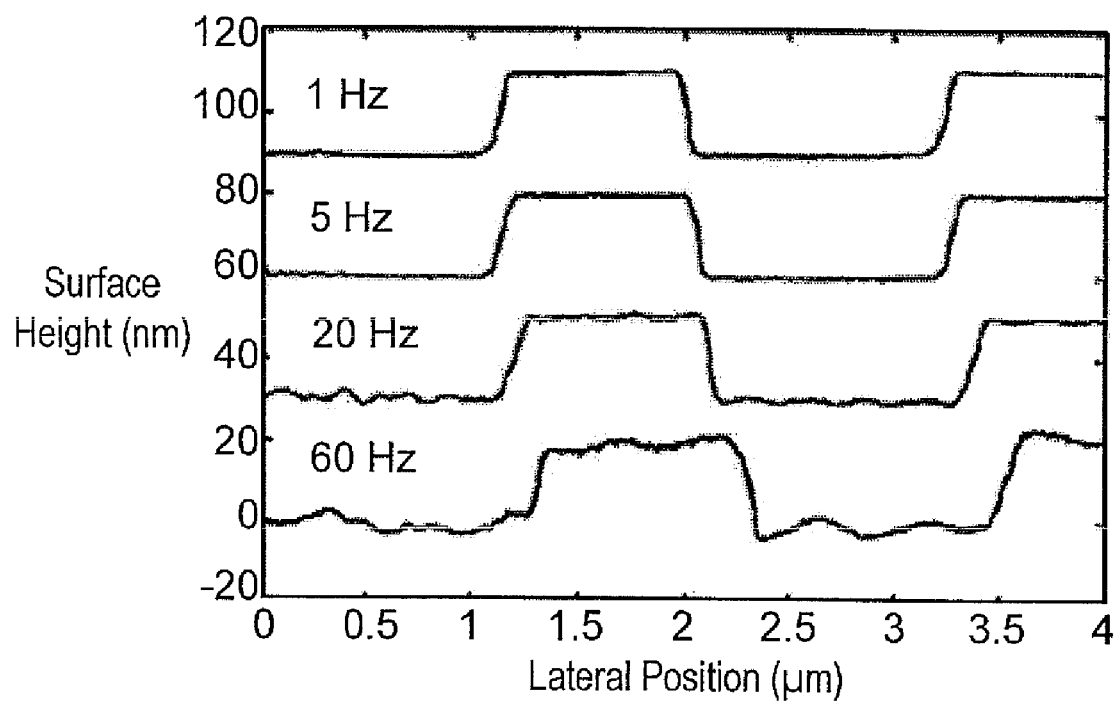
FIG. 17B shows line scans of the sample shown in FIG. 17A measured at different speeds.

FIGS. 17A and 17B show the results of fast tapping mode imaging of sample topography with a single sensor probe using the setup shown in FIG. 14. In this mode, the Z-input of the piezo tube 1427 is disconnected and used only for x-y scan. The integrated electrostatic actuator is used for both oscillating the tip 1407 at 600 kHz and controlling the flexible mechanical structure 1404 bias level in order to keep the oscillation amplitude constant as the tapping mode images are formed.

A standard calibration grating with 20 nm high, 1 µm wide, sharp steps with 2 µm periodicity was used as the fast imaging sample (NGR-22010 from Veeco Metrology). FIG. 17A shows the images of a 4 µm×250 nm area (512×16 pixels) of the grating with line scan rates of 1 Hz, 5 Hz, 20 Hz, and 60 Hz. FIG. 17B shows the cross sectional profiles of individual scan lines for each image. The AFM system 1401 had an x-y scan capability that can go up to 60 Hz.

Figure 17C:
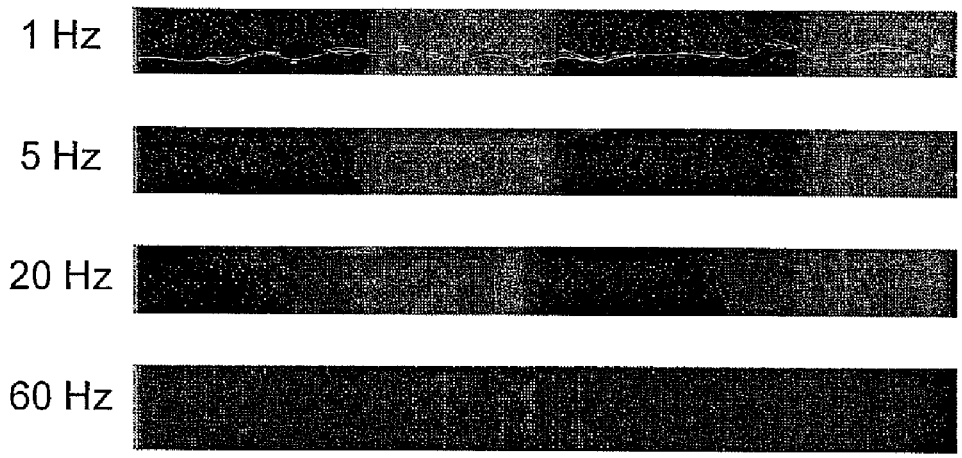
FIG. 17C shows a topographical image of sample in FIG. 17A made using a conventional AFM system.
Figure 17D:
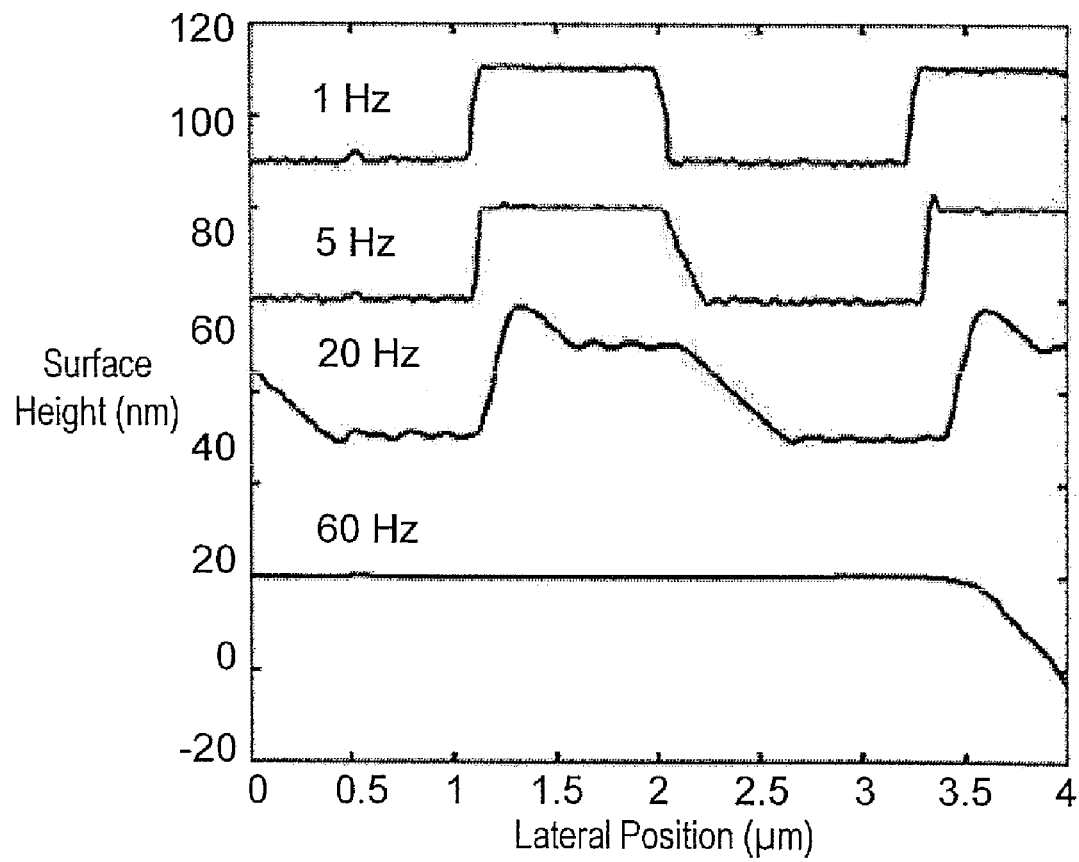
FIG. 17D shows line scans of the sample shown in FIG. 17C measured at different speeds using a conventional AFM system.

For comparison, FIGS. 17C and 17D, show the tapping mode images and line scans using a conventional AFM system on the same sample used in the example of FIGS. 17A and 17B. The commercial AFM system used a tapping mode cantilever. The cantilever was made of silicon and had a 300 kHz resonance frequency (TESP-A from Veeco Metrology). In this case, the tapping piezo on the cantilever holder was used as the actuator.

As can be seen in the figures, AFM systems described herein are able to resolve the grating with at least a 20 Hz line scan rate and in some cases a 60 Hz line scan rate. In contrast, conventional AFM systems are not able to follow the sharp steps starting at 5 Hz, and fail to produce a viable image after 20 Hz line scan rate. The imaging bandwidth of the AFM system 1401 described herein was about 6 kHz. However, controlling the dynamics of the air flow in and out of etch holes on two sides of the flexible mechanical structure, such as those shown at 280 in FIG. 2C. With a sealed cavity, the imaging bandwidth of various force sensors described herein can be increased to more than 60 kHz. Moreover, since the force sensor unit is a well damped system even in air, methods other than RMS detection can be used to implement faster controllers.

Figure 18:
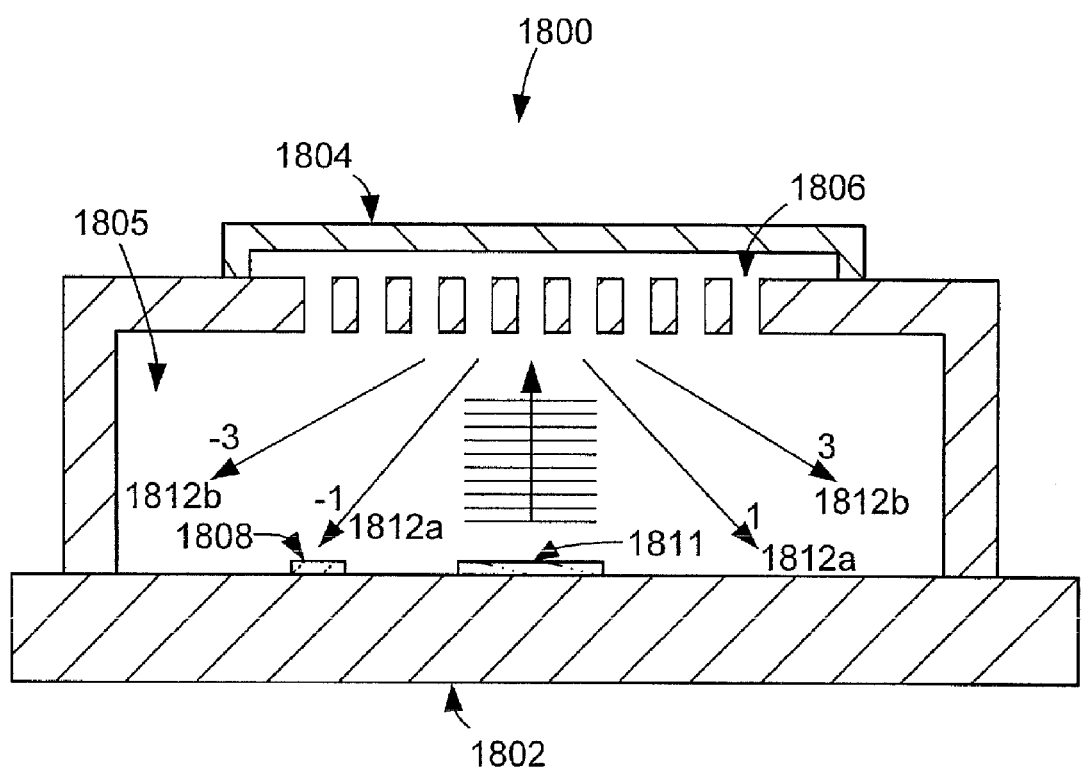
FIG. 18 shows a cross-sectional schematic diagram of another exemplary force sensor in accordance with the present teachings.

FIG. 18 depicts a cross-sectional schematic diagram of another exemplary force sensor unit 1800 in accordance with the present teachings. FIG. 18 shows a light source 1811 and a photodiode 1808 on the surface of an opaque, rigid, detection surface 1802. The detection surface 1802 can be a printed circuit board, a silicon wafer, or any other solid material. Furthermore, the light source 1811 and photodiode 1808 can be constructed or sourced externally and attached to the detection surface or fabricated directly into the material using integrated circuit or micromachining fabrication techniques.

The light source 1811 can be an optical fiber or the end of a microfabricated waveguide with an appropriate reflector to direct the light to the desired location in the force sensor unit 1800, such as a diffraction grating 1806. The optical diffraction grating structure 1806 exists above the light source 1811, and is characterized by alternating regions of reflective and transparent passages. A gap 1805 defining a cavity is formed between the grating 1806 and the detection surface and can be sealed at some desired pressure (including low pressures) with any gas or gas mixture, or can be open to ambient. Further, a flexible mechanical structure 1804 (also called a reflective surface or reflective diaphragm) exists above the diffraction grating 1806 that reflects light back towards the detection surface 1802. The diffraction grating 1806 and the reflective surface 1804 together form a phase sensitive diffraction grating.

When illuminated with the light source 1811 as shown, diffracted light reflects back towards the detection surface 1802 in the form of diffracted orders 1812a and 1812b with intensity depending on the relative position between the reflective surface 1804 and the diffraction grating 1806, or the gap 1805 thickness. The diffracted orders 1812a and 1812b emerge on both the right and left side and are traditionally numbered as shown in FIG. 18. For the phase sensitive diffraction grating with 50% fill factor, i.e. reflective and transparent passages with the same width, only the zero order and all odd orders emerge. The intensity of any one or any subset of these orders can be measured with photo-diodes 1808 to obtain information about the relative distance between the diffraction grating 1806 and the reflective surface 1804. The angles of the orders are determined by the diffraction grating period, $\Lambda_g$, and the wavelength of the incident light, $\lambda$. For example, in the far field the angle of the order n, $\theta_n$, will be given by the relation [1]:

$$\sin(\theta_n) = n \frac{\lambda}{\Lambda_g}. \quad [1]$$

Figure 19:
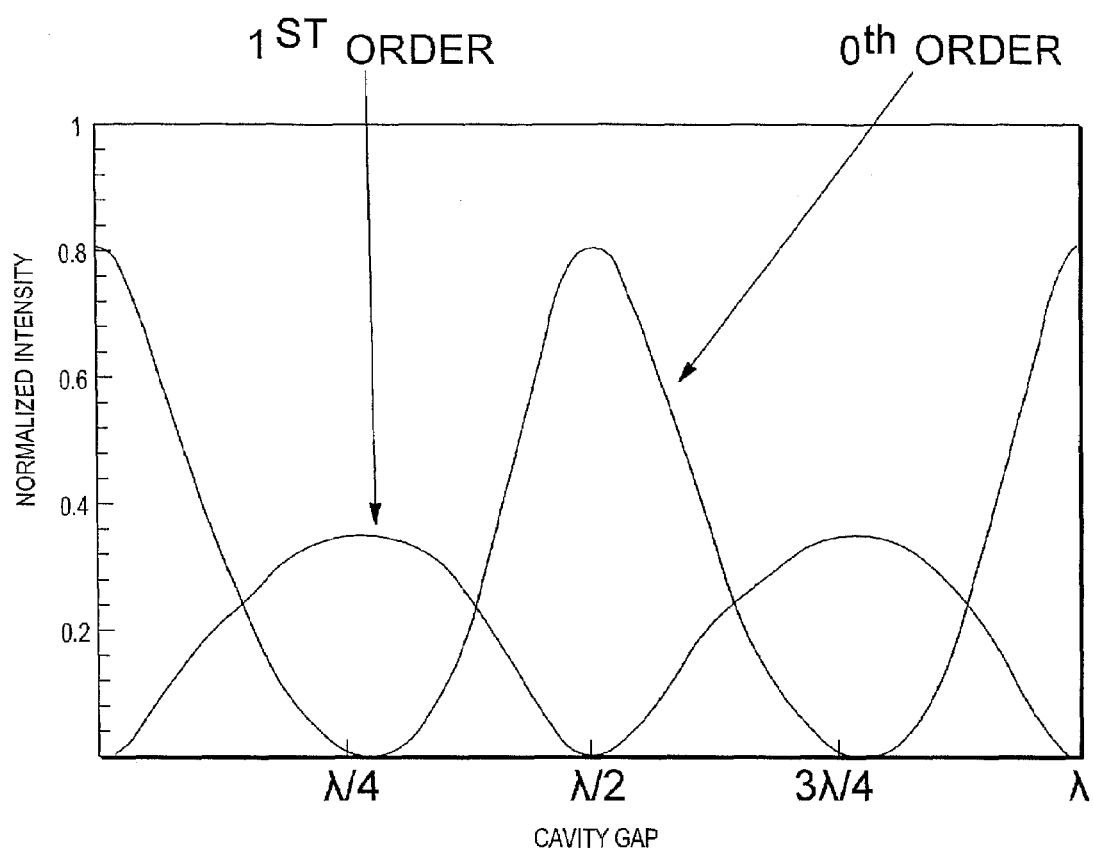
FIG. 19 shows a graph plotting normalized intensity versus gap thickness using a force sensor in accordance with the present teachings.

In order to illustrate how the intensity of the reflected orders depends on the gap thickness, the normalized intensity of the zero and first orders are plotted versus the gap in FIG. 19 assuming normal incidence. The remaining odd orders (i.e. $3^{rd}$, $5^{th}$, etc.) are in phase with the $1^{st}$ but have decreasing peak intensities. This behavior can be obtained when the light source 1811 remains coherent over the distance between the reflector and the diffraction grating 1806.

Furthermore, the diffracted orders can be steered to desired locations using structures such as Fresnel lenses. For this purpose, the gratings 1806 can be curved or each grating finger can be divided into sections of sub-wavelength sized gratings.

Also using wavelength division multiplexing, light with different wavelengths can be combined and used to illuminate a multiplicity of force sensors with different grating periods. The reflected diffraction orders from different force sensors can either be converted to electrical signals by separate photodetectors, or the reflected light at different wavelengths can be combined in an optical waveguide or optical fiber to minimize the number of optical connections to a processor that subsequently decodes the information carried at different wavelengths. Therefore, a multiplicity of force sensors can be interrogated using a single physical link or a reduced number of physical links to a processing system.

According to various embodiments, such as chemical and biological sensors, the reflective surface 1804 can be made of single material or a multi layered material that changes its optical properties, such as reflectivity, in response to a chemical or biological agent. Similarly, the reflective surface 1804 can be a micromachined cantilever or a bridge structure made of single or layered material that deforms due to thermal, chemical, magnetic, or other physical stimulus. For example, an infrared (IR) sensor can be constructed by having a bimorph structure including an IR absorbing outer layer and a reflective layer facing the light source 1811. In other embodiments, such as a microphone or a pressure sensor, the reflector 1804 can be in the shape of a diaphragm.

In many applications, moving or controlling the position of the reflective surface 1804 may be desired for self-calibration, sensitivity optimization, and signal modulation purposes. For example, if the reflective surface 1804 is a diaphragm or flexible mechanical structure, as in the case of a microphone or a capacitive micromachined transducer, vibrating the diaphragm to produce sound in a surrounding fluid may be desired for transmission and self-calibration. Also, while measuring the displacement of the diaphragm, controlling the nominal gap 1805 height to a position that will result in maximum possible sensitivity for the measurement may be desired. These positions correspond to points of maximum slope on the curves in FIG. 19, where it can be seen graphically that a change in gap thickness results in a maximum change in intensity of the diffracted order. These examples can use an added actuation function that can be accomplished with electrostatic actuation. In one exemplary embodiment, the entire diaphragm structure 1804 or just a certain region thereof can be made electrically conductive. This can be accomplished by using a non-conductive material for the reflective surface 1804 such as a stretched polymer flexible mechanical structure, polysilicon, silicon-nitride, or silicon-carbide, and then making the material conductive in the desired regions either through doping or by depositing and patterning a conductive material such as aluminum, silver, or any metal or doping the flexible mechanical structure 1804, such as when the flexible mechanical structure comprises polysilicon.

In another exemplary embodiment, the entire diffraction grating 1806 or a portion of the grating 1806 can be made conductive. The flexible mechanical structure 1804 and diffraction grating 1806 can together form a capacitor which can hold charge under an applied voltage. The strength of the attraction pressure generated by the charges can be adjusted by controlling the voltage, and precise control of the flexible mechanical structure 1804 position is possible.

Figure 20A:
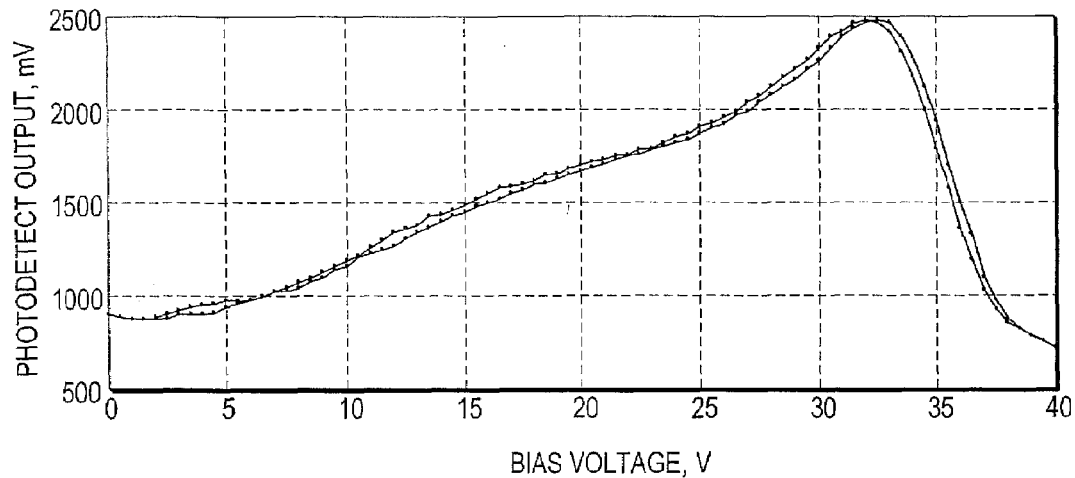
FIG. 20A shows a graph plotting photo-detector output versus bias voltage for a force sensor in accordance with the present teachings.
Figure 20B:
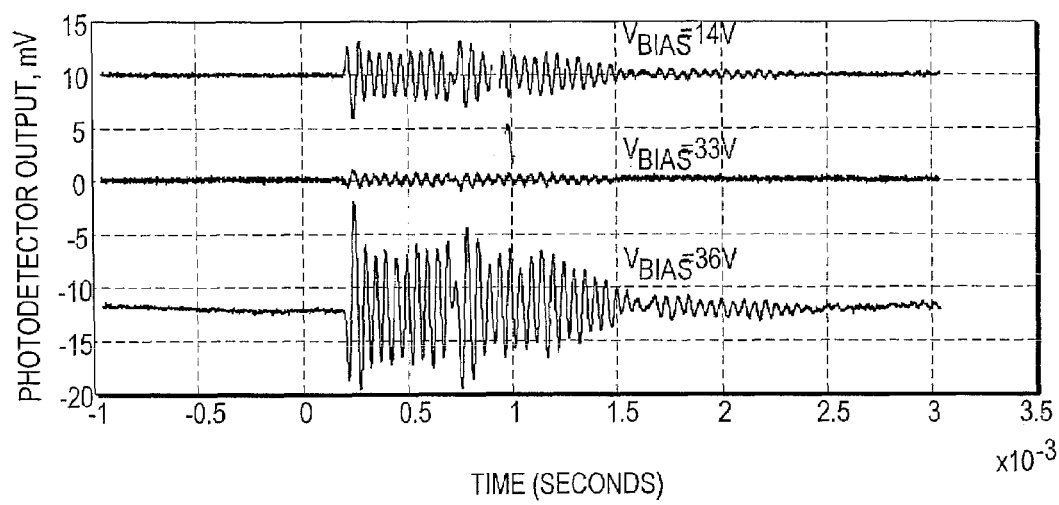
FIG. 20B shows a graph plotting photo-detector output versus time for a force sensor in accordance with the present teachings.

FIGS. 20A and 20B demonstrate this function. First, increasing voltage levels were applied to pull the flexible mechanical structure 1804 towards the detection surface 1802, which resulted in decreasing gap 1805 height (i.e. a movement from right to left on the curve in FIG. 19). The change in light intensity of the first diffracted order that resulted was measured with a photodiode and plotted at the top. To illustrate why controlling the flexible mechanical structure position may be important, a displacement measurement of the flexible mechanical structure 1804 was made at different gap 1805 heights as follows. At different applied voltages, sound was used to vibrate the flexible mechanical structure 1804 with constant displacement amplitude and the resulting change in light intensity of the first diffracted order was again measured with a photodetector. As shown in the bottom of FIG. 20A, voltage levels that move the gap height to a point corresponding to a steep slope of the optical curve are desirable as they produce larger measurement signals for the same measured input. Although sound pressure was used to displace the flexible mechanical structure 1804, the device can be tailored to measure any physical occurrence, such as a change in temperature or the exposure to a certain chemical, or an applied force so long as the flexible mechanical structure 1804 was designed to displace as a result of the occurrence.

This displacement measuring scheme has the sensitivity of a Michelson interferometer, which can be used to measure displacements down to $1.4 \times 10^{-5}$ Å for 1 Hz bandwidth for 1 mW laser power. Various embodiments disclosed herein can provide this interferometric sensitivity in a very small volume and can enable integration of light source, reference mirrors and detectors in a mechanically stable monolithic or hybrid package. This compact implementation further reduces the mechanical noise in the system and also enables easy fabrication of arrays. The high sensitivity and low noise achieved by the various embodiments far exceed the performance of other microphones or pressure sensors based on capacitive detection.

Figure 21:
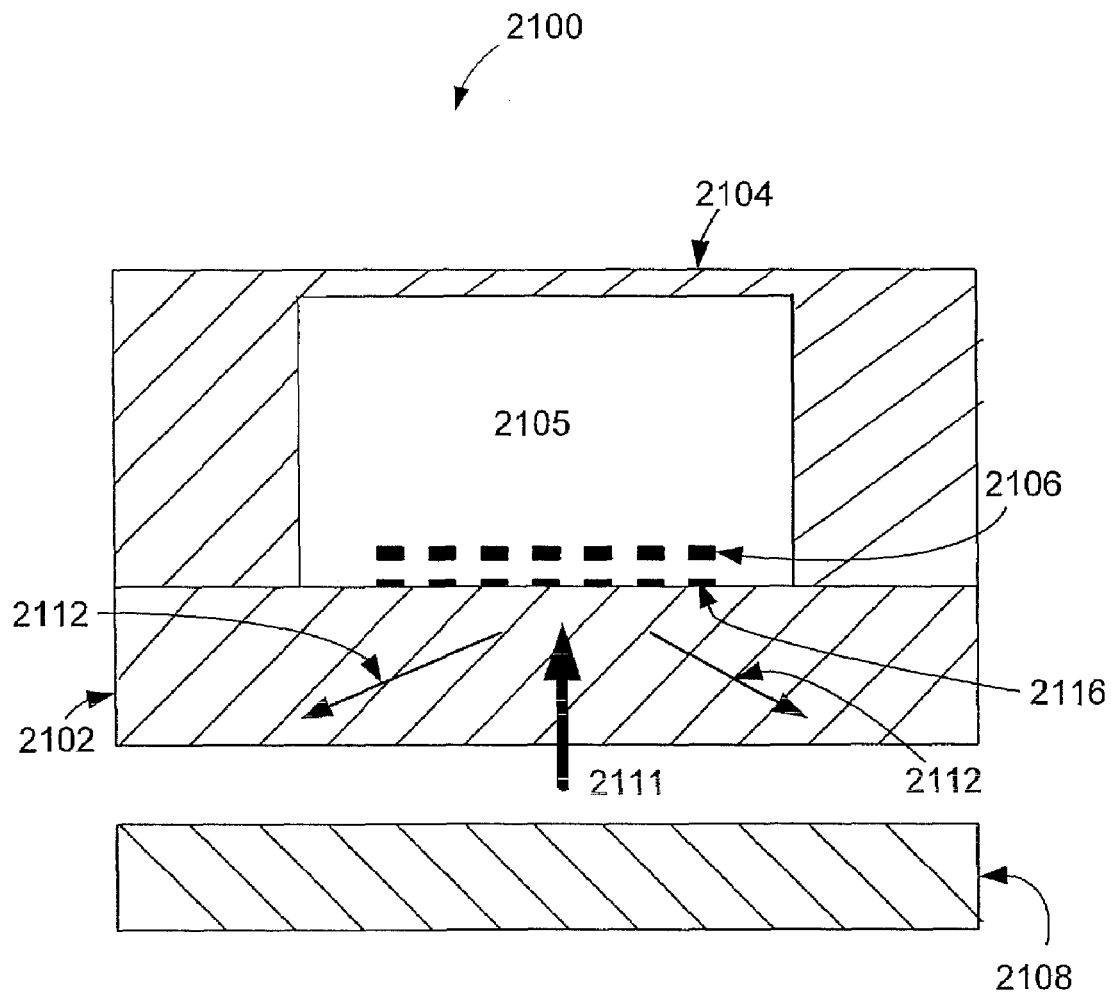
FIG. 21 shows a cross-sectional schematic diagram of another exemplary force sensor in accordance with the present teachings.

FIG. 21 depicts a cross-sectional schematic diagram of another exemplary force sensor 2100 in accordance with the present teachings. FIG. 21 shows a force sensor comprising a detection surface 2102, which allows the light source 2111 to be placed at a location behind the substrate 2102. The detection surface 2102 also allows the reflected diffracted orders 2112 to pass through, and the light intensity of any of these orders can measured at a location behind the substrate 2102. The force sensor 2100 can also comprise a flexible mechanical structure 2104, such as a diaphragm, and a diffraction grating 2106 that can be made moveable so that its position may be controlled via electrostatic actuation, with a region of the substrate serving as a bottom electrode 2116. Changing the flexible mechanical structure—grating gap thickness can be used to optimize the displacement sensitivity of the flexible mechanical structure, as discussed above with reference to FIG. 18.

Several material choices exist for the detection surface 2102 that is transparent at the wavelength of the incident light. These include quartz, sapphire, and many different types of glass, and it can be silicon for light in the certain region of the IR spectrum. Furthermore, several manufactures sell these materials as standard 100 mm diameter, 500 µm thick wafers, which make them suitable for all micro-fabrication processes including lithographic patterning. As in the force sensor 1800, several different material types may be used for the flexible mechanical structure 2104, and the cavity between the platform and diaphragm may be evacuated or filled with any type of gas mixture.

The diffraction grating 2106 may be made of any reflective material, as long as the dimensions are chosen to produce a compliant structure that may be moved electrostatically. As explained for force sensor 1800, electrostatic actuation requires a top and bottom electrode. According to various embodiments, the diffraction gating 2106 can serve as the top electrode and the bottom electrode 2116 can be formed on the substrate 2102. Furthermore, the distance between these electrodes can be small (order of a micrometer) to be able to perform the actuation with reasonable voltage levels (<100V). For example, for force sensor 2100 this means regions of both the diffraction grating 2106 and the detection surface 2102 can be made electrically conductive. If a metal or any other opaque material is chosen to form the bottom electrode 2116 on the detection surface 2102, the electrode region should exist in a region that will not interfere with the propagation of light towards the diffraction grating 2106 and the flexible mechanical structure 2104. Alternatively, a material that is both optically transparent and electrically conductive, such as indium-tin oxide, may be used to form the bottom electrode 2116 on the platform. Force sensor 2100 enables one to use the advantages of electrostatic actuation while having a large degree of freedom in designing the flexible mechanical structure 2104 in terms of geometry and materials.

Figure 22:
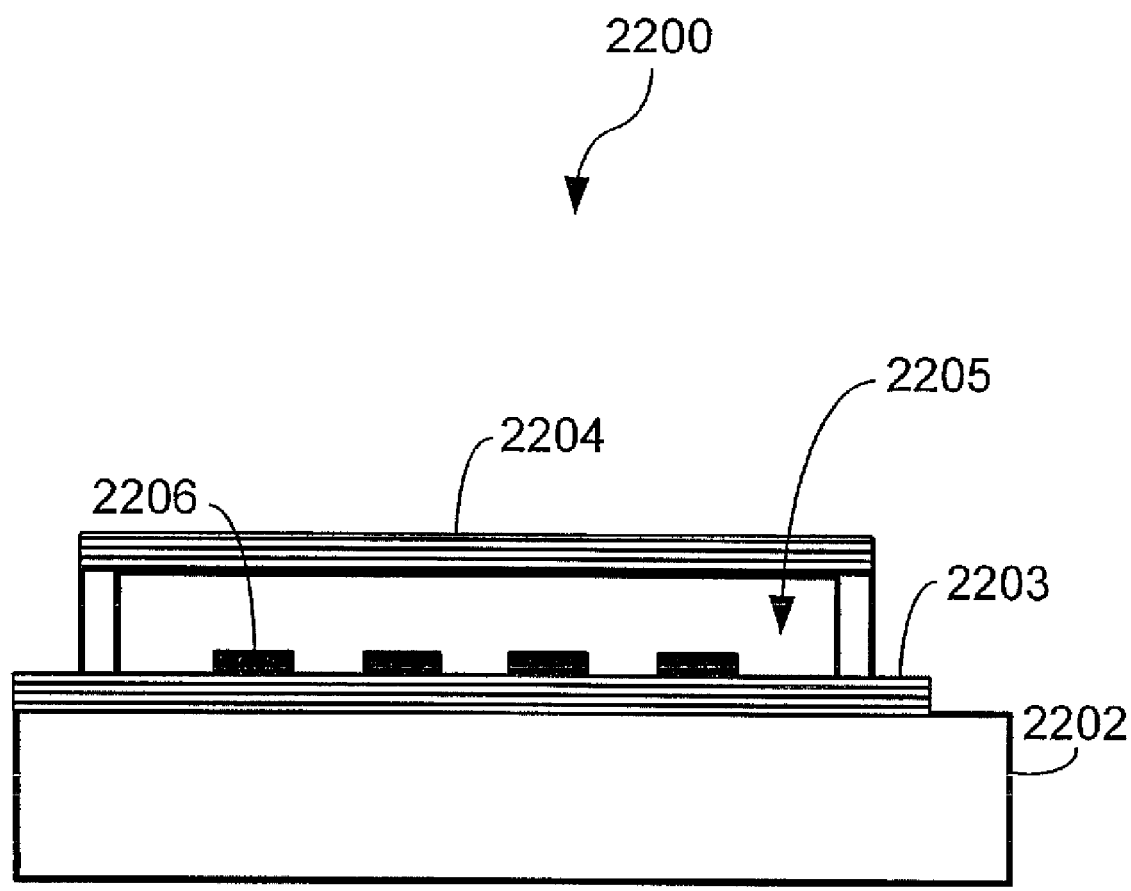
FIG. 22 shows a cross-sectional schematic diagram of another exemplary force sensor in accordance with the present teachings.

FIG. 22 depicts a cross-sectional schematic diagram of another exemplary force sensor in accordance with the present teachings. FIG. 22 shows the implementation of a resonant-cavity-enhanced (Fabry-Perot cavity) optical force sensor 2200 that can be used to improve displacement sensitivity, which may be defined as the intensity variation of the diffracted beam per unit flexible mechanical structure displacement (i.e., the change of the cavity gap) due to the external excitation. The force sensor 2200 can comprise a detection surface 2202, two parallel mirror layers, such as a bottom mirror 2203 and a top mirror 2204, and a grating 2206. According to various embodiments, the bottom mirror 2203 can be formed on the detection surface 2202 and can include the grating 2206. Further, the top mirror 2204 can also serve as a diaphragm or flexible mechanical structure.

The bottom mirror 2203 and the top mirror 2204 can be separated by the grating-embedded gap or cavity 2205, as illustrated in FIG. 22. As mentioned, the flexible mechanical structure 2204 can have a high reflectance and can act as the top mirror, and the bottom mirror 2203 can be placed beneath the diffraction grating 2206. The mirror layers can be built, for example, using a thin metal film, a dielectric stack of alternating quarter-wave ($\lambda/4$) thick media, or combination of these two materials.

Figure 23A:
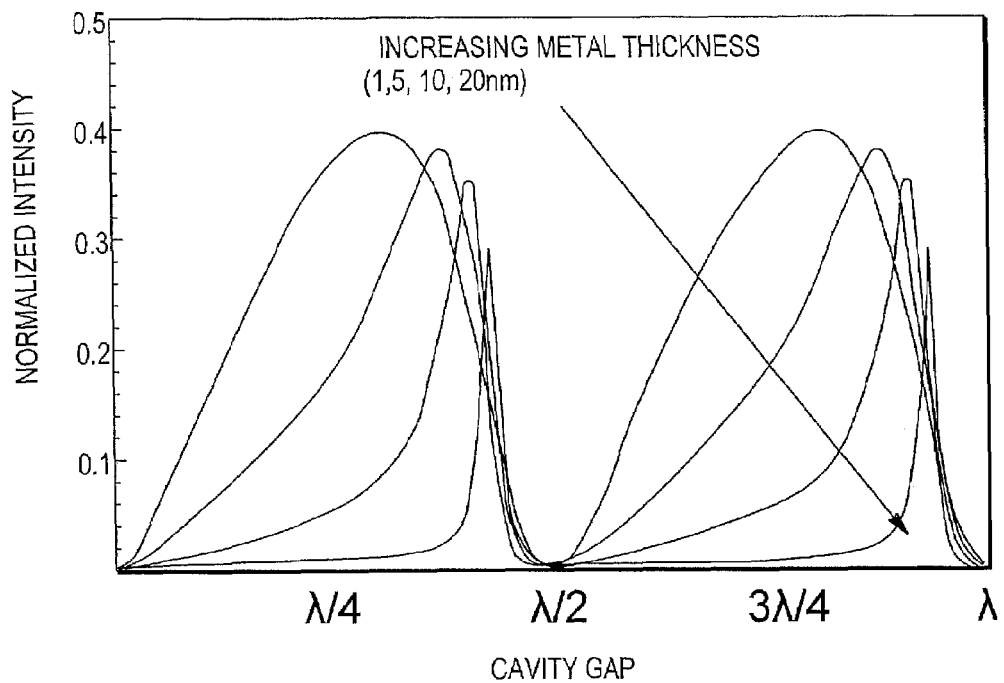
FIG. 23A shows a graph plotting normalized intensity versus gap thickness using a force sensor in accordance with the present teachings.
Figure 23B:
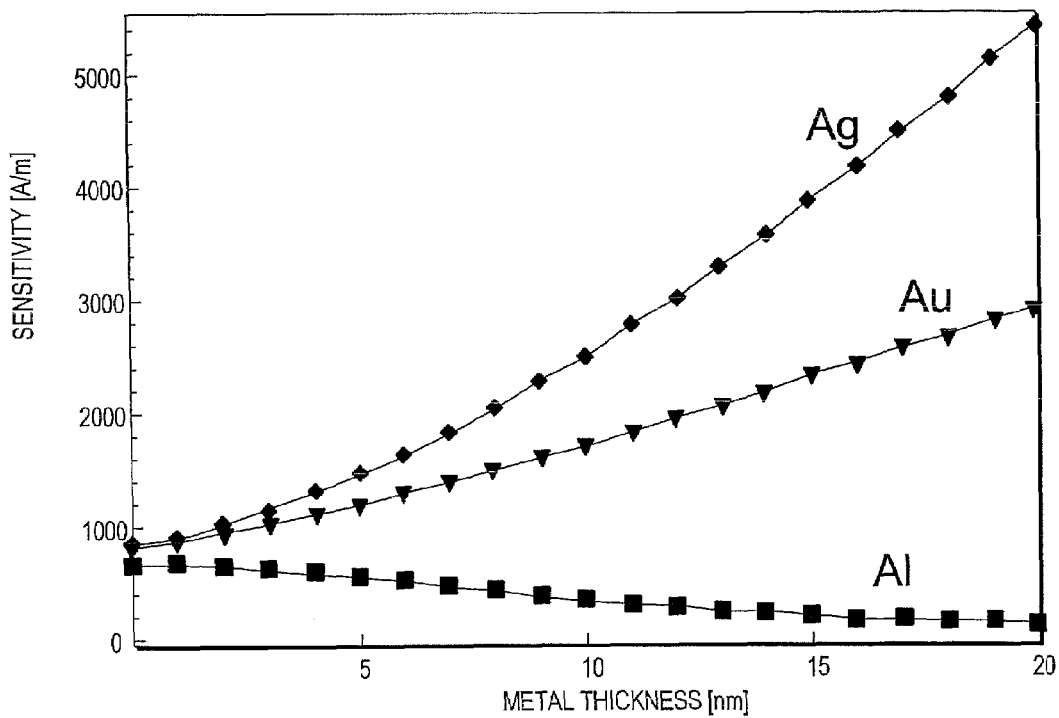
FIG. 23B shows a graph plotting sensitivity versus metal thickness using a force sensor in accordance with the present teachings.

FIG. 23A shows the calculated intensity of the first order versus the gap 2205 for the case of a metal mirror made of silver, but any other metal with a high reflectivity and low loss at the desired wavelength can be used. It can be noticed that the change in the diffracted order intensity with cavity gap 2205 in the resonant-cavity-enhanced optical force sensor 2200 departs from that shown in FIG. 19, depending on optical properties of the mirror layers, such as reflectance. As seen in FIG. 23A, the slope of the intensity curve increases with increasing metal layer thickness, hence the mirror reflectivity. The sensitivity in the unit of photocurrent per flexible mechanical structure displacement (A/m) is also evaluated when the intensity of the first-order, diffracted from an incident light of 1 mW optical power, is detected by a detector, such as a photo-diode with 0.4 A/W responsivity. The calculation result for various metals is presented in FIG. 23B. For example, the displacement sensitivity can be improved by 15 dB using a 20 nm thick silver layer for the mirror. For different metals with higher optical loss, the improvement may be less or the sensitivity may decrease as in the case of aluminum.

Figure 24A:
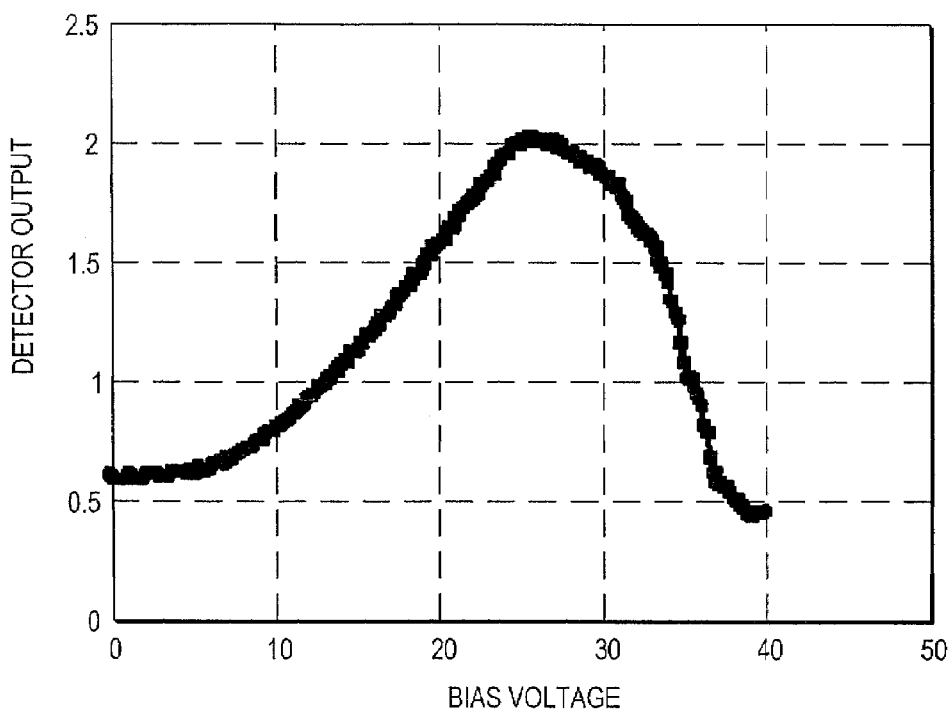
FIG. 24A shows a graph plotting detector output versus bias voltage using a force sensor in accordance with the present teachings.

FIG. 24A shows the experimental data obtained by two structures with and without an approximately 15 nm thick silver mirror layer with an aluminum diaphragm. FIG. 24A shows data for an embodiment without a mirror. Similar to FIG. 20A, increasing the DC bias voltage helps one to trace the intensity curve in FIG. 24A from right to left. Because there is no Fabry-Perot cavity formed in this embodiment, the intensity curve is smooth.

Figure 24B:
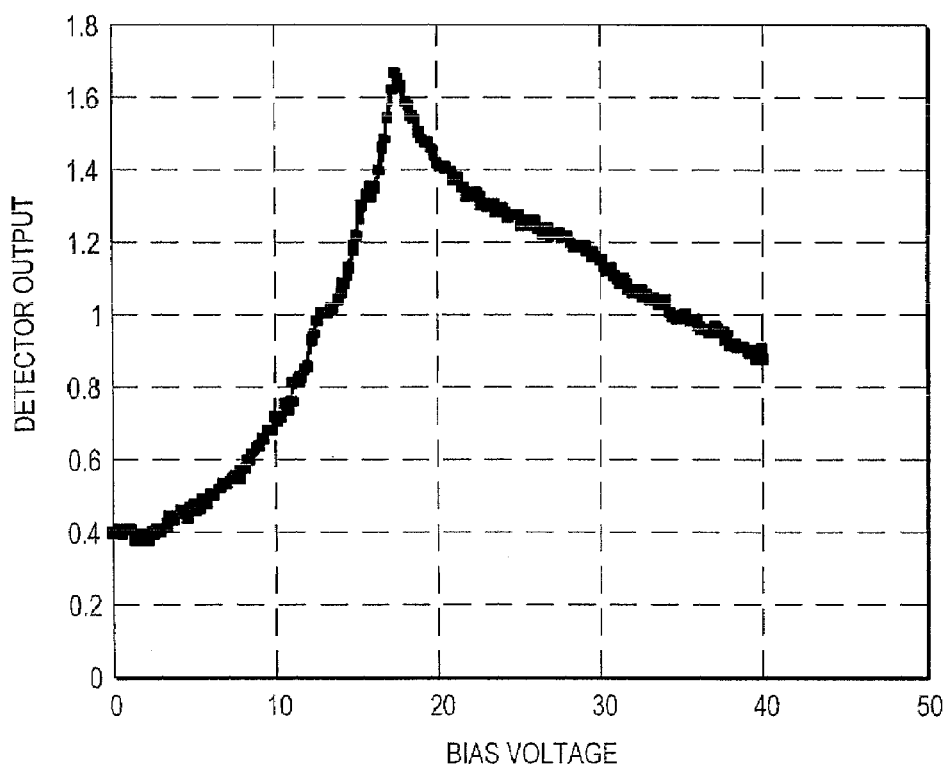
FIG. 24B shows a graph plotting detector output versus bias voltage using a force sensor in accordance with the present teachings.
Figure 24C:
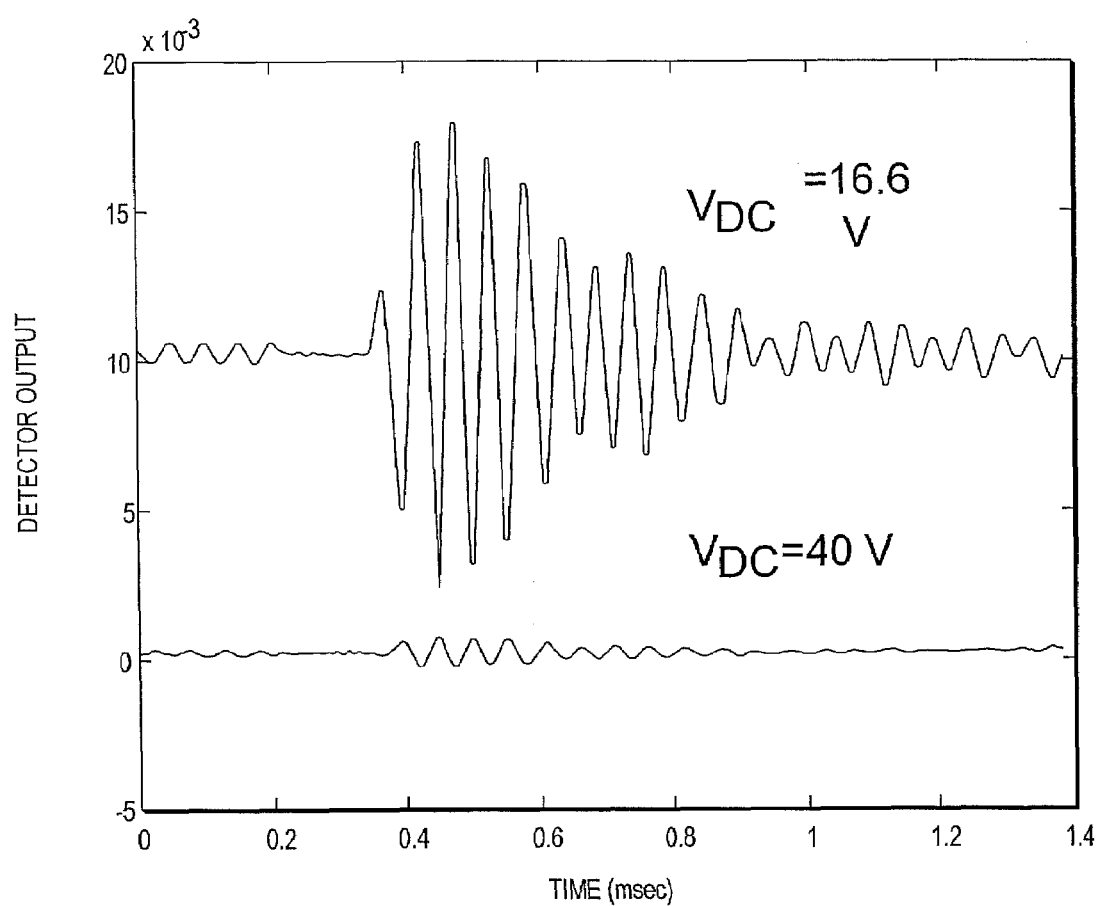
FIG. 24C shows a graph plotting photo-detector output versus time using a force sensor in accordance with the present teachings.

FIG. 24B shows the same curve for the Fabry-Perot cavity with a silver mirror. In this embodiment, the intensity curve has sharper features and large slopes around 16-18V DC bias. This is similar to the change predicted in FIG. 23A. The sensitivity dependence is also verified by subjecting the diaphragm to an external sound source at 20 kHz and recording the first order intensity at different DC bias levels. FIG. 24C shows the result of such an experiment and verifies that the optical detection signal is much larger for the 16V DC bias as compared to 40V, where the average intensity is the same. For a regular microphone without the Fabry-Perot cavity structure, one would expect to obtain larger signal levels with 40V DC bias.

Figure 25:
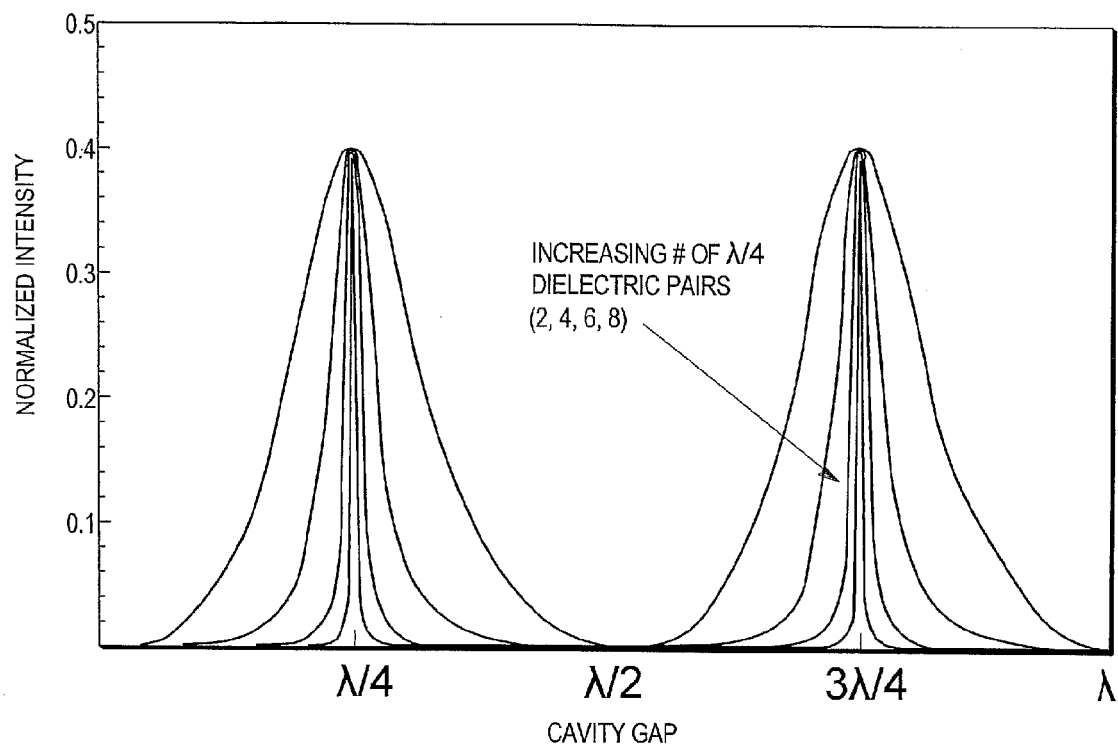
FIG. 25 shows a graph plotting normalized intensity versus gap thickness using a force sensor in accordance with the present teachings.

FIG. 25 shows the calculated intensity of the first order versus the gap 2205 for the case of the dielectric mirrors. In this embodiment the dielectric mirrors are made of silver and $SiO_2/Si_3N_4$ pairs but any other dielectric material combination resulting in a high reflectivity and low loss at the desired wavelength can be used. The reflectance of the mirror can be controlled by the change in the thickness of the metal film and the number of alternating dielectric pairs for a given choice of mirror materials. In FIG. 25, the number of pairs is increased from 2 to 8 and which in turn increases the slope of the intensity curve resulting in a higher sensitivity.

In contrast to the dielectric mirror case, peak intensity amplitude of the first order decreases with the metal mirror reflectance due to the optical loss in the metal film (FIG. 23A), and thus metals of low absorption loss provide good results for the metal-mirror applications. In addition, the optimal bias position moves toward to a multiple of $\lambda/2$ with the reflectance of the metal mirror. However, the optimal bias position can be easily achieved through electrostatic actuation of the flexible mechanical structure 2204.

The scheme of the resonant-cavity-enhanced optical force sensor can be also applied to the other microstructures described herein with a simple modification of fabrication process.

Figure 26:
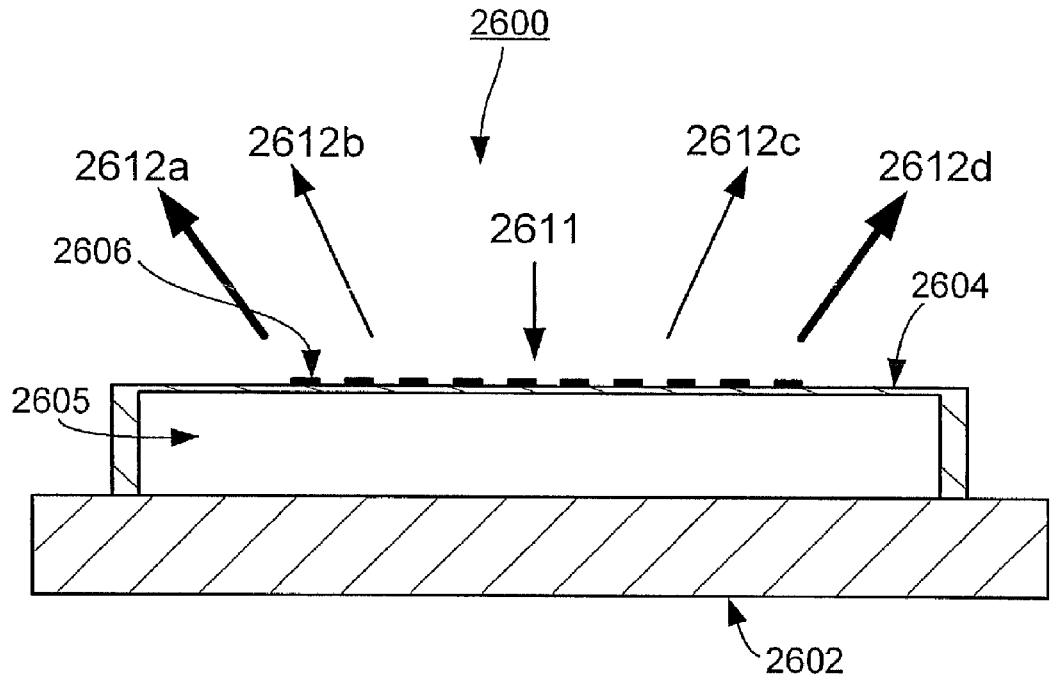
FIG. 26 shows a cross-sectional schematic diagram of another exemplary force sensor in accordance with the present teachings.

FIG. 26 depicts a cross-sectional schematic diagram of another exemplary force sensor in accordance with the present teachings. FIG. 26 shows a force sensor 2600 comprising a detection surface 2602, a flexible mechanical structure 2604 (also called a diaphragm), a gap 2605 (also called a cavity), and a grating 2606. The grating 2606 can be reflective and can be formed on the flexible mechanical structure 2604, which can be transparent. Further, the grating can comprise reflective diffraction fingers. According to various embodiments, the detection surface 2602 can be reflective. The force sensor 2600 can form a phase-sensitive diffraction grating when illuminated from the topside of the flexible mechanical structure 2604 as shown in FIG. 26. Similar to the embodiment shown in FIG. 18, the zero and all odd orders of light are reflected back and have intensities that depend on the gap 2605 between the diffraction grating 2606 and the detection surface 2602. The thickness of the gap 2605 can also include the thickness of the flexible mechanical structure 2604, which may be made of any transparent material. Examples of transparent materials include silicon dioxide, silicon nitride, quartz, sapphire, or a stretched polymer membrane such as parylene. Because the detection surface 2602 is reflective, any material, including semiconductor substrates or plastics, can suffice given that they are coated with a reflective layer, such as metal. To add electrostatic actuation, as described herein, a region of both the detection surface 2602 and the flexible mechanical structure 2604 can be made electrically conductive. For the flexible mechanical structure 2604, this can be accomplished by using a material that is both reflective and electrically conductive for the diffraction grating 2606. For example, any reflective metal would be suitable. In various embodiments, because the light source 2611 and detectors (not shown) exist on the top side of the flexible mechanical structure 2604, this particular embodiment offers remote sensing capabilities. For example, if measuring the displacement of the flexible mechanical structure 2604 due to a change in pressure is desired (as would be the case for a pressure sensor or a microphone), the detection surface 2602 can be attached to a surface and the light source 2611 and detectors can be stationed in a remote location, not necessarily close to the diaphragm.

In addition to remote measurements, the force sensor 2600 can be remotely actuated to modulate the output signal. For example, an acoustic signal at a desired frequency can be directed to the flexible mechanical structure 2604 with the grating 2606 and the output signal can be measured at the same frequency using a method such as a lock-in amplifier. The magnitude and phase of the output signal can give information on the location of the flexible mechanical structure 2604 on the optical intensity curve in shown in FIG. 19, which in turn may depend on static pressure, and other parameters such as temperature, etc. Similar modulation techniques can be implemented using electromagnetic radiation, where an electrostatically biased flexible mechanical structure with fixed charges on it can be moved by applying electromagnetic forces. In this case, the flexible mechanical structure can be made of some dielectric material with low charge leakage.

Figure 27:
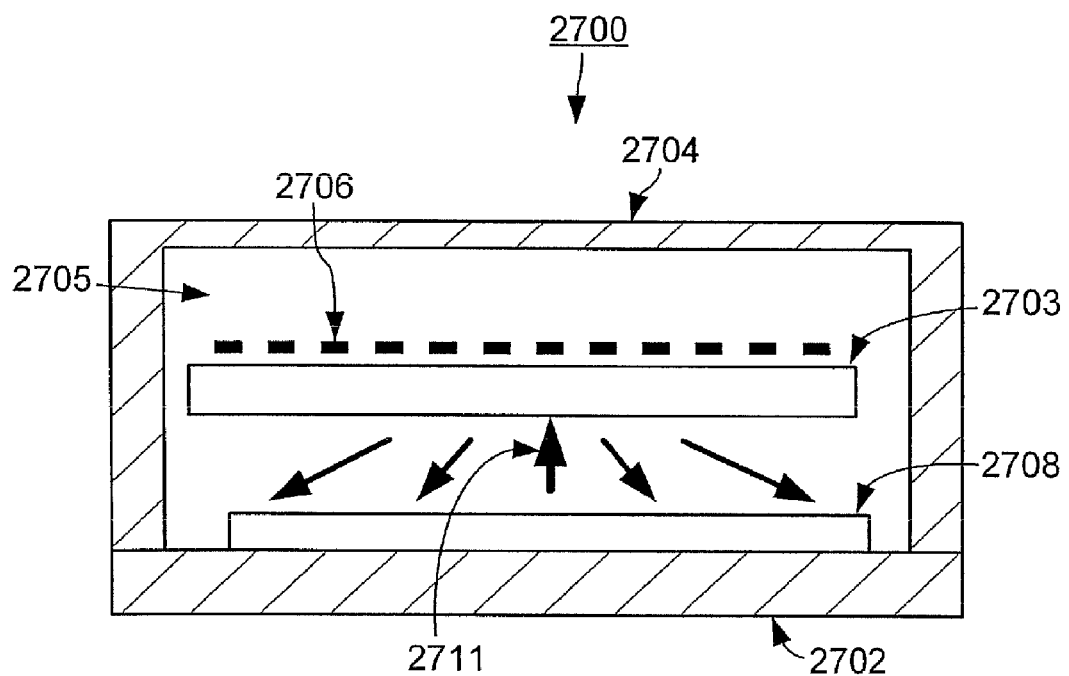
FIG. 27 shows a cross-sectional schematic diagram of another exemplary force sensor in accordance with the present teachings.

FIG. 27 depicts a cross-sectional schematic diagram of another exemplary force sensor in accordance with the present teachings. FIG. 27 shows a force sensor 2700 comprising a detection surface 2702, a transparent support comprising electrodes 2703, a flexible mechanical structure 2704 (also called a diaphragm), a gap 2705 (also called a cavity), a grating 2706, and a detector 2708. The detection surface 2702 in force sensor 2700 can be transparent so that the light source 2711 and detectors 2708 can be placed at a location behind the detection surface. However, placing the light source and detectors 2708 on the surface of the detection surface is equally viable and allows the usage of substrates such as silicon wafers or printed circuit boards. According to various embodiments, the grating 2706 can be moveable. As discussed herein, controlling the gap 2705 between the grating 2706 and the reflective flexible mechanical structure 2704 can be used to optimize detection sensitivity.

Various methods can be used to control the thickness of the gap 2705, such as, for example, controlling the flexible mechanical structure 2704 position, the grating 2706 position, or both. Furthermore, the force sensor 2700 allows placement of the grating 2706 anywhere in the cavity 2705 between the light source 2711 and the flexible mechanical structure 2704.

According to various embodiments, the use of highly reflective semi-transparent layers to enhance displacement sensitivity using Fabry-Perot cavity, as described by, for example the embodiment shown in FIG. 22. For example, a Fabry-Perot cavity can be implemented with any of the other embodiments mentioned so far, when the semitransparent layer is placed in close proximity to the diffraction grating.

For example, the sensors shown in FIGS. 18 and 21 can place a semi-transparent layer on the top or bottom surface of the grating. Further, the force sensor shown in FIG. 26 can place a semi-transparent layer on either the top or backside of the flexible mechanical structure, which is where the diffraction grating is located in this case.

Figure 28A:
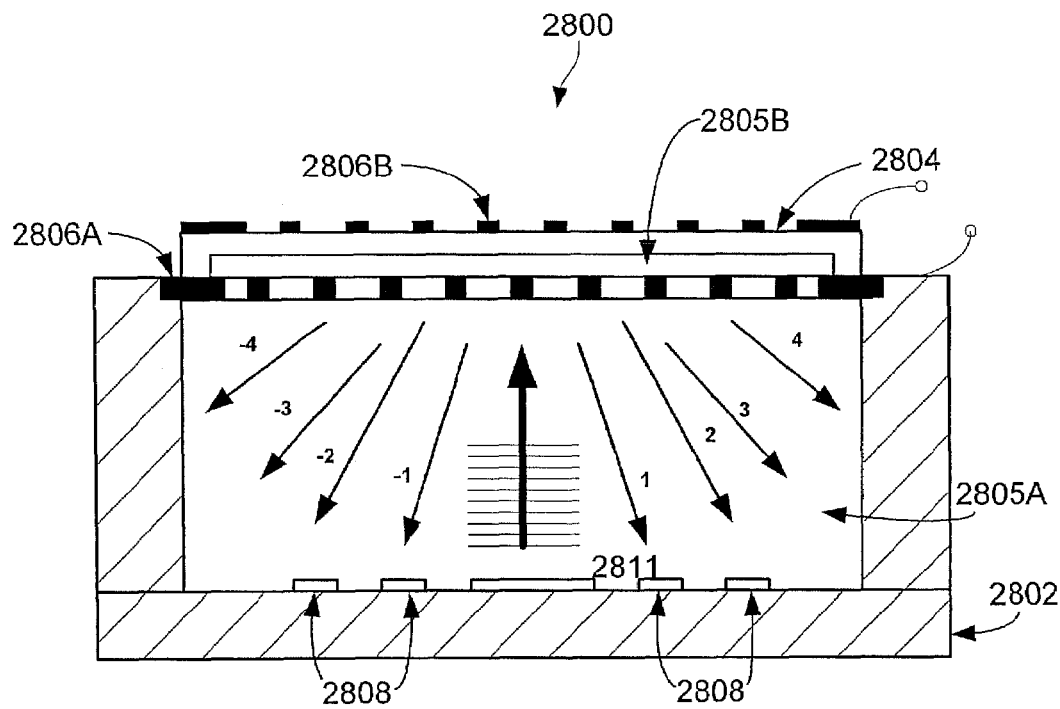
FIG. 28A shows a cross-sectional schematic diagram of another exemplary force sensor in accordance with the present teachings.

FIG. 28A depicts a cross-sectional schematic diagram of another exemplary force sensor in accordance with the present teachings. FIG. 28A shows a force sensor 2800 comprising a detection surface 2802, a flexible mechanical structure 2804 (also called a diaphragm), a first gap 2805A (also called a first cavity), a second gap 2805B (also called a second cavity), a first grating 2806A (also called a reference grating), a second grating 2806B (also called a sensing grating), a detector 2808, and a light source 2811. The second grating 2806B can be formed on the flexible mechanical structure 2804, which can be transparent. Moreover, the flexible mechanical structure 2804 can be formed over the first grating 2806A.

In this embodiment, the flexible mechanical structure 2804 is or has a reflective diffraction grating, second grating 2806B, rather than a mirror-like uniform reflector surface described above. Moreover, the second grating 2806B on the flexible mechanical structure 2804 reflector can have the same periodicity as the first grating 2806B, but can be offset and can have diffraction fingers whose widths are smaller than the gap between the first grating 2806A. This offset allows some of the incident light to pass through. This structure, as shown in FIG. 28A, allows some of the incident light from light source 2811 to transmit through the whole force sensor 2800 and also introduces new diffraction orders in the reflected field. As such, this provides a different kind of phase grating than those described above.

Figure 28B:
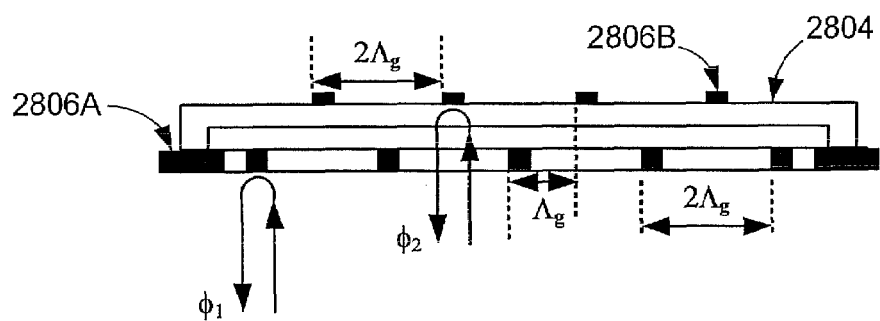
FIG. 28B shows a cross-sectional schematic diagram of a portion of the force sensor shown in FIG. 28A in accordance with the present teachings.

FIG. 28B is provided to assist in understanding the operation of a sensor having two gratings. For example, one can consider the phase of the light reflected from the first grating 2806A (also called the reference grating) ($\phi_1$) and the second grating 2806B on the flexible mechanical structure 2804 ($\phi_2$). When the difference between $\phi_1$ and $\phi_2$ is $2k\pi$, k=0, 2, 4, . . . , the apparent period of the grating is $\Lambda_g$ (apparent reflectivity of 1, 0, 1, 0 regions assuming perfect transmission through the transparent diaphragm 2804) and the even diffraction orders are reflected with angles $$\sin(\theta_n) = n\frac{\lambda}{\Lambda_g}, n = 0, \pm 2, \pm 4 \ldots \quad [2]$$

In contrast, when the difference between $\phi_1$ and $\phi_2$ is $m\pi$, m=1, 3, 5, . . . , the apparent period of the grating is $2\Lambda_g$ (apparent reflectivity of 1, 0, −1, 0, 1 regions assuming perfect transmission through the flexible mechanical structure 2804) and the odd diffraction orders are reflected with angles $$\sin(\theta_n) = n\frac{\lambda}{2\Lambda_g}, n = 1, \pm 3, \pm 5 \ldots \quad [3]$$

Here it is assumed that the width of the reflective fingers on the reference grating 2806A and the second grating 2806B on the flexible mechanical structure 2804 are the same. This does not have to be the case if the interfering beams go through different paths and experience losses due to reflection at various interfaces and also incidence angle variations. The diffraction grating geometry can then be adjusted to equalize the reflected order intensities for optimized interference.

In this double grating structure, shown, for example in FIG. 28A, the intensity of the odd and even numbered orders change to 180° out of phase with each other when the gap 2805B between the reference grating 2805A and sensing grating 2806B changes. The even numbered diffraction orders are in phase with the zero order reflection considered in the previous embodiments.

One advantage of having other off-axis even diffraction orders in phase with the specular reflection is that it enables one to easily use differential techniques. This is achieved by taking the difference of the outputs of two detectors positioned to detect odd and even orders, respectively. Hence the common part of the laser intensity noise which is common on both orders can be eliminated.

The sensors described herein can be used with various AFM systems and methods to measure, for example, the attractive and repulsive forces experienced by the tip to provide information on various surface forces and sample properties. Moreover, the force sensors described herein can be used with several AFM methods, including nanoindentation, force modulation, ultrasonic AFM, pulsed force mode, and dynamic force spectroscopy that have been developed to characterize the viscoelastic properties of the material under investigation.

Thus, a force sensor for probe microscope for imaging is provided that can offer the unique capability for measuring interaction forces at high speeds with high resolution. In addition to optical interferometer, various integrated readout techniques including capacitive, piezoelectric or piezoresistive can be used. Similarly, the actuators described herein can be a thin film piezoelectric, a magnetic, or a thermal actuator. Further, force sensors with multiple tips, where several sensing and actuation functions are implemented in the same device are also envisioned. Still further, electrical measurements, chemical measurements, information storage and nanoscale manipulations can be performed all while simultaneously obtaining topography images of the sample in gas or liquid media. As such, the sensors and the methods of imaging described herein open a new area in the field of probe microscopy. This new device can enable high speed imaging and provide images of elastic properties and surface conditions of the sample under investigation.

Force sensors of the type described above in connection with the several exemplary embodiments are particularly suitable for probe microscope designs and imaging methods. In the following exemplary embodiments, multi-directional manipulation of the described force sensors will be explained for measurement of structures having three-dimensional topography. Movement of the force sensors is described with minimal contact and with non-contact. In particular, the force sensors described can be manipulated to measure the topography of microscale and nanoscale three dimensional structures with nanometer and sub-nanometer resolution.

The above described exemplary force sensors suitable for the multi-directional manipulation can be characterized as force sensing integrated readout and active tip (FIRAT) type. Upon manipulating one or more FIRAT probes in three-dimensional space with respect to an object or surface, topography of the surface or object can be obtained. Even further, imaging can occur within a topographical trench or other recessed configuration without using an external scanner and controller loop to scan the sample or the substrate of the FIRAT probe.

Currently, an atomic force microscope (AFM) is used as a calibration tool for imaging critical dimensions in microelectronics due to its capability of examining three dimensional structures. These three dimensional structures typically include those having sidewalls from 10 nm to 5 µm in height. However, when measuring the sidewall structure in deep trenches, AFM cantilevers need to be tilted to have the tip interact with the sidewall being measured. This can be inconvenient and can prohibit imaging of both the top to bottom and sidewall profiles with acceptable throughput.

Accordingly, the exemplary embodiments that follow describe the maneuvering of the force sensor structure and more particularly the probe tip of the force sensor structure, in different directions to provide multiple degrees of freedom for tip motion and orientation.

Referring to FIGS. 29A and 29B, there is shown a top schematic and side sectional schematic views of a force sensor structure 2900 in which electrostatic actuation is employed to enable three dimensional imaging in accordance with the present teachings.

In the exemplary embodiment, the force sensor structure 2900 can comprise a support surface such as a substrate 2902, a flexible mechanical structure 2904, a gap 2905, plural top electrodes such as electrodes 2916a-b, plural bottom electrodes such as electrodes 2920a-b, and a tip 2907. In some embodiments, the force sensor 2900 can also include a grating (not shown). According to various embodiments, the flexible mechanical structure 2904 can be fully clamped around its circumference. Alternatively, the flexible mechanical structure 2904 can be a clamped-clamped beam with a rectangular or H-shape, where the short edges at the ends are clamped. Still further, the flexible mechanical structure 2904 can be a cantilever structure or a similar structure that changes shape in a predictable manner in response to a force applied to the tip 2907. These types of structures are described above in connection with FIGS. 10B through 10D and are applicable to the various exemplary embodiments herein.

The tip 2907 of the force sensor structure 2900 can be made from a variety of materials that enable a high aspect ratio for the tip. The high aspect ratio will ensure that deep trenches or holes of a dimensional structure can be probed. For example, the tip 2907 of the sensor structure can be made from any of single crystal silicon, silicon nitride, tungsten, platinum, or other nanostructures such as carbon-based or ZnO nanotubes. The tip 2907 can be fabricated as an integral part of the flexible mechanical structure 2904 or can be attached to the mechanical structure 2904 using different techniques such as adhesives, focused ion beam deposition, or welding by help of focused ion beam deposition.

Each of the plurality of separate top electrodes 2916a-b can be electrically isolated and formed in the flexible mechanical structure 2904. Moreover, the bottom electrodes 2920a-b can be spaced apart from the separate top electrodes 2916a-b by the gap 2905. In some cases, where the flexible mechanical structure 2904 is electrically conductive, separate bottom electrodes 2920a-b may be required. Further, the bottom electrodes can be positioned in the substrate 2902 and can be contacted by electrode terminals 2921a-b, respectively. Similarly, each of the separate top electrodes 2916a-b can be contacted by electrode terminals 2917a-b, respectively. In some cases, the electrode terminals 2921a-b and 2917a-b can be capacitive sensing terminals that can detect a capacitance change formed between the separate top electrodes 2916a-b and the bottom electrodes 2920a-b.

In FIGS. 29A and 29B, a voltage can be applied between the electrode terminals 2917a and 2921a as well as between electrode terminals 2917b and 2921b. The electrode terminals therefore integrate the various electrodes and the voltage can be used to selectively control and move any of the separate top electrodes 2916a-b, so that they can serve as actuators. Further, the separate top electrodes 2916a-b or separate bottom electrodes 2920a-b can also perform sensing, similar to that of a dual electrode capacitive micromachined ultrasonic transducer where the vibrations of the sensor flexible mechanical structure are converted to electrical current signals through change in capacitance.

Selected ones of the electrode terminals 2917a-b and 2921a-b are operable as actuators to manipulate the flexible mechanical structure 2904, and thereby direct the tip 2907 of the force sensor 2900. Actuation of the actuatable electrode terminals is by known controllers which apply different DC bias or AC voltages of different amplitude, frequency and phase. Typically, for a clamped-clamped beam structure, at least two of the electrostatic actuator electrodes, such as electrostatic actuators 2917a-b, can be selectively actuated. In the case of a four sided beam structure, four selectively actuated independent actuators can be utilized as will be further described. This multiple electrode configuration, in addition to application of DC bias or AC voltages of different amplitude, frequency and phase enables actuation of the fundamental and higher order symmetrical and anti-symmetrical modes of the flexible mechanical structure 2904. These different modes can be useful for imaging the topography of three-dimensional structures. Furthermore, they can be useful to apply forces in three-dimensions to sample surfaces and measure their reaction. Particular applications can include measurement of friction forces, local piezoelectric and magnetic forces.

The force sensor 2900 can be used as described above in connection with FIG. 10A for fast imaging where bias voltages are applied between the electrode terminals 2917a, 2917b and the bottom electrode terminals 2920a-b and alternating voltages of the same or reverse phase are applied to the electrode terminals 2917a and 2917b to vibrate the tip 2907 vertically or laterally to have intermittent contact with a sample surface. In some cases, the forces between the tip 2907 and a close by surface can be sensed without contact for non-contact imaging. The bias voltages applied to the electrode terminals 2917a, 2917b also control the position of the tip 2907 in response to changes in capacitance detected between the electrode terminals 2917a-b and the bottom electrode terminals 2921 a-b. An external controller (not shown) can read the detected capacitance change and generate the control signals (bias voltages) applied to the electrode terminals 2917a-b and the bottom electrode terminals 2921 a-b.

In the exemplary embodiment, the clamped-clamped beam structure is used to move the tip in vertical and one of the lateral directions by applying different DC bias or AC voltages of different amplitude, frequency and phase using the two electrostatic actuator electrodes. Likewise, the structure can be extended in the other lateral direction by having a four-sided beam structure with four independent actuators. The tip 2907 of the probe can be made from a variety of materials such as silicon, silicon nitride, tungsten, platinum or other nanostructures such as carbon-based or ZnO nanotubes. The important aspect of the tip structure for topography measurement is that it has a high aspect ratio so that deep trenches or holes can be probed.

Figure 30:
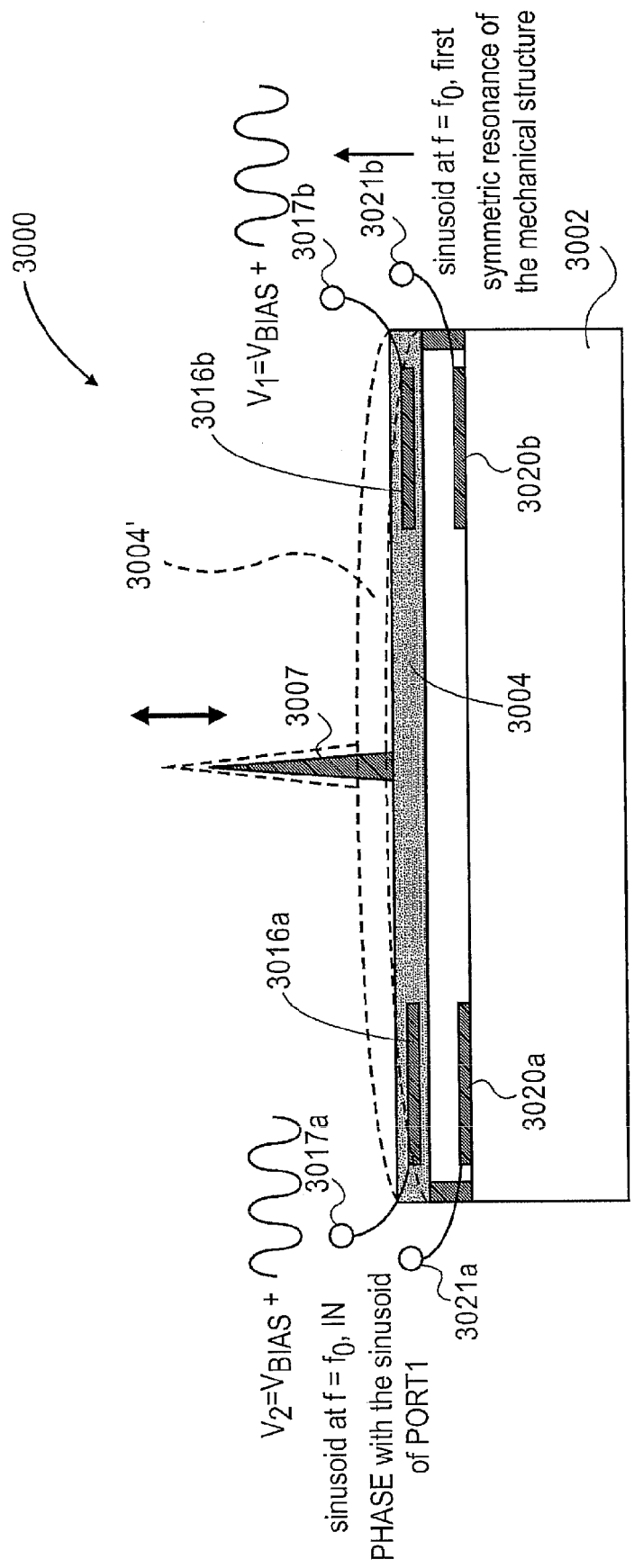
FIG. 30 shows a cross-sectional schematic diagram of an oscillation of the force sensor in accordance with the present teachings.

FIG. 30 shows a cross-sectional schematic diagram of generating an oscillation of the flexible mechanical structure 3004, and thereby the force sensor tip 3007 in vertical and lateral orientations. The probe tip 3007 can be vibrated in a vertical planar motion with respect to the substrate 3002 by exciting the first symmetric resonance of the force sensor structure 3000. By applying a large bias voltage to control the bias position for the control loop and adding a small sinusoidal signal at the resonant frequency $f_0$ to the electrostatic actuation ports 3017a-b, the probe 3007 can be used for fast tapping mode or non-contact mode imaging of planar, lateral structures.

In order to impart the vertical motion, the sinusoid generated by electrostatic actuation at 3017a is IN PHASE with the sinusoid generated by the electrostatic actuation at 3017b. With in-phase vibrations between the electrostatic actuators 3017a-b, the flexible mechanical structure 3004 is oscillated to an offset position 3004'. The offset position of the mechanical structure at 3004' is offset from or bowed away from its original plane which is parallel to the substrate 3002.

Figure 31:
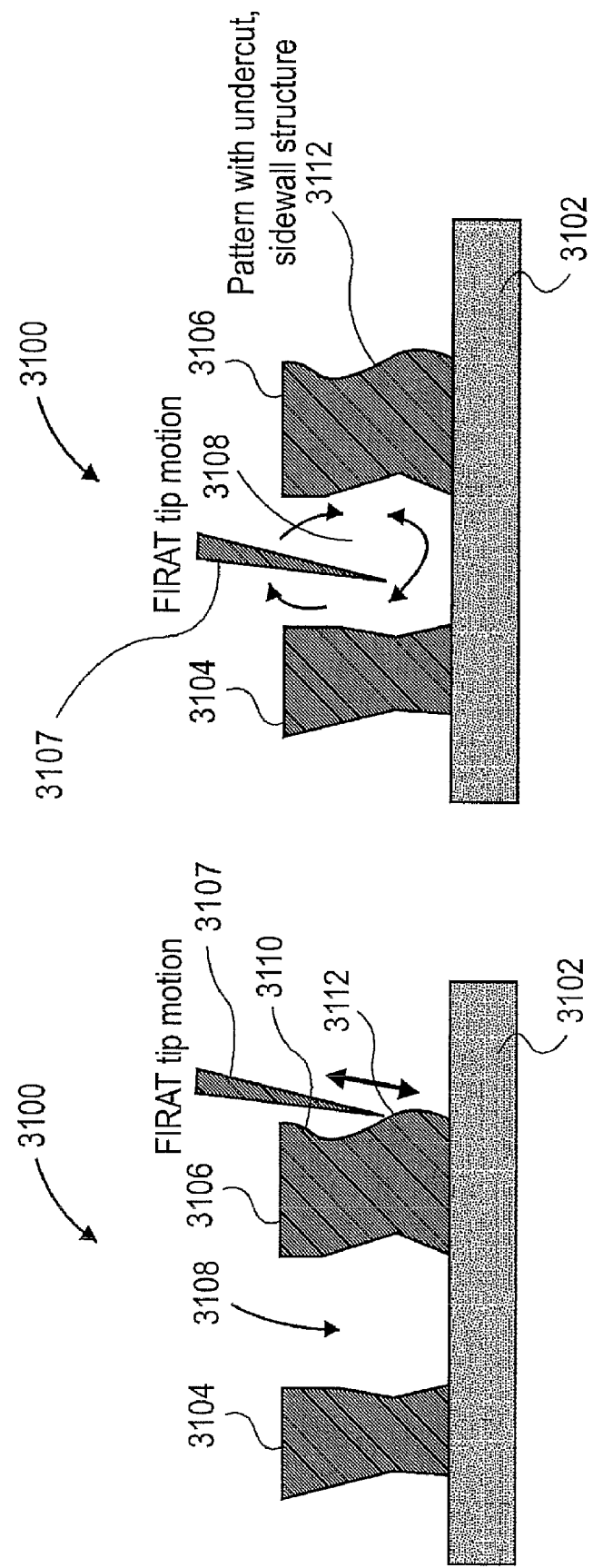
FIG. 31A shows a side schematic diagram of a force sensor oscillation in accordance with the present teachings.
FIG. 31B shows a side schematic diagram of a further force sensor oscillation in accordance with the present teachings.

In addition to the vertical and horizontal oscillation of the mechanical structure 3004 of the force sensor 3000, the embodiments described herein enable an oscillation of the probe tip 3007 an at angle normal to a three-dimensional structure as in FIG. 31A and in an elliptical orbit as shown in FIG. 31B.

A typical dimensional structure 3100 can be, for example, a portion of a microelectronic device structure. The structure 3100 can include a substrate or support 3102, and surface variations such as protrusions 3104 and 3016 generated as a result of etching, patterning and the like during fabrication of a circuit or semiconductor device, for example. The surface structures 3104 and 3106 can include trenches or holes 3108 between adjacent surface structures as defined by sidewalls 3110 of the surface topography. In particular, the sidewalls 3110 can be patterned to include undercut portions 3112 as shown.

As shown in FIG. 31A, oscillating the probe tip 3107 in a desired motion pattern at an angle normal to a surface structure 3106 is suitable for inspecting a sidewall 3112 thereof. In FIG. 31B, the probe tip 3107 is moved in an elliptical orbit to simultaneously provide both lateral tapping and vertical tapping signals. Similar motion patterns can be used for non-contact operation where the frequency shifts or oscillation amplitude variations are used to control parameters. The following describes how these probe tip 3107 motion patterns can be obtained with the force sensor of FIGS. 29A-B.

FIG. 32 is a side schematic diagram of a lateral oscillation of the force sensor in accordance with the present teachings. It will be apparent that the force sensor shown in FIG. 32 employs the force sensor elements as described in connection with FIGS. 29A and 29B. In order to impart motion to the probe tip 3207, different bias signals are selectively applied to the actuation ports 3217a (also labeled as Port 2) and 3217b (also labeled as Port 1).

By applying the different bias signals to the actuation ports 3217a and 3217b, the portions of the flexible mechanical structure 3204 close to the fixed edges thereof can each be pulled down toward the substrate 3202 by different amounts. For example, the edge of the flexible mechanical structure 3204 closer to the actuation port 3217b can be pulled down toward the substrate 3202 by a greater distance than the edge adjacent the actuation port 3217a.

Since the electrodes 3216a-b are positioned close to the edges of the flexible mechanical structure 3204, an actuation range can be the full distance of the gap 3205 between the flexible mechanical structure 3204 and the substrate 3202. For example, with a 1-10 μm gap and a 50 μm long flexible mechanical structure 3204, the flexible mechanical structure 3204 can be manipulated to form an angle in the range of 1.1° to 10° with respect to normal. Accordingly, with the probe tip 3207 seated on the flexible mechanical structure, 3204, the probe tip will be directed at similar angles. This described range of angles is adequate for tapping on a sidewall 3110. For a 5 μm high probe tip 3207, this corresponds to a 100 nm to 800 nm lateral distance from the base to the tip of the probe 3207. Therefore, small objects can be imaged by selectively directing the probe tip.

In order to vibrate the tip 3207 in a linear direction at one of the described angles, sinusoidal signals with proper amplitudes are added to the actuator input signal as shown in FIG. 32. In this case a higher bias voltage is applied to the right side of the flexible mechanical structure 3204 as compared to the left side ($V_{DC1} > V_{DC2}$). The frequency of this signal can be chosen to be the resonant frequency of the symmetric mode of the structure taking into account the effect of the bias voltage in the system dynamics. A similar result can be obtained using separate piezoelectric actuators (not shown) integrated to the flexible mechanical structure 3204. Similar motion can be obtained by applying AC signals higher or below the resonance frequencies of the flexible mechanical structure 3204.

Referring now to FIG. 33, a lateral oscillation of the probe tip 3307 can also be generated according to the present teachings. As with the linear oscillation, the flexible mechanical structure 3304 is manipulated by selective electrostatic actuation at the electrostatic actuation ports 3317a-b. In general, the probe tip 3307 is moved laterally using the first anti-symmetric resonance of the vibration mode of the flexible mechanical structure 3304 where the probe tip 3307 is located at a nodal point of the structure. More specifically, the sinusoid at electrostatic actuation port 3317b (Port 2) is excited at a first anti-symmetric resonance of the flexible mechanical structure 3304 while the sinusoid at the electrostatic actuation port 3317a (Port 1) is excited to be OUT of phase with the sinusoid of Port 1. This arrangement generates a lateral movement of the probe tip 3307 with respect to the substrate 3302.

With the probe tip 3307 at the node of this vibration mode as shown in FIG. 33, the resultant lateral motion can be used for tapping or non-contact mode imaging of sidewalls 3110. In order to efficiently excite this mode, the same polarity bias (control) voltages are applied in addition to out-of-phase sinusoidal signals at the resonant frequency, $f_1$. Alternatively, in-phase sinusoidal signals at the resonant frequency $f_1$ can be applied in addition to bias (control) voltages of reversed polarity. Since the frequencies $f_0$ and $f_1$ can be designed to be far from each other and non-harmonically related, these two modes can be independently excited to achieve the tip motion depicted in FIG. 31B. In general, the voltages that can be applied to the electrical actuation Ports 1 and 2 can be described as below.

$$V_1 = V_{1bias}(t) + A\cos(2\pi f_0 t) + B\cos(2\pi f_1 t) \text{ and } V_2 = V_{2bias}(t) + C\cos(2\pi f_0 t) + D\cos(2\pi f_1 t)$$

By way of further explanation, $V_{1bias}(t)$ is large for controlling and bending; $A\cos(2\pi f_0 t)$ is for symmetric mode actuation; and $B\cos(2\pi f_1 t)$ is for anti-symmetric mode actuation.

The relatively slowly varying $V_{1bias}$ and $V_{2bias}$ voltages control the shape of the beam, enable linearized operation of the electrostatic actuators, and are used as the actuator in the control loop. The coefficients A, B, C, D determine the orbit of the tip oscillation. It is possible to have simultaneously non-zero values for all these amplitudes to have the tip move laterally at one frequency and vertically at another. Similarly, the tip can be moved vertically using more than one symmetrical vibrational mode by applying appropriate signals. By decoding and separately detecting the motions, it is possible to run separate control loops to image lateral and vertical dimensions using model-based control and imaging software.

For fast imaging the force sensor probe tip 2907 can provide a motion range of 2-5 μm in the vertical direction and up to 0.5 μm in the X-Y directions by using the integrated actuators 2917a-b. This can enable movement of the probe tip 2907 by a range sufficient to image 100-200 nm high and 20 nm-100 nm wide photoresist structures and their sidewalls encountered in microelectronics processing. The resonant frequencies can be in the range of 1 kHz to 10 MHz depending on the speed, actuation range, and detection limitations. Micromachined membrane, beam and cantilever based structures have been successfully developed and used in this frequency range. The imaging described has position control accuracy on the order of 0.1 nm in three-dimensional space.

As indicated, the detection methods available by the present embodiments also include multi-directional, multi-frequency probe tip motion.

The exemplary force sensors including the tip probe 2907 enables detection of a force applied to the tip in different directions by measuring its effect on the flexible mechanical structure 2904 with multiple detectors, and processing the detector output signals in different ways. These multiple detectors can use optical, capacitive, piezoresistive or piezoelectric methods.

Figures 34A, 34B:
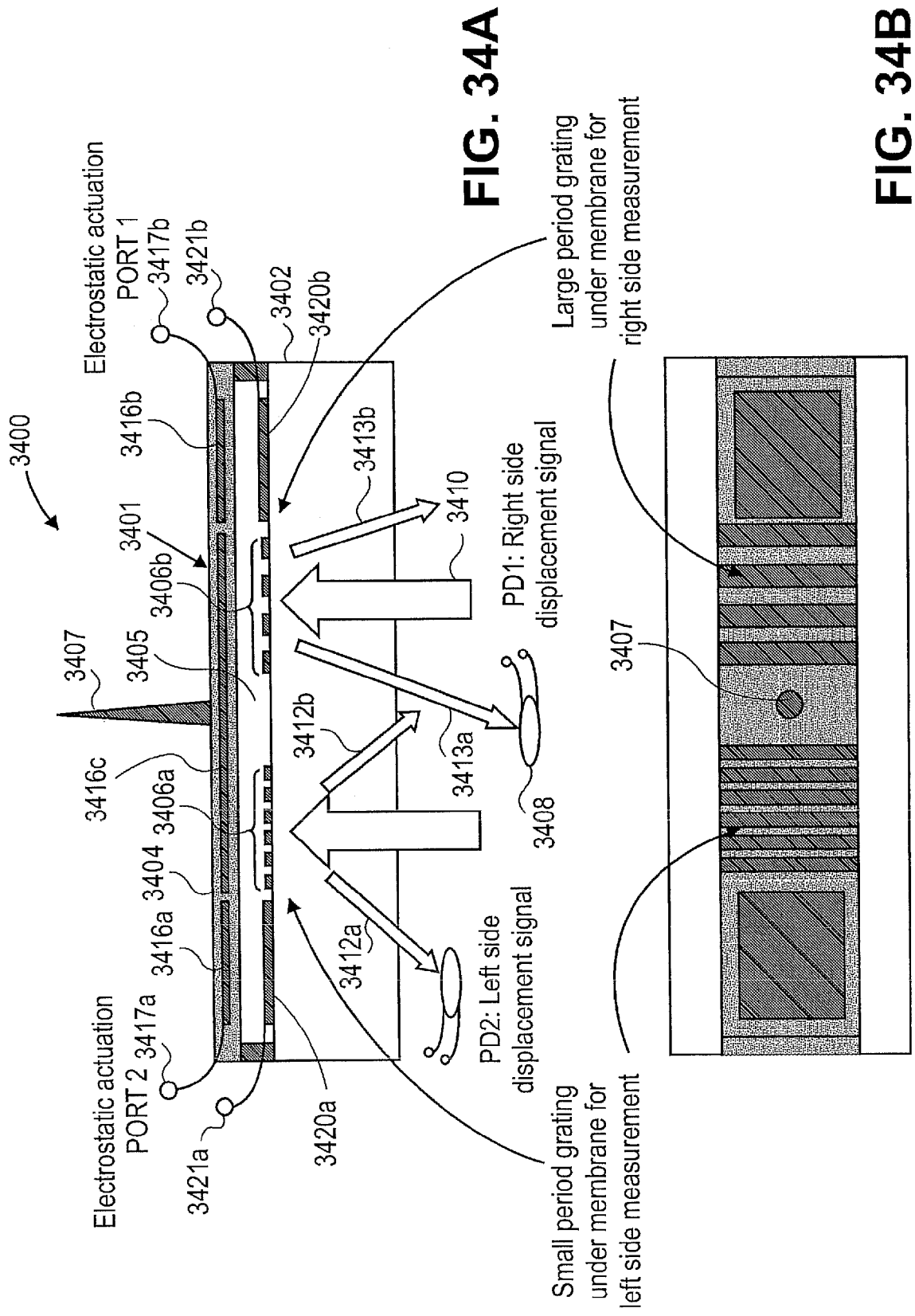
FIG. 34A shows a side schematic diagram of a force sensor having multiple optical detection ports in accordance with the present teachings.
FIG. 34B shows a top schematic diagram of the force sensor shown in FIG. 34A showing the location of gratings with different periods in accordance with the present teachings.
Figure 34C:
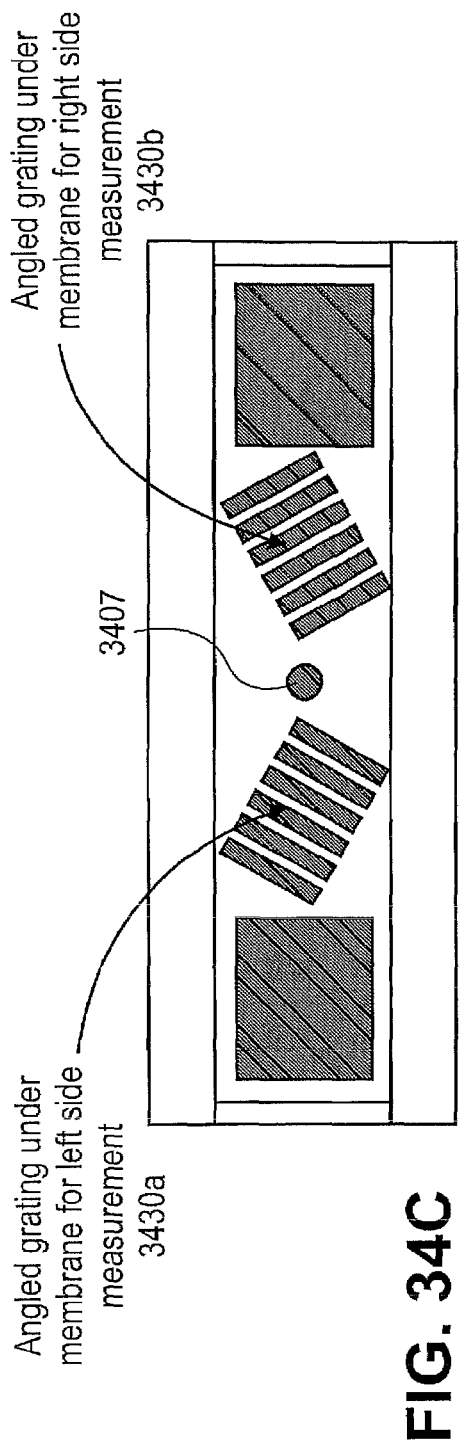
FIG. 34C shows a top schematic diagram of the force sensor shown in FIG. 34A showing the location of gratings with different orientations in accordance with the present teachings.

As an example, FIG. 34A shows a side sectional schematic and FIGS. 34B, and 34C show top schematic views of a force sensor having multiple optical detection ports in accordance with the present teachings. In these figures, the force sensor unit 3400 can comprise a force sensor 3401, a detection surface 3402, a flexible mechanical structure 3404, a gap 3405, a tip 3407, a plurality of separate top electrodes, such as electrodes 3416a-c, a pair of bottom electrodes, such as electrodes 3420a and 3420b, a plurality of gratings, such as first grating 3406a and second grating 3406b, and at least one detector 3408. The first grating 3406a can have a different grating period than the grating period of 3406b. Furthermore, the first grating 3406a can have a different orientation as compared to the grating 3406b. These variations in grating structures help separate the readout beams to measure displacement of different parts of the flexible mechanical structure 3404 corresponding to different grating locations. It is to be understood that other force sensor embodiments described herein can also comprise multiple gratings and gratings fabricated at different elevations on the detection surface 3402 to increase the deflection detection range.

Each of the plurality of separate top electrodes 3416a-c can be electrically isolated and formed in the flexible mechanical structure 3404. Moreover, the bottom electrodes 3420a-b can be spaced apart from the separate top electrodes 3416a-c by the gap 3405. Further, the bottom electrodes can be positioned in the substrate 3402 and can be contacted by electrode terminals 3421a-b. Similarly, the separate top electrodes 3416a and 3416b can be contacted by electrode terminals 3417a and 3417b.

The detection surface 3402 can be positioned at a free end of a cantilever (not shown). Moreover, the flexible mechanical structure 3404 can be fully clamped around its circumference, it can be a clamped-clamped beam with a rectangular or H shape where the short edges at the ends are clamped, or it can be a cantilever structure or a similar structure that changes shape in a predictable manner in response to a force applied to the tip 3407.

A light beam 3410 can be directed through the detection surface 3402 to impinge on the flexible mechanical structure 3404. The beam 3410 reflects off of the flexible mechanical structure 3404, a portion of which can be reflective, and is diffracted differently by the first grating 3406a and the second grating 3406b. As shown, the first grating 3406a can generate a first set of diffraction orders 3412a-b and the second grating 3406b can generate a second set of diffraction orders 3413a-b. The detectors 3408 can detect the different diffraction orders. The detector outputs can be added to obtain up and down bending displacement detection. Similarly, the outputs can be subtracted to obtain torsional motion and force detection. This information can be obtained when the spring constant for the second bending mode (torsion around the mid axis) of the flexible mechanical structure 3404, clamped-clamped beam or a cantilever is known. Thus, in addition to acting as actuators, the first grating 3406a and second grating 3406b can be used to optically or capacitively decouple the bending motion from the torsional motion. As such, the sensed outputs of these detectors yield both bending and torsional motion information. Similarly, by having a flexible mechanical structure 3404 supported by 3 or 4 beams, the forces acting on the tip 3407 in three-dimensions can be obtained by proper processing of the output signals from multiple displacement sensors, such as the gratings 3406a, 3604b. One can also use separate beams 3410 to illuminate the plurality of gratings.

More specifically, FIG. 34A further shows that the two gratings each have different grating periods. The first grating 3406A is positioned placed on the left and right side of the probe tip 3407 while the second grating 3406b is positioned on the right side of the probe tip 3407. When illuminated by the light beam 3410, such as a laser beam, each of these gratings 3406a and 3406b will direct the position detection (PD) signals 3412a-b and 3413a-b each at a different angle. By placing the photo detectors at these particular locations the displacement of each side of the beam can be determined. This is made clear by the top view shown in FIG. 34B. In a similar fashion, gratings 3430a with the same periodicity but different orientation from gratings 3430b can be used to separate the optical signals coming from each side of the probe tip 3407 as shown in FIG. 34C. Since the gratings are not connected to an electrical source, their asymmetry does not affect the electromechanical actuation of the probe tip 3407.

Figure 35:
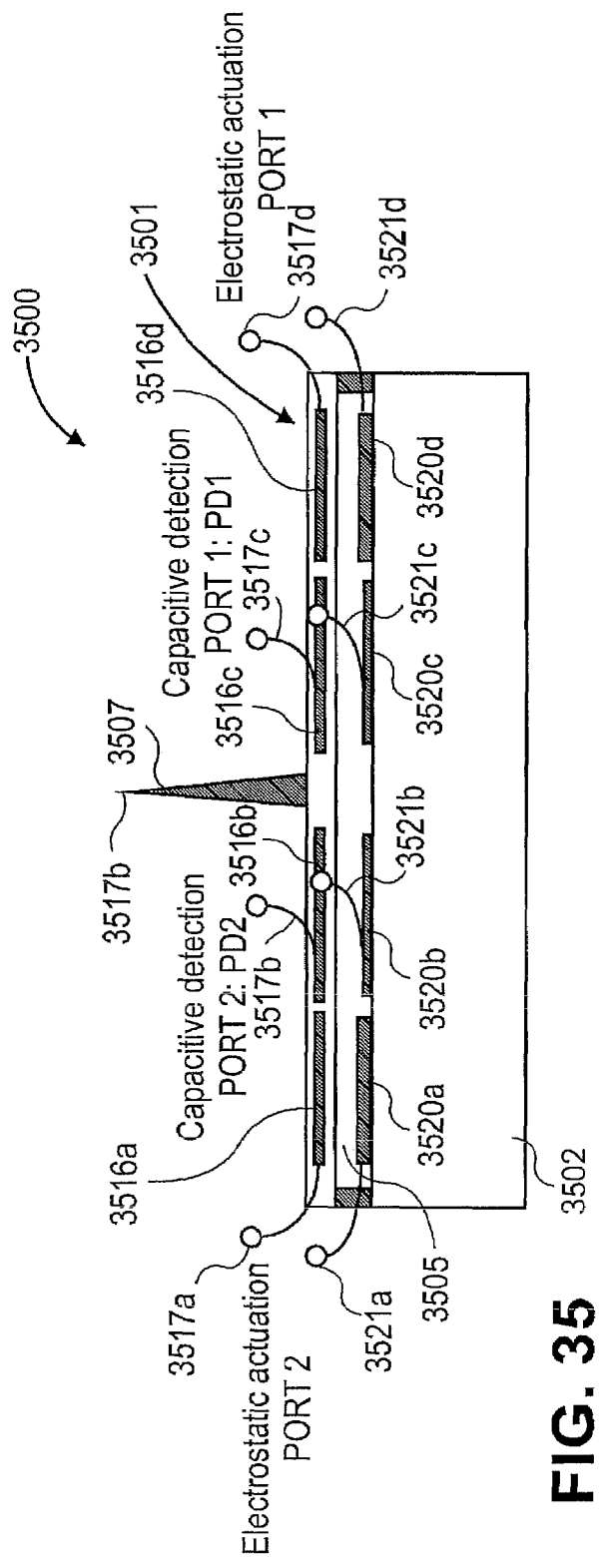
FIG. 35 shows a side schematic diagram of a force sensor having a three-dimensional force measurement capability in accordance with the present teachings.

Capacitive detection can be implemented into the force sensor structure 3500 as shown in the exemplary embodiment of FIG. 35. The force sensor structure 3500 includes two capacitive detection ports 3550a and 3550b as shown. Capacitive detection can be particularly useful when an array of probe tips (not shown) is formed on the same substrate for imaging large areas in parallel.

Similar to the force sensor structures described above, the force sensor structure unit 3500 can comprise a force sensor 3501, a detection surface 3502, a flexible mechanical structure 3504, a gap 3505, a tip 3507, a plurality of separate top electrodes, such as electrodes 3516a-d, and a plurality of separate bottom electrodes, such as electrodes 3520a-d.

Each of the plurality of separate top electrodes 3516a-d can be electrically isolated and formed in the flexible mechanical structure 3504. Moreover, the bottom electrodes 3520a-d can be spaced apart from the separate top electrodes 3516a-d by the gap 3505. Further, the bottom electrodes can be positioned in the substrate 3502 and can be contacted by electrode terminals 3521a-d. Similarly, each of the separate top electrodes 3516a-d can be contacted by electrode terminals 3517a-d. In the present embodiment, the electrode terminals 3517b-c can be capacitive sensing terminals that can detect a capacitance change formed between the separate top electrodes 3516b-c and the bottom electrodes 3520b-c.

Similar to the embodiments described above, the force sensor structure 3500 of FIG. 35 includes the electrostatic actuation via electrostatic actuation ports 3517a and 3517d. The electrostatic actuation imparts vertical, lateral, and multidirectional motion to the probe tip 3507 as described and the details are omitted herein for the sake of brevity.

Figure 36A:
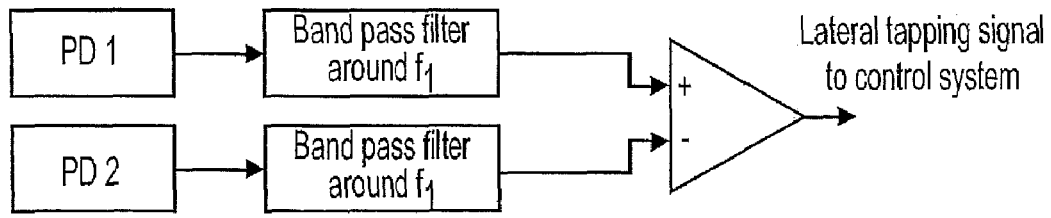
FIG. 36A shows a signal process for obtaining lateral tapping signals with the force sensor in accordance with the present teachings.
Figure 36B:
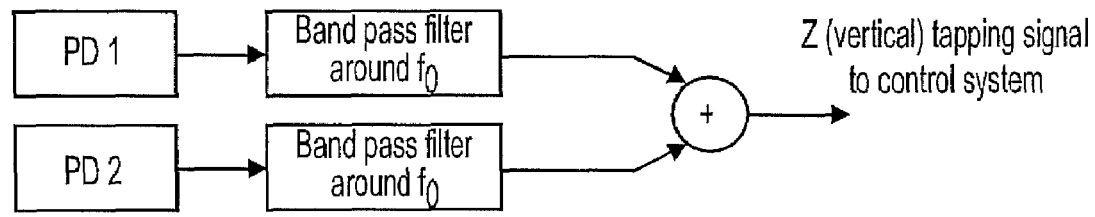
FIG. 36B shows a signal process for obtaining vertical tapping signals with the force sensor in accordance with the present teachings.

FIG. 36A shows a signal processing method for obtaining lateral tapping signals and FIG. 36B shows a signal processing method for obtaining vertical tapping signals with the exemplary force sensors in accordance with the present teachings. More specifically, a simple difference taking and adding scheme is utilized to generate lateral (X or Y) and vertical (Z) tapping signals during tapping mode imaging. Since the lateral motion of the tip is driven by a signal at frequency $f_1$, as shown in FIG. 33, and the two ends of the flexible mechanical structure 3304 move out-of-phase with each other, this signal can be extracted by filtering the input around $f_1$ and taking the difference of signals from each end. Therefore, the common mode signal indicating any motion in the vertical direction is eliminated. Similarly, the commonly known vertical (Z) tapping signal can be separated by filtering the signal around frequency $f_0$ and summing the outputs. By designing the flexible mechanical structure to have a large separation between $f_0$ and $f_1$, large imaging bandwidths can be achieved around these frequencies while significantly decoupling the signals. More complicated algorithms can be used to separate these signals and generate control signals to be applied to the integrated electromechanical actuators on the sensor structure as well as to the scanning stages.

Figure 37:
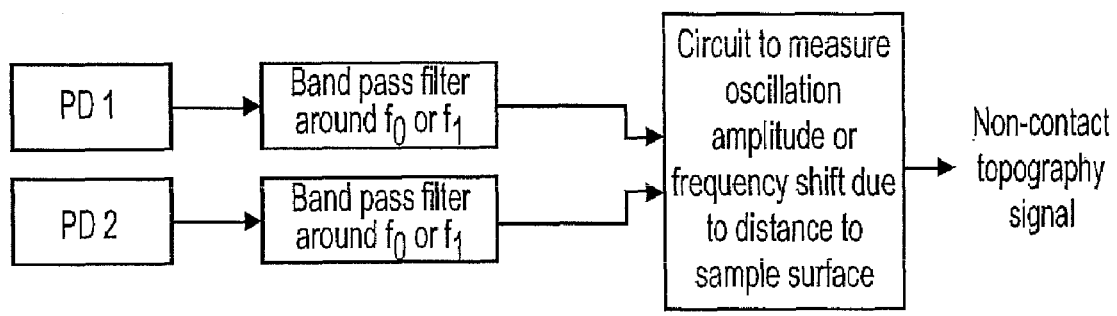
FIG. 37 shows a signal processing for non-contact three-dimensional imaging with the exemplary force sensor in accordance with the present teachings.

FIG. 37 shows a signal processing for non-contact three-dimensional imaging with exemplary force sensors in accordance with the present teachings. For non-contact imaging, the information to run the control loop comes from the changes in the oscillation characteristic of the force sensor due to long range interaction forces between the tip and the sample surface. These changes can be detected either in the oscillation amplitude or in the resonance frequency. The shifts in these parameters can be detected by suitable circuits and can be used to run control loops in the Z and X-Y directions to form three-dimensional images. For sensitive non-contact operation, the quality factor of the oscillator should be high. This can be ensured by designing the force sensor structure to vibrate in a mode with low loss or operate the device in vacuum environment.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A device for measuring topography of microscale and nanoscale three dimensional structures comprising:
    a detection surface;
    a flexible mechanical structure disposed a first distance above the detection surface so as to form a gap between the flexible mechanical structure and the detection surface, wherein the flexible mechanical structure is configured to deflect at selected portions thereof upon exposure to an external force, thereby changing the first distance at the selected portions;
    a probe tip positioned on the flexible mechanical structure, the probe tip moving in multi-directional motion according to a movement of the flexible mechanical structure; and
    at least two spaced apart actuators, each disposed so as to be configured to apply selectively a separate force to a region of the flexible mechanical structure so as to displace the probe tip in more than one dimension.

2. The device according to claim 1, further comprising:
    at least one bottom electrode contacting the detection surface; and
    at least one top electrode contacting the flexible mechanical structure, wherein the at least one bottom electrode and the at least one top electrode are configured to actuate the flexible mechanical structure.

3. The device according to claim 2, wherein the external force comprises applying different DC bias and AC voltages of different amplitude, frequency and phase to the at least one bottom and at least one top electrode.

4. The device according to claim 1, wherein the probe tip is oscillated vertically with respect to the detection surface.

5. The device according to claim 1, wherein the probe tip is oscillated laterally with respect to the detection surface.

6. The device according to claim 1, wherein the probe tip is oscillated orbitally with respect to the detection surface.

7. The device according to claim 1, wherein the probe tip is oscillated orbitally at an angle to the normal with respect to the detection surface.

8. The device according to claim 7, wherein an angle with respect to normal is from about 0.1° to about 10°.

9. The device according to claim 1, wherein the probe tip is oscillated at an angle to the normal with respect to the detection surface.

10. The device according to claim 9, wherein an angle with respect to normal is from about 0.1° to about 10°.

11. The device according to claim 1, wherein the probe tip is simultaneously oscillated laterally and vertically.

12. The device according to claim 11, wherein the oscillation is with the same frequencies.

13. The device according to claim 11, wherein the oscillation is with different frequencies.

14. The device according to claim 1, wherein the tip is oscillated in a vertical direction using first and higher symmetric modes at two frequencies at the same time.

15. The device according to claim 1, wherein the probe tip performs static and dynamic contact and non-contact probe measurements.

16. The device according to claim 1, further comprising:
    at least one bottom electrode contacting the detection surface; and
    wherein the two spaced apart actuators each comprise at least one top electrode contacting the flexible mechanical structure, so that the bottom electrode and the top electrodes are configured to actuate the flexible mechanical structure.

17. The device according to claim 16, wherein at least two top electrodes are contacting the flexible mechanical structure.

18. The device according to claim 16, wherein the at least one top electrode is configured as integrated electrostatic actuator electrode.

19. The device according to claim 17, wherein the at least two top electrodes are configured as integrated electrostatic actuator electrodes.

20. The device according to claim 3, wherein the probe tip is oscillated in a vertical direction with respect to the support surface by exciting the first symmetric resonance of the flexible mechanical structure.

21. The device according to claim 19, wherein the probe tip is linearly oscillated at an angle to the normal with respect to the support surface upon applying different bias signals to the actuator electrodes such that portions of the flexible mechanical structure are deflected by correspondingly different amounts.

22. The device according to claim 19, wherein the probe tip is laterally oscillated upon applying common DC bias signals to the actuator electrodes in addition to alternating signals that are phase shifted with respect to the other.

23. The device according to claim 19, wherein the probe tip is orbitally oscillated upon independently exciting the actuation electrodes at non-harmonic frequencies.

24. The device according to claim 1, wherein the probe tips comprise high aspect ratio tips.

25. The device according to claim 24, wherein the high aspect ratio tips comprise nanotubes.

26. The device according to claim 24, wherein the high aspect ratio tips comprise a material selected from silicon, silicon nitride, tungsten, platinum, and nanostructures comprising carbon or zinc oxide.

27. The device according to claim 1, wherein the probe tip has a vertical range of motion of from about 2 μm to about 10 μm and a lateral range of up to 1 μm.

28. The device according to claim 3, wherein resonant frequencies of the flexible mechanical structure are from about 1 kHz to about 10 MHz.

29. The device according to claim 1, wherein the force sensor images a three-dimensional object, including trenched topography therein.

30. A system for actuating a force sensor probe tip in three-dimensional space, the system comprising:
   a detection surface;
   a flexible mechanical structure disposed a first distance above the detection surface so as to form a gap between the flexible mechanical structure and the detection surface, wherein the flexible mechanical structure is configured to deflect upon exposure to an external force, thereby changing the first distance;
   the force sensor probe tip mounted to the flexible mechanical structure;
   at least one bottom electrode contacting the detection surface; and
   at least two spaced apart actuator electrodes contacting the flexible mechanical structure, wherein the bottom electrode and the actuator electrodes are configured to actuate the flexible mechanical structure and correspondingly generate multi-directional probe tip motion.

31. The system according to claim 30, wherein the force sensor probe tip is mounted to the flexible mechanical structure at a node point thereof.

32. The system according to claim 31, wherein the force sensor probe tip is operable in an anti-symmetric mode.

33. The system according to claim 30, wherein the force sensor probe tip is mounted to the flexible mechanical structure at a position of maximum displacement.

34. The system according to claim 33, wherein the force sensor probe tip is operable in a symmetric mode.

35. The system according to claim 30, further comprising multiple actuator electrodes.

36. The system according to claim 30, wherein a clamped-clamped flexible mechanical structure is configured to comprise two actuators.

37. The system according to claim 30, wherein a four sided flexible mechanical structure is configured to comprise four independent actuators.

38. The device according to claim 30, wherein the probe tip is oscillated vertically with respect to the detection surface.

39. The system according to claim 30, wherein the probe tip is oscillated laterally with respect to the detection surface.

40. The system according to claim 30, wherein the probe tip is oscillated orbitally at an angle to the normal with respect to the detection surface.

41. The system according to claim 40, wherein an angle with respect to normal is from about 0.1° to about 10°.

42. The system according to claim 30, wherein the probe tip is oscillated orbitally with respect to the detection surface.

43. The system according to claim 35, wherein the probe tip is oscillated in a vertical direction with respect to the detection surface by exciting the symmetric resonances of the flexible mechanical structure.

44. The system according to claim 35, wherein the probe tip is linearly oscillated at an angle to the normal with respect to the detection surface upon applying different bias signals to the actuator electrodes such that portions of the flexible mechanical structure are deflected by correspondingly different amounts.

45. The system according to claim 35, wherein the probe tip is laterally oscillated upon applying common DC bias signals to the actuator electrodes each phase shifted with respect to the other thereby exciting anti-symmetric resonances of the flexible mechanical structure.

46. The system according to claim 35, wherein the probe tip is orbitally oscillated upon independently exciting the actuation electrodes at non-harmonic frequencies.

47. The system according to claim 30, wherein the probe tip has a vertical range of motion of from about 2 μm to about 10 μm and a lateral range of up to 1 μm.

48. The system according to claim 35, wherein resonant frequencies of the flexible mechanical structure are from about 1 kHz to about 10 MHz.

* * * * *